US011797546B2

(12) United States Patent
Lundberg

(10) Patent No.: US 11,797,546 B2
(45) Date of Patent: *Oct. 24, 2023

(54) PATENT MAPPING

(71) Applicant: Black Hills IP Holdings, LLC, Minneapolis, MN (US)

(72) Inventor: Steven W. Lundberg, Edina, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 77 days.

This patent is subject to a terminal disclaimer.

(21) Appl. No.: 17/320,202

(22) Filed: May 13, 2021

(65) Prior Publication Data
US 2022/0075789 A1 Mar. 10, 2022

Related U.S. Application Data

(63) Continuation of application No. 16/352,364, filed on Mar. 13, 2019, now Pat. No. 11,048,709, which is a
(Continued)

(51) Int. Cl.
*G06F 16/2457* (2019.01)
*G06F 16/26* (2019.01)
(Continued)

(52) U.S. Cl.
CPC ...... *G06F 16/24578* (2019.01); *G06F 16/248* (2019.01); *G06F 16/2455* (2019.01);
(Continued)

(58) Field of Classification Search
CPC ........... G06F 16/24578; G06F 16/2455; G06F 16/248; G06F 16/252; G06F 16/26;
(Continued)

(56) References Cited

U.S. PATENT DOCUMENTS 4,807,154 A 2/1989 Scully et al.
4,868,733 A 9/1989 Fujisawa et al.
(Continued)

FOREIGN PATENT DOCUMENTS

AU 2006272510 2/2012
AU 2012200701 B2 5/2014
(Continued)

OTHER PUBLICATIONS

U.S. Appl. No. 17/589,635, filed Jan. 31, 2022, Patent Mapping.
(Continued)

*Primary Examiner* — Sheree N Brown
(74) *Attorney, Agent, or Firm* — Schwegman Lundberg & Woessner, P.A.

(57) ABSTRACT

A system and computer implemented method are provided. The method comprises maintaining a database of patent portfolios and a database of patents, with each patent stored in the database of patents being associated with one or more patent portfolios stored in the database of patent portfolios. The method includes receiving a search query associated with a first patent portfolio; searching the first portfolio as a function of the search query; generating a seed set of search results including one or more patent claims associated with the search query, the patent claims including terms from the search query; automatically generating an expanded set of search results including one or more patent claims further associated with the search query or associated with the patent claims in the seed set of search results; and mapping the one or more patent claims to a patent concept.

17 Claims, 22 Drawing Sheets

Related U.S. Application Data continuation of application No. 13/309,200, filed on Dec. 1, 2011, now Pat. No. 10,268,731.

(60) Provisional application No. 61/561,502, filed on Nov. 18, 2011, provisional application No. 61/542,515, filed on Oct. 3, 2011.

(51) Int. Cl.
| | | |
|---|---|---|
| *G06F 16/93* | (2019.01) | |
| *G06F 16/248* | (2019.01) | |
| *G06F 16/25* | (2019.01) | |
| *G06F 16/2455* | (2019.01) | |
| *G06F 16/9535* | (2019.01) | |
| *G06Q 10/10* | (2023.01) | |
| *G06F 40/237* | (2020.01) | |
| *G06Q 50/18* | (2012.01) | |

(52) U.S. Cl.
CPC ............ *G06F 16/252* (2019.01); *G06F 16/26* (2019.01); *G06F 16/93* (2019.01); *G06F 16/9535* (2019.01); *G06F 40/237* (2020.01); *G06Q 10/10* (2013.01); *G06Q 50/184* (2013.01); *G06F 2216/11* (2013.01)

(58) Field of Classification Search
CPC .... G06F 16/93; G06F 16/9535; G06F 40/237; G06F 2216/11; G06Q 10/10; G06Q 50/184
USPC .......................................................... 707/722
See application file for complete search history.

(56) References Cited

U.S. PATENT DOCUMENTS

| | | | |
|---|---|---|---|
| 5,297,039 | A | 3/1994 | Kanaegami et al. |
| 5,329,447 | A | 7/1994 | Leedom, Jr. |
| 5,404,506 | A | 4/1995 | Fujisawa et al. |
| 5,410,646 | A | 4/1995 | Tondevold et al. |
| 5,530,852 | A | 6/1996 | Meske et al. |
| 5,548,506 | A | 8/1996 | Srinivasan |
| 5,548,753 | A | 8/1996 | Linstead et al. |
| 5,553,226 | A | 9/1996 | Kiuchi et al. |
| 5,555,408 | A | 9/1996 | Fujisawa et al. |
| 5,557,515 | A | 9/1996 | Abbruzzese et al. |
| 5,592,664 | A | 1/1997 | Starkey |
| 5,623,679 | A * | 4/1997 | Rivette ................. G06F 16/748 715/255 |
| 5,623,681 | A * | 4/1997 | Rivette ............... G06F 13/4063 715/788 |
| 5,644,740 | A | 7/1997 | Kiuchi |
| 5,659,729 | A | 8/1997 | Nielsen |
| 5,664,063 | A | 9/1997 | Johnson et al. |
| 5,664,714 | A | 9/1997 | Navarro et al. |
| 5,694,523 | A | 12/1997 | Wical |
| 5,696,916 | A | 12/1997 | Yamazaki et al. |
| 5,699,528 | A | 12/1997 | Hogan |
| 5,721,910 | A | 2/1998 | Unger et al. |
| 5,745,745 | A | 4/1998 | Tada et al. |
| 5,754,840 | A | 5/1998 | Rivette et al. |
| 5,758,328 | A | 5/1998 | Giovannoli |
| 5,768,580 | A | 6/1998 | Wical |
| 5,774,833 | A | 6/1998 | Newman |
| 5,787,411 | A | 7/1998 | Groff et al. |
| 5,794,236 | A | 8/1998 | Mehrle |
| 5,799,325 | A * | 8/1998 | Rivette ............... G06F 13/4063 715/209 |
| 5,809,318 | A | 9/1998 | Rivette et al. |
| 5,850,520 | A | 12/1998 | Greibenow et al. |
| 5,870,745 | A | 2/1999 | McCune |
| 5,895,468 | A | 4/1999 | Whitmyer, Jr. |
| 5,903,881 | A | 5/1999 | Schrader et al. |
| 5,907,837 | A | 5/1999 | Ferrel et al. |
| 5,926,811 | A | 7/1999 | Miller et al. |
| 5,940,821 | A | 8/1999 | Wical |
| 5,953,726 | A | 9/1999 | Carter et al. |
| 5,970,463 | A | 10/1999 | Cave et al. |
| 5,991,751 | A * | 11/1999 | Rivette ................. G06F 16/382 707/E17.093 |
| 5,991,756 | A | 11/1999 | Wu |
| 5,991,780 | A | 11/1999 | Rivette et al. |
| 5,999,907 | A | 12/1999 | Donner et al. |
| 6,006,221 | A | 12/1999 | Liddy et al. |
| 6,014,663 | A | 1/2000 | Rivette et al. |
| 6,038,561 | A | 3/2000 | Snyder et al. |
| 6,049,801 | A | 4/2000 | Whitmyer, Jr. |
| 6,055,538 | A | 4/2000 | Kessenich et al. |
| 6,076,088 | A | 6/2000 | Paik et al. |
| 6,094,652 | A | 7/2000 | Faisal |
| 6,182,062 | B1 * | 1/2001 | Fujisawa ............... G06F 40/232 |
| 6,182,078 | B1 | 1/2001 | Whitmyer, Jr. |
| 6,216,128 | B1 | 4/2001 | Di-Criescenzo et al. |
| 6,226,792 | B1 | 5/2001 | Goiffon et al. |
| 6,263,335 | B1 | 7/2001 | Paik et al. |
| 6,327,593 | B1 | 12/2001 | Goiffon |
| 6,339,767 | B1 * | 1/2002 | Rivette ................... G06F 16/93 707/924 |
| 6,363,361 | B1 | 3/2002 | Lundberg |
| 6,363,378 | B1 | 3/2002 | Conklin et al. |
| 6,401,118 | B1 | 6/2002 | Thomas |
| 6,405,190 | B1 | 6/2002 | Conklin |
| 6,415,283 | B1 | 7/2002 | Conklin |
| 6,415,319 | B1 | 7/2002 | Ambroziak |
| 6,434,580 | B1 | 8/2002 | Takano et al. |
| 6,453,312 | B1 | 9/2002 | Goiffon et al. |
| 6,460,043 | B1 | 10/2002 | Tabbara et al. |
| 6,490,581 | B1 | 12/2002 | Neshatfar et al. |
| 6,499,026 | B1 | 12/2002 | Rivette et al. |
| 6,502,081 | B1 | 12/2002 | Wiltshire, Jr. et al. |
| 6,513,027 | B1 | 1/2003 | Powers et al. |
| 6,526,440 | B1 | 2/2003 | Bharat |
| 6,542,884 | B1 | 4/2003 | Soderberg et al. |
| 6,556,992 | B1 | 4/2003 | Barney et al. |
| 6,560,620 | B1 | 5/2003 | Ching |
| 6,574,632 | B2 | 6/2003 | Fox et al. |
| 6,629,097 | B1 | 9/2003 | Keith |
| 6,654,731 | B1 | 11/2003 | Mahesh |
| 6,662,178 | B2 | 12/2003 | Lee |
| 6,665,656 | B1 * | 12/2003 | Carter ................... G06Q 10/10 707/999.102 |
| 6,665,670 | B2 | 12/2003 | Winer et al. |
| 6,675,159 | B1 | 1/2004 | Lin et al. |
| 6,678,692 | B1 | 1/2004 | Hyatt |
| 6,694,315 | B1 | 2/2004 | Grow |
| 6,694,331 | B2 | 2/2004 | Lee |
| 6,751,621 | B1 | 6/2004 | Calistri-Yeh et al. |
| 6,766,315 | B1 | 7/2004 | Bratsos et al. |
| 6,789,092 | B1 | 9/2004 | Oppedahl et al. |
| 6,823,331 | B1 | 11/2004 | Abu-Hakima |
| 6,839,665 | B1 | 1/2005 | Meyers |
| 6,847,960 | B1 | 1/2005 | Li et al. |
| 6,847,966 | B1 | 1/2005 | Sommer et al. |
| 6,847,979 | B2 | 1/2005 | Allemang et al. |
| 6,879,990 | B1 | 4/2005 | Boyer et al. |
| 6,885,999 | B1 | 4/2005 | Corless |
| 6,889,223 | B2 | 5/2005 | Hattori et al. |
| 6,941,553 | B2 | 9/2005 | Eisler et al. |
| 6,970,842 | B1 | 11/2005 | Ashby |
| 6,970,881 | B1 | 11/2005 | Mohan et al. |
| 6,976,016 | B2 | 12/2005 | Chang |
| 6,980,984 | B1 | 12/2005 | Huffman et al. |
| 6,981,007 | B1 | 12/2005 | Whitmyer, Jr. |
| 7,003,516 | B2 | 2/2006 | Dehlinger et al. |
| 7,016,852 | B1 | 3/2006 | Lee |
| 7,016,895 | B2 | 3/2006 | Dehlinger et al. |
| 7,024,408 | B2 | 4/2006 | Dehlinger et al. |
| 7,035,463 | B1 | 4/2006 | Monobe et al. |
| 7,051,022 | B1 | 5/2006 | Faisal |
| 7,054,854 | B1 | 5/2006 | Hattori et al. |
| 7,054,856 | B2 | 5/2006 | Won et al. |
| 7,080,067 | B2 | 7/2006 | Nonomura et al. |
| 7,085,771 | B2 | 8/2006 | Chung et al. |

(56) References Cited

U.S. PATENT DOCUMENTS

| | | | |
|---|---|---|---|
| 7,158,983 B2 | 1/2007 | Willse et al. |
| 7,185,172 B1 | 2/2007 | Mick, Jr. et al. |
| 7,221,016 B2 | 5/2007 | Inoue |
| 7,231,384 B2 | 6/2007 | Wu et al. |
| 7,231,386 B2 | 6/2007 | Nonomura et al. |
| 7,281,008 B1 | 10/2007 | Lawrence et al. |
| 7,293,018 B2 | 11/2007 | Hattori et al. |
| 7,296,015 B2 | 11/2007 | Poltorak |
| 7,305,625 B1 | 12/2007 | Zilka et al. |
| 7,369,701 B2 | 5/2008 | Lundberg |
| 7,383,294 B1 | 6/2008 | Tamer et al. |
| 7,386,460 B1 | 6/2008 | Frank et al. |
| 7,395,261 B1 | 7/2008 | Atzel |
| 7,433,884 B2 | 10/2008 | Breitzman |
| 7,444,589 B2 | 10/2008 | Zellner et al. |
| 7,483,829 B2 | 1/2009 | Murakami et al. |
| 7,493,253 B1 | 2/2009 | Ceusters et al. |
| 7,523,126 B2 | 4/2009 | Rivette et al. |
| 7,536,446 B2 | 5/2009 | Blumberg |
| 7,610,185 B1 | 10/2009 | Ershov |
| 7,653,631 B1 | 1/2010 | Lundberg |
| 7,676,375 B1 | 3/2010 | Neifeld et al. |
| 7,680,733 B1 | 3/2010 | Lundberg |
| 7,698,330 B2 | 4/2010 | Kim |
| 7,702,640 B1 | 4/2010 | Vermeulen et al. |
| 7,716,226 B2 | 5/2010 | Barney |
| 7,716,581 B2 | 5/2010 | Tran |
| 7,734,545 B1 | 6/2010 | Fogliano et al. |
| 7,739,240 B2 | 6/2010 | Saito et al. |
| 7,765,227 B1 | 7/2010 | Khoshnevisan et al. |
| 7,769,685 B1 | 8/2010 | Malackowski et al. |
| 7,783,619 B2 | 8/2010 | Mcbeath et al. |
| 7,788,251 B2 | 8/2010 | Carlson et al. |
| 7,801,889 B2 | 9/2010 | Kim et al. |
| 7,801,909 B2 | 9/2010 | Poltorak |
| 7,823,061 B2 | 10/2010 | Chan |
| 7,836,048 B2 | 11/2010 | Schneider |
| 7,881,937 B2 | 2/2011 | Hasan et al. |
| 7,904,453 B2* | 3/2011 | Poltorak | G06Q 50/184 707/730 |
| 7,962,511 B2* | 6/2011 | Barney | G06Q 30/0202 702/181 |
| 7,966,328 B2 | 6/2011 | Germeraad et al. |
| 7,983,928 B2 | 7/2011 | Lee |
| 7,996,753 B1 | 8/2011 | Chan et al. |
| 8,000,528 B2 | 8/2011 | Ming et al. |
| 8,005,760 B1 | 8/2011 | Lee |
| 8,041,739 B2 | 10/2011 | Glasgow |
| 8,064,736 B2 | 11/2011 | Chan et al. |
| 8,078,545 B1* | 12/2011 | Zilka | G06Q 10/10 705/310 |
| 8,095,581 B2 | 1/2012 | Stobbs et al. |
| 8,131,701 B2* | 3/2012 | Barney | G06F 16/24578 707/726 |
| 8,160,306 B1 | 4/2012 | Neustel et al. |
| 8,161,025 B2 | 4/2012 | Lundberg et al. |
| 8,176,440 B2 | 5/2012 | Stading |
| 8,196,030 B1 | 6/2012 | Wang et al. |
| 8,204,816 B2 | 6/2012 | Brodsky et al. |
| 8,254,692 B2 | 8/2012 | Ramachandrula et al. |
| 8,275,708 B1 | 9/2012 | Dennes et al. |
| 8,380,548 B2 | 2/2013 | Ng et al. |
| 8,386,456 B1 | 2/2013 | Paiz |
| 8,442,814 B2 | 5/2013 | Ceusters et al. |
| 8,447,758 B1 | 5/2013 | Adler et al. |
| 8,538,794 B2 | 9/2013 | Marko et al. |
| 8,543,511 B2 | 9/2013 | Wang |
| 8,589,413 B1 | 11/2013 | Mohan et al. |
| 8,600,900 B2 | 12/2013 | Lundberg |
| 8,713,078 B2 | 4/2014 | Kunjithapatham et al. |
| 8,812,292 B2 | 8/2014 | Ceusters et al. |
| 8,892,547 B2 | 11/2014 | Lundberg |
| 8,972,385 B2 | 3/2015 | Lundberg |
| 9,003,474 B1 | 4/2015 | Smith |
| 9,098,568 B2 | 8/2015 | Li et al. |
| 9,110,971 B2 | 8/2015 | Liao et al. |
| 9,146,985 B2 | 9/2015 | Carter |
| 9,177,349 B2* | 11/2015 | Barney | G06Q 30/0202 |
| 9,201,956 B2 | 12/2015 | Lundberg et al. |
| 9,201,966 B2 | 12/2015 | Lundberg |
| 9,286,351 B2 | 3/2016 | Lundberg |
| 9,396,274 B2 | 7/2016 | Lundberg |
| 9,541,977 B1* | 1/2017 | Lee | G05B 13/025 |
| 9,652,546 B2 | 5/2017 | Lundberg |
| 9,659,071 B2 | 5/2017 | Lundberg et al. |
| 9,679,019 B2 | 6/2017 | Lundberg |
| 9,858,319 B2 | 1/2018 | Lundberg et al. |
| 9,904,726 B2 | 2/2018 | Lundberg |
| 9,965,460 B1 | 5/2018 | Wasiuk et al. |
| 10,013,726 B1 | 7/2018 | Jung et al. |
| 10,268,731 B2 | 4/2019 | Lundberg |
| 10,546,273 B2 | 1/2020 | Lundberg et al. |
| 10,614,082 B2 | 4/2020 | Lundberg et al. |
| 10,628,429 B2 | 4/2020 | Lundberg |
| 10,860,657 B2 | 12/2020 | Lundberg |
| 10,885,078 B2 | 1/2021 | Lundberg |
| 11,048,709 B2 | 6/2021 | Lundberg |
| 11,301,810 B2 | 4/2022 | Lundberg et al. |
| 2001/0007977 A1 | 7/2001 | Geary |
| 2001/0042064 A1 | 11/2001 | Davis et al. |
| 2001/0049688 A1 | 12/2001 | Fratkina et al. |
| 2002/0004775 A1 | 1/2002 | Kossovsky et al. |
| 2002/0007373 A1 | 1/2002 | Blair et al. |
| 2002/0022974 A1 | 2/2002 | Lindh |
| 2002/0023053 A1 | 2/2002 | Szoc et al. |
| 2002/0029208 A1 | 3/2002 | Josephson |
| 2002/0035499 A1 | 3/2002 | Germeraad et al. |
| 2002/0035571 A1 | 3/2002 | Coult |
| 2002/0042784 A1* | 4/2002 | Kerven | G06F 16/3338 707/E17.074 |
| 2002/0052971 A1 | 5/2002 | Okudera et al. |
| 2002/0059076 A1 | 5/2002 | Grainger et al. |
| 2002/0065675 A1 | 5/2002 | Grainger et al. |
| 2002/0065677 A1 | 5/2002 | Grainger et al. |
| 2002/0072920 A1 | 6/2002 | Grainger |
| 2002/0077835 A1 | 6/2002 | Hagelin |
| 2002/0078090 A1 | 6/2002 | Hwang et al. |
| 2002/0082778 A1* | 6/2002 | Barnett | G06Q 10/10 702/1 |
| 2002/0091541 A1 | 7/2002 | Lundberg |
| 2002/0091542 A1 | 7/2002 | Grainger |
| 2002/0091702 A1 | 7/2002 | Mullins |
| 2002/0103654 A1 | 8/2002 | Poltorak |
| 2002/0107896 A1 | 8/2002 | Ronai |
| 2002/0111824 A1 | 8/2002 | Grainger |
| 2002/0111941 A1* | 8/2002 | Roux | G06F 16/3344 |
| 2002/0111953 A1 | 8/2002 | Snyder |
| 2002/0116363 A1 | 8/2002 | Grainger |
| 2002/0129015 A1 | 9/2002 | Caudill et al. |
| 2002/0138384 A1 | 9/2002 | Malackowski |
| 2002/0138465 A1 | 9/2002 | Lee et al. |
| 2002/0138474 A1 | 9/2002 | Lee |
| 2002/0138475 A1 | 9/2002 | Lee |
| 2002/0143496 A1 | 10/2002 | Maetas et al. |
| 2002/0143742 A1 | 10/2002 | Nonomura et al. |
| 2002/0147711 A1 | 10/2002 | Hattori et al. |
| 2002/0147738 A1 | 10/2002 | Reader et al. |
| 2002/0161733 A1 | 10/2002 | Grainger |
| 2002/0163541 A1 | 11/2002 | Williams et al. |
| 2002/0174131 A1 | 11/2002 | Winer et al. |
| 2002/0175934 A1 | 11/2002 | Hand et al. |
| 2002/0175941 A1 | 11/2002 | Hand et al. |
| 2002/0177907 A1 | 11/2002 | Hand et al. |
| 2002/0184234 A1 | 12/2002 | Lundberg |
| 2003/0004843 A1 | 1/2003 | Frain |
| 2003/0004936 A1 | 1/2003 | Grune et al. |
| 2003/0026459 A1 | 2/2003 | Won et al. |
| 2003/0033295 A1* | 2/2003 | Adler | G06F 16/332 |
| 2003/0033333 A1 | 2/2003 | Nishino et al. |
| 2003/0046307 A1 | 3/2003 | Rivette et al. |
| 2003/0050915 A1 | 3/2003 | Allemang et al. |
| 2003/0066025 A1 | 4/2003 | Garner et al. |
| 2003/0074354 A1 | 4/2003 | Lee et al. |
| 2003/0084066 A1 | 5/2003 | Waterman et al. |

(56) References Cited

U.S. PATENT DOCUMENTS

| | | |
|---|---|---|
| 2003/0115191 A1 | 6/2003 | Copperman et al. |
| 2003/0154085 A1 | 8/2003 | Kelley |
| 2003/0167181 A1 | 9/2003 | Lundberg et al. |
| 2003/0187832 A1 | 10/2003 | Reader |
| 2003/0187874 A1 | 10/2003 | Peschel et al. |
| 2003/0191654 A1 | 10/2003 | Panchai et al. |
| 2003/0191780 A1 | 10/2003 | Heger et al. |
| 2003/0195764 A1 | 10/2003 | Baker et al. |
| 2003/0212572 A1 | 11/2003 | Poltorak |
| 2003/0212706 A1 | 11/2003 | Shih |
| 2003/0217335 A1 | 11/2003 | Chung et al. |
| 2003/0220891 A1 | 11/2003 | Fish |
| 2003/0225749 A1 | 12/2003 | Cox et al. |
| 2003/0229470 A1 | 12/2003 | Pejic |
| 2004/0002892 A1 | 1/2004 | Gluck et al. |
| 2004/0006457 A1 | 1/2004 | Dehlinger et al. |
| 2004/0006459 A1 | 1/2004 | Dehlinger et al. |
| 2004/0006547 A1 | 1/2004 | Dehlinger et al. |
| 2004/0006558 A1 | 1/2004 | Dehlinger et al. |
| 2004/0006594 A1 | 1/2004 | Boyer et al. |
| 2004/0010393 A1 | 1/2004 | Barney |
| 2004/0015481 A1 | 1/2004 | Zinda |
| 2004/0024733 A1 | 2/2004 | Won et al. |
| 2004/0024739 A1 | 2/2004 | Copperman et al. |
| 2004/0044688 A1 | 3/2004 | Brudz et al. |
| 2004/0049498 A1 | 3/2004 | Dehlinger et al. |
| 2004/0054672 A1 | 3/2004 | Tsuchitani et al. |
| 2004/0059736 A1 | 3/2004 | Willse et al. |
| 2004/0059994 A1 | 3/2004 | Fogel et al. |
| 2004/0064438 A1 | 4/2004 | Kostoff |
| 2004/0073443 A1 | 4/2004 | Gabrick et al. |
| 2004/0078192 A1* | 4/2004 | Poltorak ............... G06Q 10/10 704/9 |
| 2004/0078365 A1* | 4/2004 | Poltorak ............... G06Q 10/10 |
| 2004/0083206 A1* | 4/2004 | Wu ........................ G06Q 10/10 |
| 2004/0088306 A1 | 5/2004 | Murthy et al. |
| 2004/0088332 A1 | 5/2004 | Lee et al. |
| 2004/0103112 A1 | 5/2004 | Colson et al. |
| 2004/0122656 A1 | 6/2004 | Abir |
| 2004/0122841 A1 | 6/2004 | Goodman et al. |
| 2004/0133433 A1 | 7/2004 | Lee et al. |
| 2004/0133534 A1 | 7/2004 | Mahesh |
| 2004/0133555 A1* | 7/2004 | Toong ................. G06F 16/9558 |
| 2004/0133566 A1 | 7/2004 | Ishiguro et al. |
| 2004/0158559 A1* | 8/2004 | Poltorak .............. G06F 40/289 |
| 2004/0167875 A1 | 8/2004 | Sneiders |
| 2004/0177068 A1 | 9/2004 | Beretich et al. |
| 2004/0181417 A1 | 9/2004 | Piller et al. |
| 2004/0181427 A1* | 9/2004 | Stobbs ................ G06Q 50/184 705/310 |
| 2004/0186705 A1 | 9/2004 | Morgan et al. |
| 2004/0186738 A1 | 9/2004 | Reisman |
| 2004/0199400 A1 | 10/2004 | Lundberg |
| 2004/0223648 A1 | 11/2004 | Hoene et al. |
| 2004/0236646 A1 | 11/2004 | Wu et al. |
| 2004/0260569 A1 | 12/2004 | Bell et al. |
| 2004/0268399 A1 | 12/2004 | Asakawa |
| 2005/0004806 A1 | 1/2005 | Lin et al. |
| 2005/0005239 A1 | 1/2005 | Richards et al. |
| 2005/0010555 A1 | 1/2005 | Gallivan |
| 2005/0010863 A1 | 1/2005 | Zernik |
| 2005/0021522 A1 | 1/2005 | Herman et al. |
| 2005/0060170 A1 | 3/2005 | Kummamura et al. |
| 2005/0060303 A1 | 3/2005 | Wu et al. |
| 2005/0060306 A1 | 3/2005 | Hattori et al. |
| 2005/0080656 A1 | 4/2005 | Crow et al. |
| 2005/0080723 A1 | 4/2005 | Burchetta et al. |
| 2005/0080775 A1 | 4/2005 | Colledge et al. |
| 2005/0080776 A1 | 4/2005 | Colledge et al. |
| 2005/0097628 A1 | 5/2005 | Lussier et al. |
| 2005/0108652 A1 | 5/2005 | Beretich, Jr. et al. |
| 2005/0114763 A1 | 5/2005 | Nonomura et al. |
| 2005/0119995 A1 | 6/2005 | Lee |
| 2005/0120011 A1 | 6/2005 | Dehlinger et al. |
| 2005/0125459 A1 | 6/2005 | Sutinen et al. |
| 2005/0131882 A1 | 6/2005 | Beretich et al. |
| 2005/0144177 A1* | 6/2005 | Hodes .................. G06F 40/237 |
| 2005/0154673 A1 | 7/2005 | Fellenstein et al. |
| 2005/0165600 A1 | 7/2005 | Kasravi et al. |
| 2005/0165744 A1 | 7/2005 | Taylor et al. |
| 2005/0182755 A1 | 8/2005 | Tran |
| 2005/0198026 A1 | 9/2005 | Dehlinger et al. |
| 2005/0203768 A1 | 9/2005 | Florance et al. |
| 2005/0210008 A1 | 9/2005 | Tran et al. |
| 2005/0210009 A1 | 9/2005 | Tran |
| 2005/0210042 A1 | 9/2005 | Goedken |
| 2005/0216898 A1 | 9/2005 | Powell et al. |
| 2005/0228684 A1 | 10/2005 | Pogodin et al. |
| 2005/0234738 A1 | 10/2005 | Hodes |
| 2005/0234881 A1 | 10/2005 | Burago et al. |
| 2005/0240595 A1 | 10/2005 | Chandrasekaran |
| 2005/0246194 A1 | 11/2005 | Lundberg |
| 2005/0251383 A1 | 11/2005 | Murray |
| 2005/0256734 A1 | 11/2005 | Clikeman |
| 2005/0261927 A1 | 11/2005 | Bilak et al. |
| 2005/0289524 A1 | 12/2005 | McGinnes |
| 2006/0015485 A1 | 1/2006 | Hofmann |
| 2006/0026174 A1 | 2/2006 | Lundberg et al. |
| 2006/0026203 A1 | 2/2006 | Tan et al. |
| 2006/0036451 A1 | 2/2006 | Lundberg et al. |
| 2006/0036452 A1 | 2/2006 | Williams |
| 2006/0036453 A1* | 2/2006 | Williams ............... G06Q 10/00 706/45 |
| 2006/0036529 A1* | 2/2006 | Williams ............. G06Q 50/184 715/275 |
| 2006/0036632 A1* | 2/2006 | Williams ............... G06Q 10/00 |
| 2006/0036635 A1* | 2/2006 | Williams ............... G06F 16/30 707/999.102 |
| 2006/0074836 A1 | 4/2006 | Gardner et al. |
| 2006/0074867 A1 | 4/2006 | Breitzman |
| 2006/0074991 A1 | 4/2006 | Lussier et al. |
| 2006/0085249 A1 | 4/2006 | Diaz et al. |
| 2006/0085478 A1 | 4/2006 | Landau et al. |
| 2006/0106793 A1 | 5/2006 | Liang |
| 2006/0106847 A1* | 5/2006 | Eckardt ............... G06F 16/3323 707/E17.093 |
| 2006/0112084 A1 | 5/2006 | Mcbeath et al. |
| 2006/0143162 A1 | 6/2006 | Bernacki et al. |
| 2006/0149720 A1 | 7/2006 | Dehlinger |
| 2006/0150074 A1 | 7/2006 | Zellner |
| 2006/0161562 A1 | 7/2006 | McFarland et al. |
| 2006/0173903 A1 | 8/2006 | Zimmerman et al. |
| 2006/0173920 A1 | 8/2006 | Adler et al. |
| 2006/0190449 A1 | 8/2006 | Lundberg et al. |
| 2006/0190807 A1* | 8/2006 | Tran ..................... G06F 40/166 705/310 |
| 2006/0212302 A1 | 9/2006 | Lundberg et al. |
| 2006/0212402 A1 | 9/2006 | Lundberg et al. |
| 2006/0212471 A1 | 9/2006 | Lundberg et al. |
| 2006/0212480 A1 | 9/2006 | Lundberg et al. |
| 2006/0218188 A1 | 9/2006 | Duncan et al. |
| 2006/0218491 A1 | 9/2006 | Grossman et al. |
| 2006/0224412 A1 | 10/2006 | Frank et al. |
| 2006/0224999 A1 | 10/2006 | Albrecht et al. |
| 2006/0225000 A1 | 10/2006 | Albrecht et al. |
| 2006/0229983 A1 | 10/2006 | Lundberg |
| 2006/0235811 A1 | 10/2006 | Fairweather |
| 2006/0258397 A1 | 11/2006 | Kaplan et al. |
| 2006/0287971 A1 | 12/2006 | Armstrong |
| 2007/0005575 A1 | 1/2007 | Dai et al. |
| 2007/0010994 A1 | 1/2007 | Mueller |
| 2007/0011154 A1 | 1/2007 | Musgrove et al. |
| 2007/0011175 A1 | 1/2007 | Langseth et al. |
| 2007/0050343 A1 | 3/2007 | Siddaramappa et al. |
| 2007/0057967 A1 | 3/2007 | Armstrong |
| 2007/0061384 A1 | 3/2007 | Harrington et al. |
| 2007/0067297 A1 | 3/2007 | Kublickis |
| 2007/0073625 A1* | 3/2007 | Shelton ................ G06Q 90/00 705/59 |
| 2007/0073748 A1* | 3/2007 | Barney ................ G06F 16/95 707/E17.093 |
| 2007/0130112 A1 | 6/2007 | Lin |
| 2007/0136116 A1 | 6/2007 | Germeraad et al. |
| 2007/0136373 A1 | 6/2007 | Piasecki |

(56) References Cited

U.S. PATENT DOCUMENTS

| | | |
|---|---|---|
| 2007/0150298 A1 | 6/2007 | Barney |
| 2007/0174041 A1 | 7/2007 | Yeske |
| 2007/0192272 A1 | 8/2007 | Elfayoumy et al. |
| 2007/0198578 A1* | 8/2007 | Lundberg ............... G06F 16/35 |
| 2007/0208669 A1* | 9/2007 | Rivette ............... G06Q 50/184 |
| | | 705/310 |
| 2007/0208719 A1 | 9/2007 | Tran |
| 2007/0219853 A1 | 9/2007 | Van Luchene et al. |
| 2007/0219988 A1 | 9/2007 | Mueller et al. |
| 2007/0220041 A1* | 9/2007 | Van Luchene ......... G06Q 10/06 |
| | | 707/999.102 |
| 2007/0220042 A1 | 9/2007 | Mueller et al. |
| 2007/0239705 A1 | 10/2007 | Hunt et al. |
| 2007/0245380 A1 | 10/2007 | Dommer et al. |
| 2007/0250468 A1 | 10/2007 | Pieper |
| 2007/0250488 A1 | 10/2007 | Lee |
| 2007/0029461 A1 | 12/2007 | Ching |
| 2007/0288256 A1* | 12/2007 | Speier ................... G06Q 10/06 |
| | | 715/208 |
| 2007/0288856 A1 | 12/2007 | Butlin et al. |
| 2008/0005103 A1* | 1/2008 | Ratcliffe ............... G06Q 10/10 |
| | | 707/999.005 |
| 2008/0005144 A1 | 1/2008 | Katz et al. |
| 2008/0016069 A1 | 1/2008 | Holt |
| 2008/0030800 A1 | 2/2008 | Matsukawa et al. |
| 2008/0033741 A1* | 2/2008 | Van Luchene ......... G06Q 10/00 |
| | | 705/310 |
| 2008/0077570 A1 | 3/2008 | Tang et al. |
| 2008/0077577 A1 | 3/2008 | Byrne et al. |
| 2008/0097931 A1 | 4/2008 | Grotto |
| 2008/0104032 A1 | 5/2008 | Sarkar |
| 2008/0109454 A1 | 5/2008 | Willse et al. |
| 2008/0140644 A1 | 6/2008 | Franks et al. |
| 2008/0154767 A1 | 6/2008 | D'agostino |
| 2008/0154848 A1 | 6/2008 | Haslam et al. |
| 2008/0162444 A1 | 7/2008 | Lee et al. |
| 2008/0183518 A1 | 7/2008 | Jiang et al. |
| 2008/0195568 A1 | 8/2008 | Chen et al. |
| 2008/0195595 A1 | 8/2008 | Masuyama et al. |
| 2008/0195601 A1 | 8/2008 | Ntoulas et al. |
| 2008/0195604 A1* | 8/2008 | Sears ................... G06F 16/382 |
| | | 707/999.005 |
| 2008/0216013 A1 | 9/2008 | Lundberg et al. |
| 2008/0243799 A1 | 10/2008 | Rozich |
| 2008/0244429 A1 | 10/2008 | Stading |
| 2008/0281748 A1 | 11/2008 | Newman |
| 2008/0281821 A1 | 11/2008 | Chen et al. |
| 2008/0301138 A1 | 12/2008 | Hasan et al. |
| 2008/0306952 A1 | 12/2008 | Lynn et al. |
| 2008/0312981 A1 | 12/2008 | Marlett et al. |
| 2009/0006328 A1 | 1/2009 | Lindberg et al. |
| 2009/0006379 A1 | 1/2009 | Shen et al. |
| 2009/0007200 A1 | 1/2009 | Amento et al. |
| 2009/0012827 A1 | 1/2009 | Avrunin |
| 2009/0012937 A1 | 1/2009 | Lee et al. |
| 2009/0030713 A1 | 1/2009 | Venkatachalam |
| 2009/0043797 A1 | 2/2009 | Dorie et al. |
| 2009/0048925 A1 | 2/2009 | Song et al. |
| 2009/0055721 A1 | 2/2009 | Kahn |
| 2009/0063468 A1 | 3/2009 | Berg |
| 2009/0070301 A1 | 3/2009 | McLean et al. |
| 2009/0083049 A1 | 3/2009 | Sciarrino et al. |
| 2009/0150326 A1 | 6/2009 | Sheets |
| 2009/0157717 A1 | 6/2009 | Palahnuk et al. |
| 2009/0164431 A1 | 6/2009 | Zivkovic et al. |
| 2009/0177656 A1 | 7/2009 | Carter |
| 2009/0216994 A1 | 8/2009 | Hsieh et al. |
| 2009/0228578 A1 | 9/2009 | Demers et al. |
| 2009/0228777 A1* | 9/2009 | Henry ................... G06F 16/40 |
| | | 707/999.005 |
| 2009/0248468 A1 | 10/2009 | Cronin et al. |
| 2009/0257396 A1 | 10/2009 | Eliezer et al. |
| 2009/0259459 A1* | 10/2009 | Ceusters ............... G06F 40/30 |
| | | 704/9 |
| 2009/0259506 A1 | 10/2009 | Barney |
| 2009/0265274 A1 | 10/2009 | Hahn-Carlson et al. |
| 2009/0282054 A1 | 11/2009 | Casey |
| 2010/0005094 A1* | 1/2010 | Poltorak ............... G06Q 50/184 |
| | | 707/E17.014 |
| 2010/0023386 A1 | 1/2010 | Avisar et al. |
| 2010/0030680 A1 | 2/2010 | Malackowski et al. |
| 2010/0057533 A1 | 3/2010 | Martinez Ruiz et al. |
| 2010/0077007 A1 | 3/2010 | White et al. |
| 2010/0082395 A1 | 4/2010 | De Andrade |
| 2010/0106752 A1 | 4/2010 | Eckardt, III et al. |
| 2010/0114587 A1 | 5/2010 | Masuyama et al. |
| 2010/0131513 A1 | 5/2010 | Lundberg et al. |
| 2010/0174698 A1 | 7/2010 | Odland et al. |
| 2010/0179948 A1 | 7/2010 | Xie et al. |
| 2010/0180223 A1 | 7/2010 | Speier |
| 2010/0185689 A1 | 7/2010 | Hu et al. |
| 2010/0191622 A1 | 7/2010 | Reiss et al. |
| 2010/0191702 A1 | 7/2010 | Hofmann |
| 2010/0235337 A1 | 9/2010 | Shanahan et al. |
| 2010/0250479 A1 | 9/2010 | Carter |
| 2010/0287478 A1 | 11/2010 | Avasarala et al. |
| 2010/0306825 A1 | 12/2010 | Spivack |
| 2010/0324991 A1 | 12/2010 | Colledge et al. |
| 2010/0332511 A1 | 12/2010 | Stockton et al. |
| 2011/0029476 A1 | 2/2011 | Kasravi et al. |
| 2011/0047166 A1 | 2/2011 | Stading et al. |
| 2011/0055192 A1 | 3/2011 | Tang et al. |
| 2011/0072014 A1 | 3/2011 | Lundberg et al. |
| 2011/0072024 A1 | 3/2011 | Barney |
| 2011/0093449 A1 | 4/2011 | Belenzon et al. |
| 2011/0099084 A1 | 4/2011 | Horn et al. |
| 2011/0099186 A1 | 4/2011 | Zohar et al. |
| 2011/0112824 A1 | 5/2011 | Sayers et al. |
| 2011/0113385 A1 | 5/2011 | Sayers et al. |
| 2011/0119134 A1 | 5/2011 | Zivkovic et al. |
| 2011/0143811 A1* | 6/2011 | Rodriguez ............ H04N 1/00244 |
| | | 455/556.1 |
| 2011/0153509 A1 | 6/2011 | Lundberg et al. |
| 2011/0153852 A1 | 6/2011 | Thomas |
| 2011/0179032 A1 | 7/2011 | Ceusters et al. |
| 2011/0191310 A1 | 8/2011 | Liao et al. |
| 2011/0191314 A1 | 8/2011 | Howes et al. |
| 2011/0197121 A1 | 8/2011 | Kletter |
| 2011/0202334 A1 | 8/2011 | Abir |
| 2011/0212717 A1* | 9/2011 | Rhoads ................ G06F 16/9535 |
| | | 455/418 |
| 2011/0225159 A1 | 9/2011 | Murray |
| 2011/0231449 A1 | 9/2011 | Ashley et al. |
| 2011/0246379 A1 | 10/2011 | Maddox et al. |
| 2011/0246452 A1* | 10/2011 | Johnston ............... G06Q 30/06 |
| | | 707/769 |
| 2011/0246473 A1* | 10/2011 | Stec ..................... G06F 16/34 |
| | | 707/741 |
| 2011/0246486 A1 | 10/2011 | Peng et al. |
| 2011/0258177 A1 | 10/2011 | Wu et al. |
| 2011/0289096 A1 | 11/2011 | Barney |
| 2011/0302172 A1 | 12/2011 | Chandrasekar et al. |
| 2011/0307499 A1 | 12/2011 | Elias et al. |
| 2011/0320367 A1 | 12/2011 | Kan et al. |
| 2011/0320582 A1 | 12/2011 | Lewis |
| 2012/0016859 A1 | 1/2012 | Sears |
| 2012/0078913 A1 | 3/2012 | Muni et al. |
| 2012/0078979 A1 | 3/2012 | Ghimire |
| 2012/0095984 A1 | 4/2012 | Wren-hilton et al. |
| 2012/0095993 A1 | 4/2012 | Shau |
| 2012/0096027 A1 | 4/2012 | Coult |
| 2012/0102427 A1 | 4/2012 | Fenster et al. |
| 2012/0109642 A1 | 5/2012 | Stobbs et al. |
| 2012/0116989 A1 | 5/2012 | Lai et al. |
| 2012/0117082 A1* | 5/2012 | Koperda ............ G06F 16/24578 |
| | | 707/E17.084 |
| 2012/0130773 A1 | 5/2012 | Abu-ghazalah et al. |
| 2012/0130993 A1 | 5/2012 | Lundberg et al. |
| 2012/0174017 A1 | 7/2012 | Tidwell et al. |
| 2012/0215768 A1 | 8/2012 | Zellweger |
| 2012/0221580 A1 | 8/2012 | Barney |
| 2012/0239591 A1 | 9/2012 | Powell, Jr. et al. |
| 2012/0240026 A1 | 9/2012 | Iyer et al. |

(56) References Cited

U.S. PATENT DOCUMENTS

| | | |
|---|---|---|
| 2012/0254155 A1 | 10/2012 | Heim et al. |
| 2012/0259787 A1* | 10/2012 | Speier .................... G06Q 10/10 705/310 |
| 2012/0002841 A1 | 11/2012 | Lundberg |
| 2012/0278244 A1 | 11/2012 | Lee et al. |
| 2012/0290487 A1 | 11/2012 | Lee et al. |
| 2012/0317041 A1 | 12/2012 | Shaffer et al. |
| 2013/0007578 A1 | 1/2013 | Shreck et al. |
| 2013/0013645 A1 | 1/2013 | Dias et al. |
| 2013/0054581 A1 | 2/2013 | Tawfick et al. |
| 2013/0084009 A1 | 4/2013 | Lundberg |
| 2013/0085911 A1 | 4/2013 | Lundberg |
| 2013/0085912 A1 | 4/2013 | Lundberg |
| 2013/0085929 A1 | 4/2013 | Lundberg |
| 2013/0085933 A1 | 4/2013 | Lundberg |
| 2013/0085934 A1 | 4/2013 | Lundberg |
| 2013/0085946 A1 | 4/2013 | Lundberg |
| 2013/0085947 A1 | 4/2013 | Lundberg |
| 2013/0085948 A1 | 4/2013 | Lundberg |
| 2013/0085949 A1 | 4/2013 | Lundberg |
| 2013/0085950 A1 | 4/2013 | Marais |
| 2013/0085964 A1 | 4/2013 | Marais |
| 2013/0086032 A1 | 4/2013 | Lundberg |
| 2013/0086033 A1 | 4/2013 | Lundberg |
| 2013/0086042 A1 | 4/2013 | Lundberg |
| 2013/0086043 A1 | 4/2013 | Lundberg |
| 2013/0086044 A1 | 4/2013 | Lundberg |
| 2013/0086045 A1 | 4/2013 | Lundberg |
| 2013/0086046 A1 | 4/2013 | Lundberg |
| 2013/0086047 A1 | 4/2013 | Lundberg et al. |
| 2013/0086048 A1 | 4/2013 | Lundberg et al. |
| 2013/0086049 A1 | 4/2013 | Lundberg et al. |
| 2013/0086050 A1 | 4/2013 | Lundberg |
| 2013/0086070 A1 | 4/2013 | Lundberg |
| 2013/0086080 A1 | 4/2013 | Lundberg |
| 2013/0086084 A1 | 4/2013 | Lundberg |
| 2013/0086093 A1 | 4/2013 | Lundberg |
| 2013/0086094 A1 | 4/2013 | Lundberg |
| 2013/0086106 A1 | 4/2013 | Lundberg |
| 2013/0086117 A1 | 4/2013 | Lundberg |
| 2013/0086120 A1 | 4/2013 | Lundberg et al. |
| 2013/0086257 A1 | 4/2013 | Lundberg |
| 2013/0086469 A1 | 4/2013 | Lundberg |
| 2013/0132302 A1 | 5/2013 | Lundberg et al. |
| 2013/0144895 A1 | 6/2013 | Cameron |
| 2013/0282409 A1 | 10/2013 | Lundberg et al. |
| 2013/0282571 A1 | 10/2013 | Lundberg |
| 2013/0282599 A1 | 10/2013 | Kang et al. |
| 2013/0282735 A1 | 10/2013 | Pedersen et al. |
| 2013/0346116 A1 | 12/2013 | Lundberg |
| 2013/0346265 A1 | 12/2013 | Lundberg |
| 2013/0346323 A1 | 12/2013 | Lundberg |
| 2013/0346505 A1 | 12/2013 | Lundberg |
| 2014/0032513 A1 | 1/2014 | Gaither |
| 2014/0008921 A1 | 3/2014 | Lundberg |
| 2014/0379388 A1 | 12/2014 | Lundberg et al. |
| 2014/0379686 A1 | 12/2014 | Vadlamani et al. |
| 2015/0066842 A1 | 3/2015 | Lundberg |
| 2015/0134549 A1 | 5/2015 | Lundberg et al. |
| 2015/0149368 A1 | 5/2015 | Lundberg |
| 2015/0169777 A1 | 6/2015 | Lundberg |
| 2015/0347604 A1 | 12/2015 | Lundberg |
| 2015/0347605 A1 | 12/2015 | Lundberg et al. |
| 2015/0348217 A1 | 12/2015 | Lundberg |
| 2015/0371349 A1 | 12/2015 | Lundberg et al. |
| 2016/0078109 A1 | 3/2016 | Lundberg et al. |
| 2016/0154863 A1 | 6/2016 | Lundberg |
| 2016/0358274 A1 | 12/2016 | George |
| 2016/0378766 A1 | 12/2016 | Lundberg |
| 2017/0046398 A1* | 2/2017 | Beretich, Jr. ..... G06F 16/24575 |
| 2017/0075929 A1 | 3/2017 | Lundberg |
| 2017/0213291 A1 | 7/2017 | Plow et al. |
| 2017/0316036 A1 | 11/2017 | Lundberg |
| 2017/0351682 A1 | 12/2017 | Lundberg |
| 2018/0137194 A1 | 5/2018 | Lundberg |
| 2018/0157665 A1 | 6/2018 | Lundberg et al. |
| 2018/0204180 A1 | 7/2018 | Lundberg et al. |
| 2020/0050609 A1 | 2/2020 | Lundberg |
| 2020/0210440 A1 | 7/2020 | Lundberg et al. |
| 2020/0279222 A1 | 9/2020 | Lundberg et al. |
| 2022/0230137 A1 | 7/2022 | Lundberg et al. |

FOREIGN PATENT DOCUMENTS

| | | | |
|---|---|---|---|
| AU | 2013270517 B2 | 4/2016 | |
| EP | 0638870 A1 | 2/1995 | |
| GB | 2156112 A | 10/1985 | |
| GB | 2260007 A | 3/1993 | |
| WO | WO-9816890 A1 | 4/1998 | |
| WO | WO-0054185 A1 | 9/2000 | |
| WO | WO-0243306 A2 | 5/2002 | |
| WO | WO-02080039 A1 | 10/2002 | |
| WO | WO-2006015110 A2 | 2/2006 | |
| WO | WO-2006015110 A3 | 2/2006 | |
| WO | WO-2006128183 A2 | 11/2006 | |
| WO | WO-2006128183 A3 | 11/2006 | |
| WO | WO-2007014341 A2 | 2/2007 | |
| WO | WO-2007014341 A2 * | 2/2007 | ....... G06F 16/24575 |
| WO | WO-2007014341 A3 | 2/2007 | |
| WO | WO-2007014341 C2 | 2/2007 | |
| WO | WO-2011123517 A1 | 10/2011 | |

OTHER PUBLICATIONS

"U.S. Appl. No. 12/605,030, Appeal Decision dated Sep. 1, 2017", 14 pgs.

"U.S. Appl. No. 12/605,030, Final Office Action dated May 21, 2012", 10 pgs.

"U.S. Appl. No. 12/605,030, Final Office Action dated Jul. 16, 2014", 16 pgs.

"U.S. Appl. No. 12/605,030, Non Final Office Action dated Oct. 7, 2011", 12 pgs.

"U.S. Appl. No. 12/605,030, Non Final Office Action dated Nov. 7, 2013", 16 pgs.

"U.S. Appl. No. 12/605,030, Response filed Feb. 7, 2012 to Non Final Office Action dated Oct. 7, 2011", 9 pgs.

"U.S. Appl. No. 12/605,030, Response Filed May 7, 2014 to Non Final Office Action dated Nov. 7, 2013", 8 pgs.

"U.S. Appl. No. 12/605,030, Response filed Oct. 22, 2012 to Final Office Action dated May 21, 2012", 8 pgs.

"U.S. Appl. No. 13/309,200, Appeal Brief Filed Jun. 8, 2015", 17 pgs.

"U.S. Appl. No. 13/309,200, Appeal Decision dated Aug. 28, 2017", 12 pgs.

"U.S. Appl. No. 13/309,200, Corrected Notice of Allowability dated Jan. 9, 2019", 2 pgs.

"U.S. Appl. No. 13/309,200, Final Office Action dated Jan. 8, 2015", 14 pgs.

"U.S. Appl. No. 13/309,200, Final Office Action dated Jan. 14, 2014", 15 pgs.

"U.S. Appl. No. 13/309,200, Final Office Action dated Jun. 18, 2018", 18 pgs.

"U.S. Appl. No. 13/309,200, Non Final Office Action dated Jul. 2, 2013", 14 pgs.

"U.S. Appl. No. 13/309,200, Non Final Office Action dated Sep. 10, 2012", 12 pgs.

"U.S. Appl. No. 13/309,200, Non Final Office Action dated Sep. 24, 2014", 14 pgs.

"U.S. Appl. No. 13/309,200, Non Final Office Action dated Dec. 4, 2017", 17 pgs.

"U.S. Appl. No. 13/309,200, Notice of Allowance dated Dec. 6, 2018", 9 pgs.

"U.S. Appl. No. 13/309,200, Preliminary Amendment filed Dec. 8, 2011", 8 pgs.

"U.S. Appl. No. 13/309,200, Response filed Jan. 2, 2014 to Non Final Office Action dated Jul. 2, 2013", 12 pgs.

"U.S. Appl. No. 13/309,200, Response filed Mar. 11, 2013 to Non Final Office Action dated Sep. 10, 2012", 13 pgs.

(56) References Cited

OTHER PUBLICATIONS

"U.S. Appl. No. 13/309,200, Response filed Apr. 4, 2018 to Non Final Office Action dated Dec. 4, 2017", 11 pgs.
"U.S. Appl. No. 13/309,200, Response filed Jul. 10, 2014 to Final Office Action dated Jan. 14, 2014", 13 pgs.
"U.S. Appl. No. 13/309,200, Response filed Jan. 17, 2018 to Final Office Action dated Jun. 18, 2018", 38 pgs.
"U.S. Appl. No. 13/309,200, Response filed Oct. 30, 2017 to Final Office Action dated Jan. 8, 2017", 12 pgs.
"U.S. Appl. No. 13/309,200, Response filed Dec. 23, 2014 to Non Final Office Action dated Sep. 24, 2014", 9 pgs.
"U.S. Appl. No. 13/573,803, Appeal Brief filed Dec. 29, 2015", 20 pgs.
"U.S. Appl. No. 13/573,803, Appeal Decision dated Jul. 28, 2017", 24 pgs.
"U.S. Appl. No. 13/573,803, Final Office Action dated Apr. 7, 2015", 16 pgs.
"U.S. Appl. No. 13/573,803, Non Final Office Action dated Sep. 15, 2014", 15 pgs.
"U.S. Appl. No. 13/573,803, Non Final Office Action dated Dec. 5, 2013", 16 pgs.
"U.S. Appl. No. 13/573,803, Reply Brief filed Jul. 13, 2016", 6 pgs.
"U.S. Appl. No. 13/573,803, Response filed Jun. 5, 2014 to Non Final Office Action dated Dec. 5, 2013", 12 pgs.
"U.S. Appl. No. 13/573,803, Response filed Dec. 15, 2014 to Non Final Office Action dated Sep. 15, 2014", 12 pgs.
"U.S. Appl. No. 13/573,804, Final Office Action dated Mar. 23, 2015", 16 pgs.
"U.S. Appl. No. 13/573,804, Non Final Office Action dated Oct. 20, 2014", 15 pgs.
"U.S. Appl. No. 13/573,804, Response filed Jan. 20, 2015 to Non Final Office Action dated Oct. 20, 2014", 15 pgs.
"U.S. Appl. No. 13/573,804, Response filed Aug. 29, 2014 to Restriction Requirement dated Jun. 30, 2014", 8 pgs.
"U.S. Appl. No. 13/573,804, Restriction Requirement dated Jun. 30, 2014", 5 pgs.
"U.S. Appl. No. 14/010,376, Appeal Brief filed Apr. 19, 2016", 19 pgs.
"U.S. Appl. No. 14/010,376, Appeal Decision dated Sep. 8, 2017", 17 pgs.
"U.S. Appl. No. 14/010,376, Final Office Action dated Aug. 19, 2015", 13 pgs.
"U.S. Appl. No. 14/010,376, Non Final Office Action dated Mar. 24, 2015", 10 pgs.
"U.S. Appl. No. 14/010,376, Reply Brief filed Nov. 22, 2016", 5 pgs.
"U.S. Appl. No. 14/010,376, Response filed Jun. 24, 2015 to Non Final Office Action dated Mar. 24, 2015", 10 pgs.
"U.S. Appl. No. 14/010,380, Appeal Decision dated Sep. 27, 2017", 18 pgs.
"U.S. Appl. No. 14/010,380, Examiners Answer dated Nov. 9, 2016", 8 pgs.
"U.S. Appl. No. 14/010,380, Final Office Action dated Oct. 6, 2015", 11 pgs.
"U.S. Appl. No. 14/010,380, Non Final Office Action dated Apr. 15, 2015", 11 pgs.
"U.S. Appl. No. 14/010,380, Reply Brief filed Jan. 9, 2017", 6 pgs.
"U.S. Appl. No. 14/010,380, Response filed Aug. 17, 2015 to Non Final Office Action dated Apr. 15, 2015", 11 pgs.
"U.S. Appl. No. 14/010,391, Appeal Brief filed Aug. 15, 2016", 23 pgs.
"U.S. Appl. No. 14/010,391, Appeal Decision dated Oct. 25, 2017", 19 pgs.
"U.S. Appl. No. 14/010,391, Examiners Answer dated Nov. 9, 2016", 10 pgs.
"U.S. Appl. No. 14/010,391, Final Office Action dated Sep. 15, 2015", 11 pgs.
"U.S. Appl. No. 14/010,391, Non Final Office Action dated Mar. 23, 2015", 11 pgs.
"U.S. Appl. No. 14/010,391, Reply Brief filed Jan. 9, 2017", 6 pgs.
"U.S. Appl. No. 14/010,391, Response filed Jul. 22, 2015 to Non Final Office Action dated Mar. 23, 2015", 10 pgs.
"U.S. Appl. No. 14/010,400, Appeal Brief filed Aug. 8, 2016", 17 pgs.
"U.S. Appl. No. 14/010,400, Appeal Decision dated Nov. 3, 2017", 16 pgs.
"U.S. Appl. No. 14/010,400, Examiners Answer dated Nov. 9, 2016", 9 pgs.
"U.S. Appl. No. 14/010,400, Final Office Action dated Sep. 10, 2015", 9 pgs.
"U.S. Appl. No. 14/010,400, Non Final Office Action dated Apr. 22, 2015", 11 pgs.
"U.S. Appl. No. 14/010,400, Response filed Jul. 22, 2015 to Non Final Office Action dated Apr. 22, 2015", 10 pgs.
"U.S. Appl. No. 14/010,903, Examiners Answer dated Nov. 9, 2016", 9 pgs.
"U.S. Appl. No. 14/483,903, Appeal Brief filed Oct. 11, 2016", 21 pgs.
"U.S. Appl. No. 14/483,903, Appeal Decision dated Sep. 25, 2017", 18 pgs.
"U.S. Appl. No. 14/483,903, Final Office Action dated Feb. 10, 2016", 11 pgs.
"U.S. Appl. No. 14/483,903, Non Final Office Action dated Sep. 1, 2015", 10 pgs.
"U.S. Appl. No. 14/483,903, Reply Brief filed Jan. 9, 2017", 6 pgs.
"U.S. Appl. No. 14/483,903, Response filed Jan. 4, 2016 to Non Final Office Action dated Sep. 1, 2015", 11 pgs.
"U.S. Appl. No. 15/801,056, Corrected Notice of Allowability dated Nov. 7, 2019", 2 pgs.
"U.S. Appl. No. 15/801,056, Corrected Notice of Allowability dated Dec. 17, 2019", 2 pgs.
"U.S. Appl. No. 15/801,056, Final Office Action dated Jan. 25, 2019", 12 pgs.
"U.S. Appl. No. 15/801,056, Non Final Office Action dated Jul. 11, 2018", 13 pgs.
"U.S. Appl. No. 15/801,056, Notice of Allowance dated Sep. 13, 2019", 11 pgs.
"U.S. Appl. No. 15/801,056, Preliminary Amendment filed Apr. 30, 2018", 9 pgs.
"U.S. Appl. No. 15/801,056, Response filed Jul. 25, 2019 to Final Office Action dated Jan. 25, 2019", 10 pgs.
"U.S. Appl. No. 16/352,364, Corrected Notice of Allowability dated Feb. 26, 2021", 7 pgs.
"U.S. Appl. No. 16/352,364, Non Final Office Action dated Aug. 27, 2020", 10 pgs.
"U.S. Appl. No. 16/352,364, Notice of Allowance dated Feb. 8, 2021", 10 pgs.
"U.S. Appl. No. 16/352,364, Preliminary Amendment filed Dec. 27, 2019", 8 pgs.
"U.S. Appl. No. 16/352,364, Response filed Jan. 27, 2021 to Non Final Office Action dated Aug. 27, 2020", 9 pgs.
"U.S. Appl. No. 16/730,678, Preliminary Amendment filed May 26, 2020", 8 pgs.
"Casefinder Manual, Ch. 1: Overview; Ch. 8: Hyperlinking", [Online]. Retrieved from the Internet: <URL: http://web.archive.org/web/20040419155315/http://www.casefinder.com/downloads/manual-5.00.pdf>, (Archived Apr. 19, 2004), 13 pgs.
"ClaimMaster Software User Guide", ClaimMaster Software LLP, (2009), 36 pgs.
"Definition of Timeline", [Online] Retrieved from the Internet: <URL: https://www.yourdictionary.com/>, (Mar. 17, 2015), 1 pg.
"East Text Search Training", (Jan. 2000), 155 pgs.
"Google Definition: System", [Online] Retrieved from the Internet: <URL: http://www.google.com>, (Retrieved Aug. 13, 2012), 3 pgs.
"Module", Dictionary.com, [Online] Retrieved from Internet: <URL: http://dictionary.reference.com/browse/module>, (Retrieved Aug. 13, 2012), 5 pgs.
"Notice from the European Patent Office dated Oct. 1, 2007 concerning business methods", Official Journal of the European Patent Office, 30(11), (Nov. 1, 2007), 592-593.
"Patent Rank: A Network-Dominant Logic for Innovation", Submitted to Marketing Science, manuscript MKSC-Oct 10-0356, (Oct. 2010), 36 pgs.

(56) References Cited

OTHER PUBLICATIONS

"PatentOptimizer", LexisNexis, (2009), 2 pgs.

"PatentPleeze Overview", [Online]. Retrieved from the Internet: <URL: http://web.archive.org/web/20060824063540/web.ncf.ca/ex133/patnow.pdf>, (Archived Aug. 24, 2006), 33 pgs.

"Using Citation Link", Delphion, [Online]. Retrieved from the Internet: <URL: http://web.archive.org/web/20041204224023/www.delphion.com/help/citelink_help>, (Archived Dec. 4, 2004), 10 pgs.

"What is Pair?", USPTO, [Online]. Retrieved from the Internet: <URL: <http://web.archive.org/web/20040606224528/pair.uspto.gov/cgi-bin/final/help.pl>, (Archived Jun. 6, 2004), 9 pgs.

Brinn, Michael W, et al., "Investigation of forward citation count as a patent analysis method", Proceedings of the 2003 Systems and Information Engineering Design Symposium, (2003), 6 pgs.

Broekstra, Joen, et al., "Sesame: A Generic Architecture for Storing and Querying RDF and RDF Schema", Int'l Semantic Web Conference (ISWC). Lecture Notes in Computer Science, vol. 2342. Springer, Berlin, Heidelberg, (2002), 16 pgs.

Chang, Muchiu, "Sun Tzu and sustainable competitive advantage", IEEE Int'l Engineering Management Conference, vol. 1, (Oct. 18-21, 2004), 153 -157.

Davis, Lee, "The Strategic Use of Patents in International Business", The 28th Annual EIBA Conference, Athens, Greece, (Dec. 2002), 27 pgs.

East, T. W, "Patent Claims—How to Keep Track of Them", IEEE Aerospace and Electronic Systems Magazine, 10(8), (Aug. 1995), 32-33.

Fall, C.J., et al., "Literature Survey: Issue to be considered in the automatic classifications of patents", World Intellectual Property Organization, (Oct. 2002), 64 pgs.

Fenton, Gillian M., et al., "Freedom to Operate: The Law Firms Approach and Role", In: Intellectual Property Management in Health and Agricultural Innovation: A Handbook of Best Practices, [online], [retrieved on Mar. 17, 2015], Retrieved from the Internet: <URL: www.iphandbook.org/handbook/ch14/p04/index_print.html>, (2007), 11 pgs.

Gipp, Bela, et al., "Comparative Evaluation of Text- and Citation based Plagiarism Detection Approaches using GuttenPlag", [Online] Retrieved from the Internet: <URL: http://gipp.com/wp-content/papercite-data/pdf/gipp11b.pdf>, (2011), 4 pgs.

Gruber, T R, et al., "A Translation Approach to Portable Ontology Specifications", KSL Report KSL-92-71, Knowledge Systems Laboratory, Stanford University, (1993), 24 pgs.

Hoover, A. E, "Electronic Filing Top 10 Wish List", IP Today, (Jul. 2006), 2 pgs.

Hutzell, Paula, "Image File Wrapper (IFW) Processing", USPTO PPT Presentation, (May 8, 2003), 25 pgs.

Indukuri, Kishore Varma, et al., "Similarity Analysis of Patent Claims Using Natural Language Processing Techniques", International Conference on Computational Intelligence and Multimedia Applications, (2007), 169-175.

Jagalla, Christopher, "Searching USPTO Assignments on the Web", (Nov. 20, 2010), 4 pgs.

Langan-Fox, Janice, "Team Mental Models: Techniques, Methods, and Analytic Approaches", The Journal of the Human Factors and Ergonomics Society, vol. 42, No. 2, (2000), 30 pgs.

Larkey, L. S, "A Patent Search and Classification System", Proc. of the 4th ACM Conference of Digital Libraries, (1999), 179-187.

Larkey, Leah S, et al., "Collection Selection and Results Merging with Topically Organized U.S. Patents and TREC Data", Proc. of the 9th Int'l Conference on Information and Knowledge Management, (2000), 8 pgs.

Luo, Si, et al., "A Semisupervised Learning Method to Merge Search Engine results", ACM Transactions on Information Systems, vol. 21, No 4, (Oct. 2002), 35 pgs.

Madrid, Juan M, et al., "Incorporating Conceptual Matching in Search", Proc. of the 11th Conference on Information and Knowledge Management, (2002), 17 pgs.

Mahesh, K., "Ontology Development for Machine Translation: Ideology and Methodology", Technical Report MCCS-96-292, Computing Research Laboratory, New Mexico State University, (1996), 87 pgs.

Mase, H., et al., "Proposal of Two-Stage Patent Retrieval Method Considering the Claim Structure", ACM Transactions on Asian Language Information Processing (TALIP), 4(2), (Jun. 2005), 190-206.

Quinn, B., "Internet Access to Patent Application Files Now Available", Press Release, [Online]. Retrieved from the Internet: <URL: http://web.archive.org/web/20040813210925/http://www.uspto.gov/web/offices/com/speeches/04-13.htm>, (Aug. 2, 2004), 1 pg.

Sheremetyeva, B., et al., "Generating Patent Claims from Interactive Input", Proc. of the 8th International Workshop on Natural Language Generation (INLG), (Jun. 1996), 61-70.

Sheremetyeva, B., et al., "Knowledge Elicitation for Authoring Patent Claims", IEEE Computer, 29(7), (Jul. 1996), 57-63.

Sheremetyeva, B., "Natural Language Analysis of Patent Claims", Proc. of the ACL-2005 Workshop on Patent Corpus Processing, (2003), 66-73.

Sheremetyeva, S., et al., "On Creating Metadata with Authoring Tools", Proc. of the ECAI Workshop on Semantic Authoring, Annotation and Knowledge Markup (SAAKM), (Jul. 2002), 22-26.

Von-Wun, Soo, et al., "A Cooperative Multi-Agent Platform for Invention based on Ontology and Patent Document Analysis", The 9th International Conference on Computer Supported Cooperative Work in Design Proceedings, (2005), 411-416.

Woods, W. A, "Conceptual Indexing: A Better Way to Organize Knowledge", Sun Microsystems, Inc., (1997), 99 pgs.

"U.S. Appl. No. 10/710,656, Non Final Office Action dated Jan. 17, 2007", 16 pgs.

"U.S. Appl. No. 10/710,656, Response filed Nov. 13, 2006 to Restriction Requirement dated Oct. 13, 2006", 6 pgs.

"U.S. Appl. No. 10/710,656, Restriction Requirement dated Oct. 13, 2006", 9 pgs.

"U.S. Appl. No. 10/915,265, Advisory Action dated Jul. 31, 2008", 3 pgs.

"U.S. Appl. No. 10/915,265, Final Office Action dated Jul. 10, 2007", 26 pgs.

"U.S. Appl. No. 10/915,265, Final Office Action dated Jul. 14, 2008", 23 pgs.

"U.S. Appl. No. 10/915,265, Non Final Office Action dated Jan. 22, 2007", 15 pgs.

"U.S. Appl. No. 10/915,265, Non-Final Office Action dated Apr. 13, 2009", 27 pgs.

"U.S. Appl. No. 10/915,265, Non-Final Office Action dated Jun. 2, 2010", 29 pgs.

"U.S. Appl. No. 10/915,265, Non-Final Office Action dated Nov. 5, 2008", 27 pgs.

"U.S. Appl. No. 10/915,265, Non-Final Office Action dated Dec. 28, 2007", 25 pgs.

"U.S. Appl. No. 10/915,265, Response filed Feb. 5, 2009 to Non-Final Office Action dated Nov. 5, 2008", 11 pgs.

"U.S. Appl. No. 10/915,265, Response filed Apr. 28, 2008 to Non-Final Office Action dated Dec. 28, 2007", 14 pgs.

"U.S. Appl. No. 10/915,265, Response filed May 18, 2007 to Noon Final Office Action dated Jan. 22, 2007", 9 pgs.

"U.S. Appl. No. 10/915,265, Response filed Jul. 18, 2008 to Final Office Action dated Jul. 14, 2008", 17 pgs.

"U.S. Appl. No. 10/915,265, Response filed Sep. 1, 2010 to Non Final Office Action dated Jun. 2, 2010", 12 pgs.

"U.S. Appl. No. 10/915,265, Response filed Oct. 10, 2007 to Final Office Action filed Jul. 10, 2007", 15 pgs.

"U.S. Appl. No. 10/915,265, Response filed Nov. 13, 2006 to Restriction Requirement dated Oct. 11, 2006", 5 pgs.

"U.S. Appl. No. 10/915,265, Restriction Requirement dated Oct. 13, 2006", 10 pgs.

"U.S. Appl. No. 11/494,278, Final Office Action dated Mar. 23, 2009", 21 pgs.

"U.S. Appl. No. 11/494,278, Final Office Action dated Apr. 1, 2010", 20 pgs.

"U.S. Appl. No. 11/494,278, Non Final Office Action dated Oct. 8, 2009", 21 pgs.

(56) References Cited

OTHER PUBLICATIONS

"U.S. Appl. No. 11/494,278, Non-Final Office Action dated Mar. 5, 2008", 14 pgs.
"U.S. Appl. No. 11/494,278, Notice of Allowance dated May 3, 2011", 12 pgs.
"U.S. Appl. No. 11/494,278, Notice of Allowance dated Dec. 15, 2011", 14 pgs.
"U.S. Appl. No. 11/494,278, Notice of Non-Compliant Amendment dated Jun. 7, 2010", 2 pgs.
"U.S. Appl. No. 11/494,278, Preliminary Amendment filed Oct. 30, 2007", 6 pgs.
"U.S. Appl. No. 11/494,278, Response filed Feb. 10, 2010 to Non Final Office Action dated Oct. 8, 2009", 8 pgs.
"U.S. Appl. No. 11/494,278, Response filed Jun. 2, 2010 to Final Office Action dated Apr. 1, 2010", 7 pgs.
"U.S. Appl. No. 11/494,278, Response filed Jun. 5, 2008 to Non-Final Office Action dated Mar. 5, 2008", 12 pgs.
"U.S. Appl. No. 11/494,278, Response filed Jun. 9, 10 to Notice of Non-Compliant Amendment dated Jun. 7, 2010", 7 pgs.
"U.S. Appl. No. 11/494,278, Response filed Jun. 23, 2009 to Final Office Action dated Mar. 23, 2009", 8 pgs.
"U.S. Appl. No. 11/888,632, Amendment filed Jun. 12, 2012", 8 pgs.
"U.S. Appl. No. 11/888,632, Appeal Brief filed Jun. 4, 2015", 16 pgs.
"U.S. Appl. No. 11/888,632, Appeal Decision dated Jan. 19, 2017", 8 pgs.
"U.S. Appl. No. 11/888,632, Decision on Pre-Appeal Brief dated Mar. 9, 2012", 2 pgs.
"U.S. Appl. No. 11/888,632, Final Office Action dated Sep. 8, 2014", 12 pgs.
"U.S. Appl. No. 11/888,632, Final Office Action dated Oct. 19, 2011", 9 pgs.
"U.S. Appl. No. 11/888,632, Non Final Office Action dated Jan. 19, 2011", 12 pgs.
"U.S. Appl. No. 11/888,632, Non Final Office Action dated Jan. 24, 2014", 12 pgs.
"U.S. Appl. No. 11/888,632, Pre-Appeal Brief Request filed Feb. 21, 2012", 4 pgs.
"U.S. Appl. No. 11/888,632, Response filed Jun. 24, 2014 to Non Final Office Action dated Jan. 24, 2014", 9 pgs.
"U.S. Appl. No. 11/888,632, Response filed Jul. 19, 2011 to Non Final Office Action dated Jan. 19, 2011", 8 pgs.
"U.S. Appl. No. 11/888,632, Response filed Dec. 7, 2010, to Restriction Requirement dated Jul. 7, 2010", 7 pgs.
"U.S. Appl. No. 11/888,632, Restriction Requirement dated Jul. 7, 2010", 5 pgs.
"U.S. Appl. No. 11/915,718, Advisory Action dated Feb. 15, 2012", 3 pgs.
"U.S. Appl. No. 11/915,718, Final Office Action dated Dec. 30, 2011", 13 pgs.
"U.S. Appl. No. 11/915,718, Non Final Office Action dated May 26, 2011", 9 pgs.
"U.S. Appl. No. 11/915,718, Non Final Office Action dated Jul. 7, 2014", 17 pgs.
"U.S. Appl. No. 11/915,718, Notice of Non-Compliant Amendment dated Oct. 6, 2011", 2 pgs.
"U.S. Appl. No. 11/915,718, Preliminary Amendment filed Nov. 27, 2007", 2 pgs.
"U.S. Appl. No. 11/915,718, Response filed Feb. 8, 2012 to Final Office Action dated Dec. 30, 2011", 13 pgs.
"U.S. Appl. No. 11/915,718, Response filed Sep. 26, 2011 to Non-Final Office Action dated May 26, 2011", 9 pgs.
"U.S. Appl. No. 11/915,718, Response filed Oct. 11, 2011 to Notice of Non-Compliant Amendment dated Oct. 6, 2011", 4 pgs.
"U.S. Appl. No. 12/658,113, Non Final Office Action dated Feb. 28, 2011", 26 pgs.
"U.S. Appl. No. 12/958,113, Examiner Interview Summary dated Aug. 24, 2015", 2 pgs.
"U.S. Appl. No. 12/958,113, Final Office Action dated Aug. 8, 2011", 26 pgs.
"U.S. Appl. No. 12/958,113, Final Office Action dated Nov. 3, 2014", 25 pgs.
"U.S. Appl. No. 12/958,113, Non Final Office Action dated Feb. 4, 2016", 25 pgs.
"U.S. Appl. No. 12/958,113, Non Final Office Action dated Apr. 30, 2014", 21 pgs.
"U.S. Appl. No. 12/958,113, Non Final Office Action dated Aug. 20, 2015", 25 pgs.
"U.S. Appl. No. 12/958,113, Notice of Allowance dated Mar. 1, 2017", 14 pgs.
"U.S. Appl. No. 12/958,113, Response filed Feb. 3, 2015 to Final Office Action dated Nov. 3, 2014", 11 pgs.
"U.S. Appl. No. 12/958,113, Response filed Feb. 8, 2012 to Final Office Action dated Aug. 8, 2011", 12 pgs.
"U.S. Appl. No. 12/958,113, Response filed May 3, 2016 to Non Final Office Action dated Feb. 4, 2016", 11 pgs.
"U.S. Appl. No. 12/958,113, Response filed May 20, 2011 to Non Final Office Action dated Feb. 28, 2011", 13 pgs.
"U.S. Appl. No. 12/958,113, Response filed Jul. 16, 2014 to Non Final Office Action dated Apr. 30, 2014", 12 pgs.
"U.S. Appl. No. 12/958,113, Response filed Nov. 6, 2015 to Non Final Office Action dated Aug. 20, 2015", 12 pgs.
"U.S. Appl. No. 13/109,080, Response filed Mar. 28, 2013 to Final Office Action dated Nov. 5, 2012", 10 pgs.
"U.S. Appl. No. 13/253,801, Final Office Action dated Jul. 18, 2013", 39 pgs.
"U.S. Appl. No. 13/253,801, Final Office Action dated Oct. 1, 2012", 41 pgs.
"U.S. Appl. No. 13/253,801, Non Final Office Action dated Apr. 10, 2013", 37 pgs.
"U.S. Appl. No. 13/253,801, Non Final Office Action dated Aug. 2, 2012", 42 pgs.
"U.S. Appl. No. 13/253,801, Notice of Allowance dated May 16, 2014", 10 pgs.
"U.S. Appl. No. 13/253,801, Notice of Allowance dated Jul. 16, 2014", 9 pgs.
"U.S. Appl. No. 13/253,801, Preliminary Amendment filed Oct. 5, 2011", 4 pgs.
"U.S. Appl. No. 13/253,801, Response filed Mar. 20, 2013 to Final Office Action dated Oct. 1, 2012", 16 pgs.
"U.S. Appl. No. 13/253,801, Response filed Jul. 5, 2013 to Non Final Office Action dated Apr. 10, 2013", 18 pgs.
"U.S. Appl. No. 13/253,801, Response filed Sep. 7, 2012 to Non Final Office Action datted Aug. 2, 2012", 17 pgs.
"U.S. Appl. No. 13/253,801, Response filed Nov. 18, 2013 to Final Office Action dated Jul. 18, 2013", 16 pgs.
"U.S. Appl. No. 13/253,811, Appeal Decision dated Nov. 1, 2017", 21 pgs.
"U.S. Appl. No. 13/253,811, Final Office Action dated Apr. 11, 2016", 14 pgs.
"U.S. Appl. No. 13/253,811, Final Office Action dated Jul. 2, 2013", 12 pgs.
"U.S. Appl. No. 13/253,811, Final Office Action dated Dec. 9, 2014", 13 pgs.
"U.S. Appl. No. 13/253,811, Non Final Office Action dated May 1, 2014", 13 pgs.
"U.S. Appl. No. 13/253,811, Non Final Office Action dated Jun. 18, 2015", 12 pgs.
"U.S. Appl. No. 13/253,811, Non Final Office Action dated Oct. 18, 2012", 12 pgs.
"U.S. Appl. No. 13/253,811, Preliminary Amendment filed Oct. 5, 2011", 4 pgs.
"U.S. Appl. No. 13/253,811, Response filed Jan. 2, 2014 to Final Office Action dated Jul. 2, 2013", 13 pgs.
"U.S. Appl. No. 13/253,811, Response filed Mar. 18, 2013 to Non Final Office Action dated Oct. 18, 2012", 13 pgs.
"U.S. Appl. No. 13/253,811, Response filed Apr. 9, 2015 to Final Office Action dated Dec. 9, 2014", 11 pgs.
"U.S. Appl. No. 13/253,811, Response filed Oct. 1, 2014 to Non Final Office Action dated May 1, 2014", 10 pgs.

(56) References Cited

OTHER PUBLICATIONS

"U.S. Appl. No. 13/253,811, Response filed Oct. 19, 2015 to Non Final Office Action dated Jun. 18, 2015", 9 pgs.
"U.S. Appl. No. 13/253,825, Examiner Interview Summary dated Aug. 13, 2013", 3 pgs.
"U.S. Appl. No. 13/253,825, Final Office Action dated Aug. 14, 2013", 35 pgs.
"U.S. Appl. No. 13/253,825, Final Office Action dated Nov. 21, 2012", 33 pgs.
"U.S. Appl. No. 13/253,825, Non Final Office Action dated Feb. 11, 2014", 45 pgs.
"U.S. Appl. No. 13/253,825, Non Final Office Action dated Apr. 25, 2013", 32 pgs.
"U.S. Appl. No. 13/253,825, Non Final Office Action dated Aug. 3, 2012", 32 pgs.
"U.S. Appl. No. 13/253,825, Notice of Allowance dated Oct. 23, 2014", 16 pgs.
"U.S. Appl. No. 13/253,825, Preliminary Amendment filed Oct. 5, 2011", 4 pgs.
"U.S. Appl. No. 13/253,825, Response filed Mar. 20, 2013 to Final Office Action dated Nov. 21, 2012", 17 pgs.
"U.S. Appl. No. 13/253,825, Response filed Jun. 11, 2014 to Non Final Office Action dated Feb. 11, 2014", 16 pgs.
"U.S. Appl. No. 13/253,825, Response filed Jul. 18, 2013 to Non Final Office Action dated Apr. 25, 2013", 16 pgs.
"U.S. Appl. No. 13/253,825, Response filed Oct. 3, 2013 to Final Office Action dated Aug. 14, 2013", 15 pgs.
"U.S. Appl. No. 13/253,846, Advisory Action dated Sep. 10, 2013", 3 pgs.
"U.S. Appl. No. 13/253,846, Decision on Pre-Appeal Brief Request dated Dec. 26, 2013", 2 pgs.
"U.S. Appl. No. 13/253,846, Final Office Action dated Apr. 12, 2016", 22 pgs.
"U.S. Appl. No. 13/253,846, Final Office Action dated Jun. 19, 2013", 21 pgs.
"U.S. Appl. No. 13/253,846, Final Office Action dated Oct. 23, 2014", 19 pgs.
"U.S. Appl. No. 13/253,846, Non Final Office Action dated Mar. 7, 2014", 20 pgs.
"U.S. Appl. No. 13/253,846, Non Final Office Action dated Jun. 25, 2015", 19 pgs.
"U.S. Appl. No. 13/253,846, Non Final Office Action dated Oct. 29, 2012", 12 pgs.
"U.S. Appl. No. 13/253,846, Pre-Appeal Brief Request filed Oct. 21, 2013", 4 pgs.
"U.S. Appl. No. 13/253,846, Response filed Jan. 23, 2015 to Final Office Action dated Oct. 23, 2014", 15 pgs.
"U.S. Appl. No. 13/253,846, Response filed Mar. 26, 2013 to Non Final Office Action dated Oct. 29, 2012", 17 pgs.
"U.S. Appl. No. 13/253,846, Response filed Aug. 16, 2013 to Final Office Action dated Jun. 19, 2013", 16 pgs.
"U.S. Appl. No. 13/253,846, Response filed Oct. 26, 2015 to Non Final Office Action dated Jun. 25, 2015", 14 pgs.
"U.S. Appl. No. 13/253,931, Advisory Action dated Sep. 11, 2013", 3 pgs.
"U.S. Appl. No. 13/253,931, Examiner Interview Summary dated Sep. 12, 2013", 2 pgs.
"U.S. Appl. No. 13/253,931, Final Office Action dated Jun. 20, 2013", 11 pgs.
"U.S. Appl. No. 13/253,931, Final Office Action dated Dec. 3, 2014", 11 pgs.
"U.S. Appl. No. 13/253,931, Non Final Office Action dated Apr. 18, 2014", 11 pgs.
"U.S. Appl. No. 13/253,931, Non Final Office Action dated Nov. 28, 2012", 13 pgs.
"U.S. Appl. No. 13/253,931, Response filed Mar. 26, 2013 to Non Final Office Action dated Nov. 28, 2012", 13 pgs.
"U.S. Appl. No. 13/253,931, Response filed Aug. 16, 2013 to Final Office Action dated Jun. 20, 2013", 14 pgs.
"U.S. Appl. No. 13/253,931, Response filed Sep. 18, 2014 to Non Final Office Action dated Apr. 18, 2014", 9 pgs.
"U.S. Appl. No. 13/253,931, Response filed Sep. 20, 2013 to Final Office Action dated Jun. 20, 2013", 13 pgs.
"U.S. Appl. No. 13/253,936, Appeal Brief filed Jan. 8, 2016", 10 pgs.
"U.S. Appl. No. 13/253,936, Appeal Brief filed Jun. 8, 2015", 13 pgs.
"U.S. Appl. No. 13/253,936, Appeal Decision dated Aug. 3, 2017", 10 pgs.
"U.S. Appl. No. 13/253,936, Corrected Notice of Allowability dated Sep. 21, 2020", 2 pgs.
"U.S. Appl. No. 13/253,936, Corrected Notice of Allowability dated Sep. 25, 2020", 2 pgs.
"U.S. Appl. No. 13/253,936, Corrected Notice of Allowability dated Oct. 2, 2020", 2 pgs.
"U.S. Appl. No. 13/253,936, Examiner's Answer to Appeal Brief dated Jun. 23, 2016", 6 pgs.
"U.S. Appl. No. 13/253,936, Final Office Action dated Feb. 4, 2015", 14 pgs.
"U.S. Appl. No. 13/253,936, Final Office Action dated Apr. 9, 2020", 14 pgs.
"U.S. Appl. No. 13/253,936, Final Office Action dated Jun. 24, 2013", 13 pgs.
"U.S. Appl. No. 13/253,936, Final Office Action dated Jul. 11, 2018", 18 pgs.
"U.S. Appl. No. 13/253,936, Non Final Office Action dated Feb. 7, 2018", 16 pgs.
"U.S. Appl. No. 13/253,936, Non Final Office Action dated Jun. 18, 2014", 14 pgs.
"U.S. Appl. No. 13/253,936, Non Final Office Action dated Aug. 9, 2019", 15 pgs.
"U.S. Appl. No. 13/253,936, Non Final Office Action dated Oct. 8, 2015", 15 pgs.
"U.S. Appl. No. 13/253,936, Non Final Office Action dated Nov. 28, 2012", 11 pgs.
"U.S. Appl. No. 13/253,936, Notice of Allowance dated Aug. 5, 2020", 13 pgs.
"U.S. Appl. No. 13/253,936, Reply Brief filed Aug. 23, 2016", 4 pgs.
"U.S. Appl. No. 13/253,936, Response filed Feb. 10, 2020 to Non Final Office Action dated Aug. 9, 2019", 10 pgs.
"U.S. Appl. No. 13/253,936, Response filed Mar. 27, 2013 to Non Final Office Action dated Nov. 28, 2012", 11 pgs.
"U.S. Appl. No. 13/253,936, Response filed May 10, 2019 to Final Office Action dated Jul. 11, 2018", 13 pgs.
"U.S. Appl. No. 13/253,936, Response Filed Jun. 7, 2018 to Non Final Office Action dated Feb. 7, 2018", 13 pgs.
"U.S. Appl. No. 13/253,936, Response filed Jul. 9, 2020 to Final Office Action datetd Apr. 9, 2020", 12 pgs.
"U.S. Appl. No. 13/253,936, Response filed Oct. 3, 2017 to Appeal Decision dated Aug. 3, 2017", 8 pgs.
"U.S. Appl. No. 13/253,936, Response filed Dec. 16, 2014 to Non Final Office Action dated Jun. 18, 2014", 9 pgs.
"U.S. Appl. No. 13/253,936, Response filed Dec. 23, 2013 to Final Office Action dated Jun. 24, 2013", 5 pgs.
"U.S. Appl. No. 13/253,941, Final Office Action dated Jun. 6, 2013", 16 pgs.
"U.S. Appl. No. 13/253,941, Final Office Action dated Dec. 26, 2014", 18 pgs.
"U.S. Appl. No. 13/253,941, Non Final Office Action dated May 7, 2014", 18 pgs.
"U.S. Appl. No. 13/253,941, Non Final Office Action dated Nov. 15, 2012", 14 pgs.
"U.S. Appl. No. 13/253,941, Response filed Apr. 15, 2013 to Non Final Office Action dated Nov. 15, 2012", 13 pgs.
"U.S. Appl. No. 13/253,941, Response filed Nov. 6, 2013 to Final Office Action dated Jun. 6, 2013", 11 pgs.
"U.S. Appl. No. 13/253,941, Response filed Nov. 7, 2014 to Non Final Office Action dated May 7, 2014", 10 pgs.
"U.S. Appl. No. 13/253,846, Response filed Aug. 6, 2014 to Non Final Office Action dated Mar. 7, 2014", 14 pgs.

(56) References Cited

OTHER PUBLICATIONS

"U.S. Appl. No. 13/255,825, Response filed Oct. 30, 2012 to Non Final Office Action dated Aug. 3, 2012", 18 pgs.
"U.S. Appl. No. 13/275,707, Appeal Brief filed May 26, 2015", 37 pgs.
"U.S. Appl. No. 13/275,707, Examiner Interview Summary dated Apr. 8, 2015", 3 pgs.
"U.S. Appl. No. 13/275,707, Examiner Interview Summary dated Jul. 29, 2013", 3 pgs.
"U.S. Appl. No. 13/275,707, Examiner Interview Summary dated Nov. 28, 2014", 2 pgs.
"U.S. Appl. No. 13/275,707, Final Office Action dated Jul. 30, 2013", 90 pgs.
"U.S. Appl. No. 13/275,707, Final Office Action dated Nov. 28, 2014", 57 pgs.
"U.S. Appl. No. 13/275,707, Non Final Office Action dated Apr. 30, 2014", 94 pgs.
"U.S. Appl. No. 13/275,707, Non Final Office Action dated Dec. 12, 2012", 39 pgs.
"U.S. Appl. No. 13/275,707, Notice of Allowance dated Jul. 27, 2015", 19 pgs.
"U.S. Appl. No. 13/275,707, Response filed Jan. 30, 2014 to Final Office Action dated Jul. 30, 2013", 14 pgs.
"U.S. Appl. No. 13/275,707, Response filed Apr. 9, 2013 to Non Final Office Action dated Dec. 12, 2012", 14 pgs.
"U.S. Appl. No. 13/275,707, Response filed Aug. 28, 2014 to Non Final Office Action dated Apr. 30, 2014", 11 pgs.
"U.S. Appl. No. 13/309,039, Advisory Action dated Apr. 16, 2013", 3 pgs.
"U.S. Appl. No. 13/309,039, Appeal Brief filed Jul. 5, 2013", 18 pgs.
"U.S. Appl. No. 13/309,039, Appeal Brief filed Sep. 3, 2014", 20 pgs.
"U.S. Appl. No. 13/309,039, Appeal Decision dated Sep. 23, 2016", 10 pgs.
"U.S. Appl. No. 13/309,039, Decision on Pre-Appeal Brief Request dated Jun. 7, 2013", 2 pgs.
"U.S. Appl. No. 13/309,039, Examiner Interview Summary dated Oct. 23, 2012", 3 pgs.
"U.S. Appl. No. 13/309,039, Examiner's Answer to Appeal Brief dated Nov. 14, 2014", 11 pgs.
"U.S. Appl. No. 13/309,039, Final Office Action dated Jan. 2, 2013", 11 pgs.
"U.S. Appl. No. 13/309,039, Non Final Office Action dated Sep. 11, 2012", 9 pgs.
"U.S. Appl. No. 13/309,039, Non Final Office Action dated Sep. 11, 2013", 13 pgs.
"U.S. Appl. No. 13/309,039, Pre-Appeal Brief Request filed May 6, 2013", 5 pgs.
"U.S. Appl. No. 13/309,039, Response filed Jan. 14, 2015 to Examiner's Answer to Appeal Brief dated Nov. 14, 2014", 8 pgs.
"U.S. Appl. No. 13/309,039, Response filed Apr. 1, 2013 to Final Office Action dated Jan. 2, 2013", 13 pgs.
"U.S. Appl. No. 13/309,039, Response filed Oct. 22, 2012 to Non Final Office Action dated Sep. 11, 2012", 13 pgs.
"U.S. Appl. No. 13/309,060, Advisory Action dated Apr. 18, 2014", 3 pgs.
"U.S. Appl. No. 13/309,060, Appeal Brief filed Apr. 21, 2015", 16 pgs.
"U.S. Appl. No. 13/309,060, Appeal Decision dated Aug. 25, 2017", 9 pgs.
"U.S. Appl. No. 13/309,060, Final Office Action dated Oct. 11, 2013", 13 pgs.
"U.S. Appl. No. 13/309,060, Final Office Action dated Nov. 28, 2014", 13 pgs.
"U.S. Appl. No. 13/309,060, Final Office Action dated Dec. 7, 2012", 10 pgs.
"U.S. Appl. No. 13/309,060, Non Final Office Action dated May 30, 2013", 11 pgs.
"U.S. Appl. No. 13/309,060, Non Final Office Action dated Jun. 17, 2014", 12 pgs.
"U.S. Appl. No. 13/309,060, Non Final Office Action dated Aug. 1, 2012", 8 pgs.
"U.S. Appl. No. 13/309,060, Notice of Allowance dated Nov. 27, 2017", 7 pgs.
"U.S. Appl. No. 13/309,060, Response filed Mar. 4, 2014 to Final Office Action dated Dec. 24, 2013", 11 pgs.
"U.S. Appl. No. 13/309,060, Response filed Apr. 8, 2013 to Final Office Action dated Dec. 7, 2012", 10 pgs.
"U.S. Appl. No. 13/309,060, Response filed Aug. 15, 2013 to Non Final Office Action dated May 30, 2013", 10 pgs.
"U.S. Appl. No. 13/309,060, Response filed Sep. 20, 2012 to Non Final Office Action dated Aug. 1, 2012", 8 pgs.
"U.S. Appl. No. 13/309,060, Response filed Nov. 17, 2014 to Non Final Office Action dated Jun. 17, 2014", 6 pgs.
"U.S. Appl. No. 13/309,080, Appeal Brief filed May 20, 2014", 12 pgs.
"U.S. Appl. No. 13/309,080, Appeal Decision dated May 27, 2016", 8 pgs.
"U.S. Appl. No. 13/309,080, Examiner Interview Summary dated Sep. 5, 2012", 3 pgs.
"U.S. Appl. No. 13/309,080, Examiner Interview Summary dated Dec. 17, 2012", 3 pgs.
"U.S. Appl. No. 13/309,080, Final Office Action dated Oct. 11, 2013", 11 pgs.
"U.S. Appl. No. 13/309,080, Final Office Action dated Nov. 5, 2012", 8 pgs.
"U.S. Appl. No. 13/309,080, Non Final Office Action dated Jun. 10, 2013", 12 pgs.
"U.S. Appl. No. 13/309,080, Non Final Office Action dated Jul. 30, 2012", 8 pgs.
"U.S. Appl. No. 13/309,080, Notice of Non-Compliant Appeal Brief dated Jun. 3, 2014", 2 pgs.
"U.S. Appl. No. 13/309,080, Notice of Panel Decision from Pre-Appeal Brief Review dated May 1, 2014", 2 pgs.
"U.S. Appl. No. 13/309,080, Pre-Appeal Brief Request for Review filed Mar. 4, 2014", 5 pgs.
"U.S. Appl. No. 13/309,080, Response filed Aug. 15, 2013 to Non Final Office Action dated Jun. 10, 2013", 14 pgs.
"U.S. Appl. No. 13/309,080, Response filed Aug. 29, 2012 to Non Final Office Action dated Jul. 30, 2012", 11 pgs.
"U.S. Appl. No. 13/309,080, Response filed Sep. 30, 2014 to Examiner's Answer to Appeal Brief dated Aug. 1, 2014", 5 pgs.
"U.S. Appl. No. 13/309,080,Examiner's Answer to Appeal Brief dated Aug. 1, 2014", 7 pgs.
"U.S. Appl. No. 13/309,102, Appeal Brief filed Jun. 5, 2014", 19 pgs.
"U.S. Appl. No. 13/309,102, Appeal Decision dated Jun. 1, 2016", 13 pgs.
"U.S. Appl. No. 13/309,102, Decision on Pre-Appeal Brief Request dated May 1, 2014", 2 pgs.
"U.S. Appl. No. 13/309,102, Examiner's Answer to Appeal Brief dated Jul. 31, 2014", 6 pgs.
"U.S. Appl. No. 13/309,102, Final Office Action dated Nov. 27, 2013", 12 pgs.
"U.S. Appl. No. 13/309,102, Final Office Action dated Dec. 10, 2012", 10 pgs.
"U.S. Appl. No. 13/309,102, Non Final Office Action dated May 30, 2013", 13 pgs.
"U.S. Appl. No. 13/309,102, Non Final Office Action dated Aug. 6, 2012", 7 pgs.
"U.S. Appl. No. 13/309,102, Pre-Appeal Brief Request filed Mar. 26, 2014", 5 pgs.
"U.S. Appl. No. 13/309,102, Response filed Apr. 9, 2013 to Final Office Action dated Dec. 10, 2012", 13 pgs.
"U.S. Appl. No. 13/309,102, Response filed Sep. 5, 2013 to Non Final Office Action dated May 30, 2013", 13 pgs.
"U.S. Appl. No. 13/309,102, Response filed Sep. 25, 2012 to Non Final Office Action dated Aug. 6, 2012", 10 pgs.
"U.S. Appl. No. 13/309,102, Response filed Sep. 30, 2014 to Examiner's Answer to Appeal Brief dated Jul. 31, 2014", 4 pgs.

(56) References Cited

OTHER PUBLICATIONS

"U.S. Appl. No. 13/309,127, Appeal Brief filed Apr. 30, 2014", 19 pgs.
"U.S. Appl. No. 13/309,127, Appeal Decision dated Jul. 26, 2017", 16 pgs.
"U.S. Appl. No. 13/309,127, Final Office Action dated Oct. 10, 2012", 18 pgs.
"U.S. Appl. No. 13/309,127, Final Office Action dated Oct. 22, 2013", 19 pgs.
"U.S. Appl. No. 13/309,127, Non Final Office Action dated Apr. 25, 2013", 19 pgs.
"U.S. Appl. No. 13/309,127, Non Final Office Action dated Jun. 25, 2012", 15 pgs.
"U.S. Appl. No. 13/309,127, Pre-Appeal Brief Request filed Feb. 28, 2014", 5 pgs.
"U.S. Appl. No. 13/309,127, Response filed Mar. 25, 2013 to Final Office Action dated Oct. 10, 2012", 13 pgs.
"U.S. Appl. No. 13/309,127, Response filed Jul. 24, 2013 to Non Final Office Action dated Apr. 25, 2013", 11 pgs.
"U.S. Appl. No. 13/309,127, Response filed Aug. 1, 2012 to Non Final Office Action dated Jun. 25, 2012", 15 pgs.
"U.S. Appl. No. 13/309,127, Response filed Sep. 30, 2014 to Examiner's Answer to Appeal Brief dated Jul. 31, 2014", 6 pgs.
"U.S. Appl. No. 13/309,127, Examiner's Answer to Appeal Brief dated Jul. 31, 2014", 9 pgs.
"U.S. Appl. No. 13/309,146, Advisory Action dated Feb. 12, 2015", 3 pgs.
"U.S. Appl. No. 13/309,146, Appeal Brief filed Jan. 12, 2015", 10 pgs.
"U.S. Appl. No. 13/309,146, Appeal Decision dated Jun. 1, 2016", 10 pgs.
"U.S. Appl. No. 13/309,146, Final Office Action dated Jun. 27, 2014", 14 pgs.
"U.S. Appl. No. 13/309,146, Non Final Office Action dated Dec. 19, 2013", 10 pgs.
"U.S. Appl. No. 13/309,146, Response filed Apr. 24, 2014 to Non Final Office Action dated Dec. 19, 2013", 10 pgs.
"U.S. Appl. No. 13/309,166, Advisory Action dated Dec. 1, 2017", 3 pgs.
"U.S. Appl. No. 13/309,166, Appeal Brief filed Sep. 1, 2016", 17 pgs.
"U.S. Appl. No. 13/309,166, Examiner Interview Summary dated May 20, 2015", 3 pgs.
"U.S. Appl. No. 13/309,166, Examiner Interview Summary dated Nov. 13, 2017", 5 pgs.
"U.S. Appl. No. 13/309,166, Final Office Action dated Aug. 10, 2017", 15 pgs.
"U.S. Appl. No. 13/309,166, Final Office Action dated Sep. 1, 2015", 11 pgs.
"U.S. Appl. No. 13/309,166, Final Office Action dated Nov. 13, 2013", 9 pgs.
"U.S. Appl. No. 13/309,166, Non Final Office Action dated Feb. 13, 2015", 10 pgs.
"U.S. Appl. No. 13/309,166, Non Final Office Action dated Feb. 22, 2013", 9 pgs.
"U.S. Appl. No. 13/309,166, Non Final Office Action dated May 23, 2013", 9 pgs.
"U.S. Appl. No. 13/309,166, Non Final Office Action dated Dec. 29, 2016", 15 pgs.
"U.S. Appl. No. 13/309,166, Response filed Jan. 10, 2018 to Final Office Action dated Aug. 10, 2017", 9 pgs.
"U.S. Appl. No. 13/309,166, Response filed Apr. 11, 2014 to Final Office Action dated Nov. 13, 2013", 13 pgs.
"U.S. Appl. No. 13/309,166, Response filed May 1, 2017 to Non Final Office Action dated Dec. 29, 2016", 14 pgs.
"U.S. Appl. No. 13/309,166, Response filed May 13, 2015 to Final Office Action dated Feb. 13, 2015", 8 pgs.
"U.S. Appl. No. 13/309,166, Response filed May 14, 2013 to Non Final Office Action dated Feb. 22, 2013", 10 pgs.
"U.S. Appl. No. 13/309,166, Response filed Aug. 15, 2013 to Non Final Office Action dated May 23, 2013", 11 pgs.
"U.S. Appl. No. 13/309,166, Response filed Nov. 6, 2017 to Final Office Action dated Aug. 10, 2017", 11 pgs.
"U.S. Appl. No. 13/310,279, Appeal Brief filed Nov. 3, 2014", 19 pgs.
"U.S. Appl. No. 13/310,279, Appeal Brief filed Sep. 11, 2019", 19 pgs.
"U.S. Appl. No. 13/310,279, Appeal Decision dated Aug. 30, 2017", 9 pgs.
"U.S. Appl. No. 13/310,279, Examiner Interview Summary dated Nov. 19, 2013", 3 pgs.
"U.S. Appl. No. 13/310,279, Final Office Action dated Jul. 23, 2020", 23 pgs.
"U.S. Appl. No. 13/310,279, Final Office Action dated Sep. 10, 2018", 24 pgs.
"U.S. Appl. No. 13/310,279, Final Office Action dated Dec. 3, 2013", 14 pgs.
"U.S. Appl. No. 13/310,279, Non Final Office Action dated Jan. 31, 2020", 25 pgs.
"U.S. Appl. No. 13/310,279, Non Final Office Action dated Feb. 2, 2018", 21 pgs.
"U.S. Appl. No. 13/310,279, Non Final Office Action dated Jun. 17, 2013", 12 pgs.
"U.S. Appl. No. 13/310,279, Non Final Office Action dated Dec. 24, 2020", 24 pgs.
"U.S. Appl. No. 13/310,279, Pre-Appeal Brief Request filed Apr. 3, 2014", 5 pgs.
"U.S. Appl. No. 13/310,279, Reply Brief dated Jan. 4, 2016 to Appeal Brief filed Nov. 3, 2014", 3 pgs.
"U.S. Appl. No. 13/310,279, Response filed Mar. 24, 2021 to Non Final Office Action dated Dec. 24, 2020", 11 pgs.
"U.S. Appl. No. 13/310,279, Response filed May 2, 2018 to Non Final Office Action dated Feb. 2, 2018", 10 pgs.
"U.S. Appl. No. 13/310,279, Response filed Jun. 1, 2020 to Non Final Office Action dated Jan. 31, 2020", 11 pgs.
"U.S. Appl. No. 13/310,279, Response filed Sep. 13, 2013 to Non Final Office Action dated Jun. 17, 2013", 15 pgs.
"U.S. Appl. No. 13/310,279, Response filed Oct. 30, 2017 to Non Final Office Action dated Dec. 3, 2017", 8 pgs.
"U.S. Appl. No. 13/310,279, Response filed Nov. 23, 2020 to Final Office Action dated Jul. 23, 2020", 11 pgs.
"U.S. Appl. No. 13/310,322, Appeal Brief filed Jan. 15, 2015", 17 pgs.
"U.S. Appl. No. 13/310,322, Appeal Decision dated Sep. 20, 2017", 18 pgs.
"U.S. Appl. No. 13/310,322, Decision on Pre-Appeal Brief Request dated Sep. 15, 2015", 2 pgs.
"U.S. Appl. No. 13/310,322, Final Office Action dated Feb. 13, 2014", 15 pgs.
"U.S. Appl. No. 13/310,322, Final Office Action dated Mar. 31, 2015", 16 pgs.
"U.S. Appl. No. 13/310,322, Non Final Office Action dated Jul. 2, 2013", 16 pgs.
"U.S. Appl. No. 13/310,322, Non Final Office Action dated Oct. 3, 2014", 16 pgs.
"U.S. Appl. No. 13/310,322, Pre-Appeal Brief Request filed Jul. 31, 2015", 5 pgs.
"U.S. Appl. No. 13/310,322, Reply Brief filed Aug. 15, 2016", 4 pgs.
"U.S. Appl. No. 13/310,322, Response filed Jan. 5, 2015 to Non Final Office Action dated Oct. 3, 2014", 12 pgs.
"U.S. Appl. No. 13/310,322, Response filed Nov. 1, 2013 to Non Final Office Action dated Jul. 2, 2013", 12 pgs.
"U.S. Appl. No. 13/310,332, Response filed Jul. 14, 2014 to Final Office Action dated Feb. 13, 2014", 12 pgs.
"U.S. Appl. No. 13/310,368, Advisory Action dated Jun. 9, 2015", 3 pgs.
"U.S. Appl. No. 13/310,368, Advisory Action dated Jul. 8, 2015", 2 pgs.
"U.S. Appl. No. 13/310,368, Advisory Action dated Aug. 21, 2015", 2 pgs.

(56) References Cited

OTHER PUBLICATIONS

"U.S. Appl. No. 13/310,368, Appeal Brief filed Aug. 2, 2018", 17 pgs.
"U.S. Appl. No. 13/310,368, Appeal Brief filed Aug. 17, 2015", 27 pgs.
"U.S. Appl. No. 13/310,368, Appeal Decision dated Aug. 30, 2017", 11 pgs.
"U.S. Appl. No. 13/310,368, Final Office Action dated Jan. 7, 2014", 17 pgs.
"U.S. Appl. No. 13/310,368, Final Office Action dated Mar. 18, 2015", 15 pgs.
"U.S. Appl. No. 13/310,368, Final Office Action dated Jul. 18, 2019", 12 pgs.
"U.S. Appl. No. 13/310,368, Non Final Office Action dated Jun. 17, 2013", 17 pgs.
"U.S. Appl. No. 13/310,368, Non Final Office Action dated Sep. 12, 2014", 19 pgs.
"U.S. Appl. No. 13/310,368, Non Final Office Action dated Nov. 29, 2018", 16 pgs.
"U.S. Appl. No. 13/310,368, Non Final Office Action dated Dec. 1, 2017", 17 pgs.
"U.S. Appl. No. 13/310,368, Notice of Allowance dated Dec. 5, 2019", 11 pgs.
"U.S. Appl. No. 13/310,368, Response filed May 18, 2015 to Final Office Action dated Mar. 18, 2015", 11 pgs.
"U.S. Appl. No. 13/310,368, Response filed Jul. 7, 2014 to Final Office Action dated Jan. 7, 2014", 12 pgs.
"U.S. Appl. No. 13/310,368, Response filed Sep. 17, 2013 to Non Final Office Action dated Jun. 17, 2013", 15 pgs.
"U.S. Appl. No. 13/310,368, Response filed Oct. 18, 2019 to Final Office Action dated Jul. 18, 2019", 10 pgs.
"U.S. Appl. No. 13/310,368, Response filed Oct. 30, 2017 to Final Office Action dated Mar. 18, 2015", 8 pgs.
"U.S. Appl. No. 13/310,368, Response filed Dec. 12, 2014 to Non Final Office Action dated Sep. 12, 2014", 9 pgs.
"U.S. Appl. No. 13/310,368, Response filed Apr. 29, 2019 to Non Final Office Action dated Nov. 29, 2018", 12 pgs.
"U.S. Appl. No. 13/310,417, Appeal Brief filed Sep. 11, 2015", 19 pgs.
"U.S. Appl. No. 13/310,417, Final Office Action dated Jan. 9, 2014", 17 pgs.
"U.S. Appl. No. 13/310,417, Final Office Action dated Mar. 11, 2015", 17 pgs.
"U.S. Appl. No. 13/310,417, Non Final Office Action dated Feb. 11, 2016", 12 pgs.
"U.S. Appl. No. 13/310,417, Non Final Office Action dated Jun. 17, 2013", 13 pgs.
"U.S. Appl. No. 13/310,417, Non Final Office Action dated Sep. 8, 2014", 17 pgs.
"U.S. Appl. No. 13/310,417, Response filed May 27, 2014 to Final Office Action dated Jan. 9, 2014", 14 pgs.
"U.S. Appl. No. 13/310,417, Response filed Sep. 17, 2013 to Non Final Office Action dated Jun. 17, 2013", 14 pgs.
"U.S. Appl. No. 13/310,452, Advisory Action dated Jul. 17, 2014", 3 pgs.
"U.S. Appl. No. 13/310,452, Appeal Brief filed Oct. 17, 2016", 25 pgs.
"U.S. Appl. No. 13/310,452, Appeal Decision dated Sep. 29, 2017", 20 pgs.
"U.S. Appl. No. 13/310,452, Decision on Pre-Appeal Brief dated Apr. 17, 2015", 2 pgs.
"U.S. Appl. No. 13/310,452, Final Office Action dated May 1, 2014", 18 pgs.
"U.S. Appl. No. 13/310,452, Final Office Action dated Dec. 15, 2015", 21 pgs.
"U.S. Appl. No. 13/310,452, Non Final Office Action dated May 4, 2015", 17 pgs.
"U.S. Appl. No. 13/310,452, Non Final Office Action dated Jul. 10, 2013", 14 pgs.
"U.S. Appl. No. 13/310,452, Non Final Office Action dated Oct. 6, 2014", 18 pgs.
"U.S. Appl. No. 13/310,452, Pre-Appeal Brief Request filed Mar. 5, 2015", 5 pgs.
"U.S. Appl. No. 13/310,452, Response filed Jan. 10, 2014 to Non Final Office Action dated Jul. 10, 2013", 11 pgs.
"U.S. Appl. No. 13/310,452, Response filed Jul. 1, 2014 to Final Office Action dated May 1, 2014", 11 pgs.
"U.S. Appl. No. 13/310,452, Response filed Sep. 3, 2015 to Non Final Office Action dated May 4, 2015", 14 pgs.
"U.S. Appl. No. 13/312,507, Final Office Action dated Nov. 21, 2014", 12 pgs.
"U.S. Appl. No. 13/312,507, Non Final Office Action dated Mar. 26, 2015", 13 pgs.
"U.S. Appl. No. 13/312,507, Non Final Office Action dated May 27, 2014", 13 pgs.
"U.S. Appl. No. 13/312,507, Notice of Allowance dated Oct. 30, 2015", 19 pgs.
"U.S. Appl. No. 13/312,507, PTO Response to Rule 312 Communication dated Feb. 16, 2016", 2 pgs.
"U.S. Appl. No. 13/312,507, Response filed Feb. 19, 2015 to Final Office Action dated Nov. 21, 2014", 10 pgs.
"U.S. Appl. No. 13/312,507, Response filed Jul. 27, 2015 to Non Final Office Action dated Mar. 26, 2015", 11 pgs.
"U.S. Appl. No. 13/312,507, Response filed Oct. 27, 2014 to Non Final Office Action dated May 27, 2014", 10 pgs.
"U.S. Appl. No. 13/351,533, Final Office Action dated Jan. 23, 2013", 33 pgs.
"U.S. Appl. No. 13/351,533, Final Office Action dated Mar. 20, 2015", 28 pgs.
"U.S. Appl. No. 13/351,533, Non Final Office Action dated Feb. 4, 2014", 26 pgs.
"U.S. Appl. No. 13/351,533, Non Final Office Action dated May 25, 2012", 20 pgs.
"U.S. Appl. No. 13/351,533, Non Final Office Action dated Sep. 6, 2012", 26 pgs.
"U.S. Appl. No. 13/351,533, Non Final Office Action dated Oct. 14, 2014", 25 pgs.
"U.S. Appl. No. 13/351,533, Response filed Jan. 14, 2015 to Non Final Office Action dated Oct. 14, 2014", 18 pgs.
"U.S. Appl. No. 13/351,533, Response filed Apr. 10, 2013 to Final Office Action dated Jan. 23, 2013", 12 pgs.
"U.S. Appl. No. 13/351,533, Response Filed Jun. 3, 2014 to Non Final Office Action dated Feb. 4, 2014", 14 pgs.
"U.S. Appl. No. 13/351,533, Response filed Jun. 8, 2012 to Non Final Office Action dated May 25, 2012", 12 pgs.
"U.S. Appl. No. 13/351,533, Response filed Nov. 20, 2012 to Non Final Office Action dated Sep. 6, 2012", 14 pgs.
"U.S. Appl. No. 13/365,062, Non Final Office Action dated Mar. 19, 2015", 14 pgs.
"U.S. Appl. No. 13/365,062, Non Final Office Action dated Apr. 30, 2014", 13 pgs.
"U.S. Appl. No. 13/365,062, Non Final Office Action dated Aug. 19, 2013", 14 pgs.
"U.S. Appl. No. 13/365,062, Non Final Office Action dated Oct. 9, 2014", 13 pgs.
"U.S. Appl. No. 13/365,062, Non Final Office Action dated Nov. 30, 2012", 19 pgs.
"U.S. Appl. No. 13/365,062, Non-Final Office Action dated Jul. 3, 2012", 20 pgs.
"U.S. Appl. No. 13/365,062, Notice of Allowance dated Jul. 24, 2015", 11 pgs.
"U.S. Appl. No. 13/365,062, Response filed Feb. 9, 2015 to Non Final Office Action dated Oct. 9, 2014", 6 pgs.
"U.S. Appl. No. 13/365,062, Response filed May 29, 2013 to Non Final Office Action dated Nov. 30, 2012", 8 pgs.
"U.S. Appl. No. 13/365,062, Response filed Jun. 19, 2015 to Non Final Office Action dated Mar. 19, 2015", 9 pgs.
"U.S. Appl. No. 13/365,062, Response filed Sep. 2, 2014 to Non Final Office Action dated Jul. 30, 2014", 8 pgs.
"U.S. Appl. No. 13/365,062, Response filed Oct. 3, 2012 to Non Final Office Action dated Jul. 3, 2012", 8 pgs.

(56) References Cited

OTHER PUBLICATIONS

"U.S. Appl. No. 13/365,062, Response filed Dec. 19, 2013 to Non Final Office Action dated Aug. 19, 2013", 10 pgs.
"U.S. Appl. No. 13/408,877, Appeal Brief filed Nov. 10, 2015", 14 [gs/.
"U.S. Appl. No. 13/408,877, Appeal Decision dated Sep. 6, 2017", 23 pgs.
"U.S. Appl. No. 13/408,877, Final Office Action dated May 8, 2015", 24 pgs.
"U.S. Appl. No. 13/408,877, Final Office Action dated Sep. 3, 2013", 27 pgs.
"U.S. Appl. No. 13/408,877, Non Final Office Action dated Feb. 28, 2013", 22 pgs.
"U.S. Appl. No. 13/408,877, Non Final Office Action dated Oct. 8, 2014", 26 pgs.
"U.S. Appl. No. 13/408,877, Response filed Jan. 8, 2015 to Non Final Office Action dated Oct. 8, 2014", 15 pgs.
"U.S. Appl. No. 13/408,877, Response filed May 16, 2013 to Non Final Office Action dated Feb. 28, 2013", 17 pgs.
"U.S. Appl. No. 13/408,877, Response filed Dec. 3, 2013 to Final Office Action dated Sep. 3, 2013", 18 pgs.
"U.S. Appl. No. 13/408,917, Appeal Brief filed Jan. 19, 2016", 18 pgs.
"U.S. Appl. No. 13/408,917, Appeal Decision dated Sep. 12, 2017", 19 pgs.
"U.S. Appl. No. 13/408,917, Decision on Pre-Appeal Brief Request dated Sep. 17, 2015", 2 pgs.
"U.S. Appl. No. 13/408,917, Examiner Interview Summary dated Aug. 28, 2013", 3 pgs.
"U.S. Appl. No. 13/408,917, Final Office Action dated May 11, 2015", 23 pgs.
"U.S. Appl. No. 13/408,917, Final Office Action dated Aug. 28, 2013", 24 pgs.
"U.S. Appl. No. 13/408,917, Non Final Office Action dated Mar. 5, 2013", 18 pgs.
"U.S. Appl. No. 13/408,917, Non Final Office Action dated Oct. 9, 2014", 24 pgs.
"U.S. Appl. No. 13/408,917, Pre-Appeal Brief Request filed Aug. 12, 2015", 5 pgs.
"U.S. Appl. No. 13/408,917, Reply Brief filed Oct. 3, 2016", 4 pgs.
"U.S. Appl. No. 13/408,917, Response filed Jan. 9, 2015 to Non Final Office Action dated Oct. 9, 2014", 13 pgs.
"U.S. Appl. No. 13/408,917, Response filed Jun. 3, 2013 to Non Final Office Action dated Mar. 5, 2013", 16 pgs.
"U.S. Appl. No. 13/408,917, Response filed Nov. 27, 2013 to Final Office Action dated Aug. 28, 2013", 17 pgs.
"U.S. Appl. No. 13/409,189 Examiner's Answer dated Jan. 4, 2017", 12 pgs.
"U.S. Appl. No. 13/409,189, Appeal Brief filed Oct. 25, 2016", 30 pgs.
"U.S. Appl. No. 13/409,189, Appeal Decision dated Dec. 18, 2017", 14 pgs.
"U.S. Appl. No. 13/409,189, Examiner Interview Summary dated Aug. 30, 2013", 3 pgs.
"U.S. Appl. No. 13/409,189, Final Office Action dated May 8, 2015", 23 pgs.
"U.S. Appl. No. 13/409,189, Final Office Action dated Aug. 28, 2013", 22 pgs.
"U.S. Appl. No. 13/409,189, Non Final Office Action dated Feb. 28, 2013", 20 pgs.
"U.S. Appl. No. 13/409,189, Non Final Office Action dated Oct. 9, 2014", 23 pgs.
"U.S. Appl. No. 13/409,189, Non Final Office Action dated Dec. 23, 2015", 12 pgs.
"U.S. Appl. No. 13/409,189, Response filed Jan. 9, 2015 to Non Final Office Action dated Oct. 9, 2014", 13 pgs.
"U.S. Appl. No. 13/409,189, Response filed May 28, 2013 to Non Final Office Action dated Feb. 28, 2013", 16 pgs.
"U.S. Appl. No. 13/409,189, Response filed Sep. 8, 2005 to Final Office Action dated May 8, 2015", 16 pgs.
"U.S. Appl. No. 13/409,189, Response filed Nov. 27, 2013 to Final Office Action dated Aug. 28, 2013", 15 pgs.
"U.S. Appl. No. 13/422,750, Final Office Action dated Jun. 15, 2016", 37 pgs.
"U.S. Appl. No. 13/422,750, Final Office Action dated Aug. 7, 2013", 29 pgs.
"U.S. Appl. No. 13/422,750, Non Final Office Action dated Apr. 1, 2014", 32 pgs.
"U.S. Appl. No. 13/422,750, Non Final Office Action dated Apr. 12, 2013", 19 pgs.
"U.S. Appl. No. 13/422,750, Non Final Office Action dated Oct. 31, 2014", 32 pgs.
"U.S. Appl. No. 13/422,750, Response filed Jan. 30, 2014 to Final Office Action dated Aug. 7, 2013", 13 pgs.
"U.S. Appl. No. 13/422,750, Response filed Feb. 2, 2015 to Non Final Office Action dated Oct. 31, 2014", 11 pgs.
"U.S. Appl. No. 13/422,750, Response filed Jul. 12, 2013 to Non Final Office Action dated Apr. 12, 2013", 14 pgs.
"U.S. Appl. No. 13/422,750, Response filed Sep. 2, 2014 to Non Final Office Action dated Apr. 1, 2014", 10 pgs.
"U.S. Appl. No. 13/424,682, Non Final Office Action dated Apr. 11, 2013", 6 pgs.
"U.S. Appl. No. 13/424,682, Notice of Allowance dated Jul. 30, 2013", 13 pgs.
"U.S. Appl. No. 13/424,682, Response filed Jul. 5, 2013 to Non Final Office Action dated Apr. 11, 2013", 10 pgs.
"U.S. Appl. No. 13/424,705, Advisory Action dated Nov. 29, 2013", 3 pgs.
"U.S. Appl. No. 13/424,705, Final Office Action dated Sep. 11, 2015", 28 pgs.
"U.S. Appl. No. 13/424,705, Final Office Action dated Sep. 19, 2013", 11 pgs.
"U.S. Appl. No. 13/424,705, Non Final Office Action dated Apr. 12, 2013", 14 pgs.
"U.S. Appl. No. 13/424,705, Non Final Office Action dated Jun. 16, 2014", 21 pgs.
"U.S. Appl. No. 13/424,705, Non Final Office Action dated Jul. 23, 2014", 21 pgs.
"U.S. Appl. No. 13/424,705, Response filed Jul. 12, 2013 to Non Final Office Action dated Apr. 12, 2013", 11 pgs.
"U.S. Appl. No. 13/424,705, Response filed Nov. 19, 2013 to Final Office Action dated Sep. 19, 2013", 11 pgs.
"U.S. Appl. No. 13/424,705, Response filed Nov. 24, 2014 to Non Final Office Action dated Jul. 23, 2014", 14 pgs.
"U.S. Appl. No. 13/452,400, Examiner Interview Summary dated Sep. 11, 2013", 3 pgs.
"U.S. Appl. No. 13/452,400, Final Office Action dated Jul. 5, 2013", 25 pgs.
"U.S. Appl. No. 13/452,400, Final Office Action dated Jul. 30, 2015", 32 pgs.
"U.S. Appl. No. 13/452,400, Non Final Office Action dated Jan. 15, 2015", 24 pgs.
"U.S. Appl. No. 13/452,400, Non Final Office Action dated Oct. 5, 2012", 23 pgs.
"U.S. Appl. No. 13/452,400, Preliminary Amendment filed May 16, 2012", 3 pgs.
"U.S. Appl. No. 13/452,400, Response filed Jan. 7, 2013 to Non Final Office Action dated Oct. 5, 2012", 12 pgs.
"U.S. Appl. No. 13/452,400, Response filed Apr. 15, 2015 to Non Final Office Action dated Jan. 15, 2015", 31 pgs.
"U.S. Appl. No. 13/452,400, Response filed Sep. 26, 2013 to Final Office Action", 12 pgs.
"U.S. Appl. No. 13/464,598, Appeal Brief filed Jan. 28, 2016", 19 pgs.
"U.S. Appl. No. 13/464,598, Appeal Decision dated Jul. 31, 2017", 18 pgs.
"U.S. Appl. No. 13/464,598, Examiner Interview Summary dated May 1, 2014", 3 pgs.
"U.S. Appl. No. 13/464,598, Final Office Action dated Jul. 28, 2015", 38 pgs.
"U.S. Appl. No. 13/464,598, Non Final Office Action dated Mar. 16, 2015", 51 pgs.

(56) References Cited

OTHER PUBLICATIONS

"U.S. Appl. No. 13/464,598, Non Final Office Action dated Dec. 4, 2013", 26 pgs.
"U.S. Appl. No. 13/464,598, Notice of Allowance dated Oct. 12, 2017", 5 pgs.
"U.S. Appl. No. 13/464,598, Response filed Apr. 5, 2014 to Non Final Office Action dated Dec. 4, 2013", 44 pgs.
"U.S. Appl. No. 13/464,598, Response filed Jul. 16, 2015 to Non Final Office Action dated Mar. 16, 2015", 24 pgs.
"U.S. Appl. No. 13/464,598, Response filed Oct. 2, 2017 to Final Office Action dated Jul. 28, 2017", 17 pgs.
"U.S. Appl. No. 13/553,572 Response filed Jun. 3, 2013 to Non-Final Office Action dated Mar. 7, 2013", 17 pgs.
"U.S. Appl. No. 13/553,572, Final Office Action dated Jul. 2, 2013", 12 pgs.
"U.S. Appl. No. 13/553,572, Non Final Office Action dated Mar. 7, 2013", 14 pgs.
"U.S. Appl. No. 13/553,572, Non Final Office Action dated Nov. 4, 2014", 13 pgs.
"U.S. Appl. No. 13/553,572, Preliminary Amendment filed Sep. 17, 2012", 7 pgs.
"U.S. Appl. No. 13/553,572, Response filed Jan. 2, 2014 to Final Office Action dated Jul. 2, 2013", 15 pgs.
"U.S. Appl. No. 13/553,596, Advisory Action dated Apr. 29, 2015", 3 pgs.
"U.S. Appl. No. 13/553,596, Final Office Action dated Feb. 4, 2015", 16 pgs.
"U.S. Appl. No. 13/553,596, Non Final Office Action dated Jul. 28, 2014", 14 pgs.
"U.S. Appl. No. 13/553,596, Non Final Office Action dated Aug. 31, 2015", 17 pgs.
"U.S. Appl. No. 13/553,596, Response filed Apr. 6, 2015 to Final Office Action dated Feb. 4, 2015", 10 pgs.
"U.S. Appl. No. 13/553,596, Response filed Nov. 26, 2014 to Non Final Office Action dated Jul. 28, 2014", 8 pgs.
"U.S. Appl. No. 13/594,002, Final Office Action dated Mar. 19, 2015", 36 pgs.
"U.S. Appl. No. 13/594,002, Final Office Action dated Jul. 31, 2013", 24 pgs.
"U.S. Appl. No. 13/594,002, Final Office Action dated Sep. 6, 2016", 55 pgs.
"U.S. Appl. No. 13/594,002, Non Final Office Action dated Feb. 27, 2013", 21 pgs.
"U.S. Appl. No. 13/594,002, Non Final Office Action dated Nov. 30, 2015", 41 pgs.
"U.S. Appl. No. 13/594,002, Non Final Office Action dated Dec. 4, 2014", 29 pgs.
"U.S. Appl. No. 13/594,002, Response filed Mar. 3, 2015 to Non Final Office Action dated Dec. 4, 2014", 23 pgs.
"U.S. Appl. No. 13/594,002, Response filed May 14, 2013 to Non Final Office Action dated Feb. 27, 2013", 11 pgs.
"U.S. Appl. No. 13/594,002, Response filed May 31, 2016 to Non Final Office Action dated Nov. 30, 2015", 12 pgs.
"U.S. Appl. No. 13/594,002, Response filed Aug. 19, 2015 to Final Office Action dated Mar. 19, 2015", 14 pgs.
"U.S. Appl. No. 13/594,002, Response filed Oct. 28, 2013 to Final Office Action dated Jul. 31, 2013", 11 pgs.
"U.S. Appl. No. 13/679,830, Examiner Interview Summary dated Sep. 28, 2017", 3 pgs.
"U.S. Appl. No. 13/679,830, Final Office Action dated Jan. 31, 2014", 27 pgs.
"U.S. Appl. No. 13/679,830, Final Office Action dated Apr. 23, 2015", 36 pgs.
"U.S. Appl. No. 13/679,830, Final Office Action dated Sep. 9, 2016", 59 pgs.
"U.S. Appl. No. 13/679,830, Final Office Action dated Nov. 15, 2017", 98 pgs.
"U.S. Appl. No. 13/679,830, Non Final Office Action dated Jan. 4, 2016", 61 pgs.
"U.S. Appl. No. 13/679,830, Non Final Office Action dated Jun. 14, 2013", 21 pgs.
"U.S. Appl. No. 13/679,830, Non Final Office Action dated Jun. 15, 2017", 82 pgs.
"U.S. Appl. No. 13/679,830, Non Final Office Action dated Nov. 6, 2014", 36 pgs.
"U.S. Appl. No. 13/679,830, Response filed Feb. 6, 2015 to Non Final Office Action dated Nov. 6, 2014", 12 pgs.
"U.S. Appl. No. 13/679,830, Response filed Feb. 9, 2017 to Final Office Action dated Sep. 9, 2016", 19 pgs.
"U.S. Appl. No. 13/679,830, Response filed Jun. 12, 2014 to Final Office Action dated Jan. 31, 2014", 16 pgs.
"U.S. Appl. No. 13/679,830, Response filed Jul. 5, 2016 to Non Final Office Action dated Jan. 4, 2016", 11 pgs.
"U.S. Appl. No. 13/679,830, Response filed Sep. 23, 2015 to Final Office Action dated Apr. 23, 2015", 14 pgs.
"U.S. Appl. No. 13/679,830, Response Filed Oct. 16, 2017 to Non Final Office Action dated Jun. 15, 2017", 13 pgs.
"U.S. Appl. No. 13/679,830, Response filed Nov. 14, 2013 to Non Final Office Action dated Jun. 14, 2013", 14 pgs.
"U.S. Appl. No. 14/094,542, Final Office Action dated Feb. 9, 2015", 6 pgs.
"U.S. Appl. No. 14/094,542, Final Office Action dated Sep. 2, 2015", 6 pgs.
"U.S. Appl. No. 14/094,542, Non Final Office Action dated Feb. 12, 2014", 7 pgs.
"U.S. Appl. No. 14/094,542, Non Final Office Action dated May 19, 2015", 5 pgs.
"U.S. Appl. No. 14/094,542, Non Final Office Action dated Aug. 15, 2014", 7 pgs.
"U.S. Appl. No. 14/094,542, Response filed Jan. 15, 2015 to Non Final Office Action dated Aug. 15, 2014", 10 pgs.
"U.S. Appl. No. 14/094,542, Response filed May 11, 2015 to Final Office Action dated Feb. 9, 2015", 12 pgs.
"U.S. Appl. No. 14/094,542, Response filed Jul. 14, 2014 to Non Final Office Action dated Feb. 12, 2014", 12 pgs.
"U.S. Appl. No. 14/094,542, Response filed Aug. 19, 2015 to Non Final Office Action dated May 19, 2015", 12 pgs.
"U.S. Appl. No. 14/536,320, Non Final Office Action dated Mar. 25, 2015", 9 pgs.
"U.S. Appl. No. 14/540,346, Non Final Office Action dated Aug. 24, 2015", 16 pgs.
"U.S. Appl. No. 14/540,346, Notice of Allowance dated Mar. 18, 2016", 7 pgs.
"U.S. Appl. No. 14/540,346, Preliminary Amendment filed Dec. 11, 2014", 8 pgs.
"U.S. Appl. No. 14/540,346, Response filed Dec. 23, 2015 to Non Final Office Action dated Aug. 24, 2015", 7 pgs.
"U.S. Appl. No. 14/608,520, Appeal Brief filed May 12, 2017", 25 pgs.
"U.S. Appl. No. 14/608,520, Appeal Decision dated Nov. 27, 2017", 14 pgs.
"U.S. Appl. No. 14/608,520, Final Office Action dated Oct. 12, 2016", 44 pgs.
"U.S. Appl. No. 14/608,520, Non Final Office Action dated Mar. 18, 2016", 39 pgs.
"U.S. Appl. No. 14/608,520, Non Final Office Action dated Oct. 15, 2015", 19 pgs.
"U.S. Appl. No. 14/608,520, Preliminary Amendment filed Feb. 26, 2015", 10 pgs.
"U.S. Appl. No. 14/608,520, Response filed Jan. 15, 2016 to Non Final Office Action dated Oct. 15, 2015", 9 pgs.
"U.S. Appl. No. 14/608,520, Response filed Sep. 19, 2016 to Non Final Office Action dated Mar. 18, 2016", 12 pgs.
"U.S. Appl. No. 14/628,941, Appeal Brief filed May 12, 2017".
"U.S. Appl. No. 14/628,941, Appeal Decision dated Dec. 6, 2017", 14 pgs.
"U.S. Appl. No. 14/628,941, Final Office Action dated Oct. 13, 2016", 43 pgs.
"U.S. Appl. No. 14/628,941, Non Final Office Action dated Mar. 18, 2016", 38 pgs.
"U.S. Appl. No. 14/628,941, Non Final Office Action dated Sep. 24, 2015", 21 pgs.

(56) References Cited

OTHER PUBLICATIONS

"U.S. Appl. No. 14/628,941, Preliminary Amendment filed Feb. 26, 2015", 9 pgs.
"U.S. Appl. No. 14/628,941, Response filed Sep. 19, 2016 to Non Final Office Action dated Mar. 18, 2016", 12 pgs.
"U.S. Appl. No. 14/628,941, Response filed Dec. 23, 2015 to Non Final Office Action dated Sep. 24, 2015", 9 pgs.
"U.S. Appl. No. 14/750,559, Final Office Action dated Nov. 29, 2018", 22 pgs.
"U.S. Appl. No. 14/750,559, Non Final Office Action dated Feb. 27, 2018", 15 pgs.
"U.S. Appl. No. 14/750,559, Non Final Office Action dated Jun. 13, 2019", 11 pgs.
"U.S. Appl. No. 14/750,559, Preliminary Amendment filed Jun. 26, 2015 t", 9 pgs.
"U.S. Appl. No. 14/750,559, Response filed Jul. 27, 2018 to Non Final Office Action dated Feb. 27, 2018", 12 pgs.
"U.S. Appl. No. 14/750,559, Response filed Mar. 29, 2019 to Final Office Action dated Nov. 29, 2018", 13 pgs.
"U.S. Appl. No. 14/750,559, Response filed Sep. 13, 2019 to Non-Final Office Action datted Jun. 13, 2019", 12 pgs.
"U.S. Appl. No. 14/826,006, Advisory Action dated May 10, 2017", 3 pgs.
"U.S. Appl. No. 14/826,006, Final Office Action dated Jan. 17, 2017", 13 pgs.
"U.S. Appl. No. 14/826,006, Final Office Action dated Jan. 19, 2018", 17 pgs.
"U.S. Appl. No. 14/826,006, Non Final Office Action dated Jun. 2, 2016", 11 pgs.
"U.S. Appl. No. 14/826,006, Non Final Office Action dated Aug. 18, 2017", 16 pgs.
"U.S. Appl. No. 14/826,006, Preliminary Amendment filed Aug. 28, 2015", 6 pgs.
"U.S. Appl. No. 14/826,006, Response filed Apr. 18, 2017 to Final Office Action dated Jan. 17, 2017", 13 pgs.
"U.S. Appl. No. 14/826,006, Response filed Nov. 1, 2016 to Non Final Office Action dated Jun. 2, 2016", 7 pgs.
"U.S. Appl. No. 14/826,006, Response filed Nov. 17, 2017 to Non Final Office Action dated Aug. 18, 2017", 11 pgs.
"U.S. Appl. No. 14/826,018, Non Final Office Action dated Jan. 11, 2017", 19 pgs.
"U.S. Appl. No. 14/826,018, Notice of Allowance dated Aug. 28, 2017", 13 pgs.
"U.S. Appl. No. 14/826,018, Preliminary Amendment filed Aug. 28, 2015", 8 pgs.
"U.S. Appl. No. 14/826,018, Response Filed May 11, 2017 to Non Final Office Action dated Jan. 11, 2017", 14 pgs.
"U.S. Appl. No. 14/826,025, Final Office Action dated May 15, 2017", 13 pgs.
"U.S. Appl. No. 14/826,025, Non Final Office Action dated Aug. 25, 2016", 14 pgs.
"U.S. Appl. No. 14/826,025, Preliminary Amendment filed Aug. 28, 2015", 6 pgs.
"U.S. Appl. No. 14/826,025, Response filed Jan. 25, 2017 to Non Final Office Action dated Aug. 25, 2016", 13 pgs.
"U.S. Appl. No. 14/949,549, Notice of Allowance dated Jan. 18, 2017", 11 pgs.
"U.S. Appl. No. 14/949,549, Response filed Jul. 20, 2016 to Non Final Office Action dated Apr. 20, 2016", 8 pgs.
"U.S. Appl. No. 14/949,549, Response filed Aug. 26, 2016 to Non Final Office Action dated Apr. 20, 2016", 8 pgs.
"U.S. Appl. No. 14/949,549, Response filed Dec. 27, 2016 to Final Office Action dated Oct. 27, 2016", 7 pgs.
"U.S. Appl. No. 14/952,699, Non Final Office Action dated Jun. 8, 2016", 9 pgs.
"U.S. Appl. No. 14/952,699, Notice of Allowability dated Oct. 7, 2016", 5 pgs.
"U.S. Appl. No. 14/952,699, Notice of Allowance dated Jan. 9, 2017", 9 pgs.
"U.S. Appl. No. 14/952,699, Notice of Allowance dated Sep. 19, 2016", 8 pgs.
"U.S. Appl. No. 14/952,699, Preliminary Amendment filed May 27, 2016", 8 pgs.
"U.S. Appl. No. 14/952,699, Response filed Sep. 8, 2016 to Non Final Office Action dated Jun. 8, 2016", 8 pgs.
"U.S. Appl. No. 15/057,047, Non Final Office Action dated Sep. 29, 2016", 19 pgs.
"U.S. Appl. No. 15/057,047, Notice of Allowance dated Feb. 10, 2017", 11 pgs.
"U.S. Appl. No. 15/057,047, Preliminary Amendment filed Sep. 15, 2016", 5 pgs.
"U.S. Appl. No. 15/057,047, Response Filed Dec. 29, 2016 to Non Final Office Action dated Sep. 29, 2016", 11 pgs.
"U.S. Appl. No. 15/211,917, Non Final Office Action dated Nov. 15, 2017", 13 pgs.
"U.S. Appl. No. 15/211,917, Preliminary Amendment filed Dec. 2, 2016", 8 pgs.
"U.S. Appl. No. 15/595,629, Preliminary Amendment filed Jul. 24, 2017", 8 pgs.
"U.S. Appl. No. 15/619,150, Preliminary Amendment filed Aug. 28, 2017", 8 pgs.
"U.S. Appl. No. 15/722,868, Advisory Action dated Apr. 8, 2020", 3 pgs.
"U.S. Appl. No. 15/722,868, Examiner Interview Summary dated Aug. 27, 2020", 3 pgs.
"U.S. Appl. No. 15/722,868, Final Office Action dated Jan. 28, 2020", 23 pgs.
"U.S. Appl. No. 15/722,868, Non Final Office Action dated May 18, 2020", 26 pgs.
"U.S. Appl. No. 15/722,868, Non Final Office Action dated Oct. 4, 2019", 19 pgs.
"U.S. Appl. No. 15/722,868, Notice of Allowance dated Sep. 3, 2020", 22 pgs.
"U.S. Appl. No. 15/722,868, Preliminary Amendment filed Jan. 19, 2018", 8 pgs.
"U.S. Appl. No. 15/722,868, Response filed Jan. 6, 2020 to Non Final Office Action dated Oct. 4, 2019", 12 pgs.
"U.S. Appl. No. 15/722,868, Response filed Mar. 30, 2020 to Final Office Action dated Jan. 28, 2020", 11 pgs.
"U.S. Appl. No. 15/722,868, Response filed Aug. 18, 2020 to Non Final Office Action dated May 18, 2020", 12 pgs.
"U.S. Appl. No. 15/849,362, Final Office Action dated May 2, 2019", 8 pgs.
"U.S. Appl. No. 15/849,362, Non Final Office Action dated Oct. 5, 2018", 9 pgs.
"U.S. Appl. No. 15/849,362, Notice of Allowance dated Jul. 18, 2019", 10 pgs.
"U.S. Appl. No. 15/849,362, Notice of Allowance dated Nov. 20, 2019", 11 pgs.
"U.S. Appl. No. 15/849,362, Preliminary Amendment filed Feb. 22, 2018", 7 pgs.
"U.S. Appl. No. 15/849,362, Response filed Jan. 7, 2019 to Non Final Office Action dated Oct. 5, 2018", 14 pgs.
"U.S. Appl. No. 15/849,362, Response filed Jul. 2, 2019 to Final Office Action dated May 2, 2019", 10 pgs.
"U.S. Appl. No. 16/730,678, Corrected Notice of Allowability dated Nov. 8, 2021", 2 pgs.
"U.S. Appl. No. 16/730,678, Non Final Office Action dated May 7, 2021", 10 pgs.
"U.S. Appl. No. 16/730,678, Notice of Allowability dated Mar. 16, 2022", 2 pgs.
"U.S. Appl. No. 16/730,678, Notice of Allowance dated Oct. 29, 2021", 9 pgs.
"U.S. Appl. No. 16/730,678, Response filed Oct. 7, 2021 to Non Final Office Action dated May 7, 2021", 8 pgs.
"U.S. Appl. No. 17/103,870, Preliminary Amendment filed Feb. 9, 2021", 8 pgs.
"U.S. Appl. No. 17/125,979, Preliminary Amendment filed Apr. 7, 2021", 9 pgs.
"U.S. Appl. No. 13/310,417, Response filed Dec. 8, 2014 to Non Final Office Action dated Sep. 8, 2014", 11 pgs.
"U.S. Appl. No. 13/408,877, Reply Brief dated Aug. 8, 2016", 5 pgs.

(56) References Cited

OTHER PUBLICATIONS

"U.S. Appl. No. 14/949,549, Final Office Action dated Oct. 27, 2016", 14 pgs.
"U.S. Appl. No. 14/949,549, Non Final Office Action dated Apr. 20, 2016", 14 pgs.
"Australian Application Serial No. 2006272510, Office Action dated Oct. 22, 2010", 3 pgs.
"Australian Application Serial No. 2006272510, Response filed Oct. 6, 2011 to Office Action dated Oct. 22, 2011", 15 pgs.
"Australian Application Serial No. 2012200701, Office Action dated Aug. 21, 2013", 2 pgs.
"Australian Application Serial No. 2012200701, Response filed Dec. 12, 2013 to Office Action dated Aug. 21, 2013", 33 pgs.
"Australian Application Serial No. 2013270518, Response filed May 25, 2016 to Subsequent Examiners Report dated Feb. 1, 2016", 13 pgs.
"Australian Application Serial No. 2013270518, Subsequent Examiners Report dated Feb. 1, 2016", 2 pgs.
"Australian Application Serial No. 2013270518, Subsequent Examiners Report dated Jun. 7, 2016", 2 pgs.
"European Application Serial No. 05775617.3, Extended European Search Report dated Mar. 24, 2009", 8 pgs.
"European Application Serial No. 06800464.7, Amendment filed Mar. 21, 2011", 7 pgs.
"European Application Serial No. 06800464.7, Examination Notification Art. 94(3) dated May 2, 2014", 8 pgs.
"European Application Serial No. 06800464.7, Extended European Search Report dated Aug. 24, 2010", 8 pgs.
"European Application Serial No. 06800464.7, Response filed Sep. 11, 2014 to Office Action dated May 2, 2014", 16 pgs.
"European Application Serial No. 06800464.7, Summons to Attend Oral Proceedings mailed Oct. 10, 2017", 10 pgs.
"International Application Serial No. PCT/US2005/026768, Demand mailed Mar. 7, 2007", 9 pgs.
"International Application Serial No. PCT/US2005/026768, International Preliminary Report on Patentability dated Mar. 29, 2007", 8 pgs.
"International Application Serial No. PCT/US2005/026768, International Search Report dated Mar. 7, 2007", 5 pgs.
"International Application Serial No. PCT/US2005/026768, Written Opinion dated Mar. 7, 2007", 5 pgs.
"International Application Serial No. PCT/US2006/020950, International Preliminary Report on Patentability dated Dec. 13, 2007", 6 pgs.
"International Application Serial No. PCT/US2006/020950, International Search Report dated Feb. 5, 2007", 2 pgs.
"International Application Serial No. PCT/US2006/020950, Written Opinion dated Feb. 5, 2007", 4 pgs.
"International Application Serial No. PCT/US2006/029456, International Preliminary Report on Patentability dated Feb. 7, 2008", 9 pgs.
"International Application Serial No. PCT/US2006/029456, International Search Report dated Oct. 1, 2007", 5 pgs.
"International Application Serial No. PCT/US2006/029456, Written Opinion dated Oct. 1, 2007", 7 pgs.
"International Search Report and Written Opinion in PCT/US05/26768, dated Mar. 7, 2007", 15 pgs.
Hall, et al., "Market Value and Patent Citations", The RAND Journal of Economics, vol. 36, No. 1, (2005), 16-38.
Mary, Ellen Mogee, et al., "Patent co-citation analysis of Eli Lilly & Co. patents", Expert Opinion on Therapeutic Patents, (Feb. 25, 2005).
Paul, Stockwell, et al., "Use of an automatic content analysis tool: A technique for seeing both local and global scope", Int. J. Human-Computer Studies 67, (2009), 424-436.
Sheremetyeva, Svetlana, "Natural Language Analysis of Patent Claims", Department of Computational Linguistics Copenhagen Business School, Bernhard Bangs Alle 17 B, DK—year 2000, Denmark, (2000), 66-73.
U.S. Appl. No. 17/589,635, Non Final Office Action dated Oct. 25, 2022, 11 pgs.
U.S. Appl. No. 17/589,635, Response filed Feb. 27, 2023 to Non Final Office Action dated Oct. 25, 2022, 11 pgs.

\* cited by examiner

FIG. 4

Ontology Concept(s)

Back to Ontology Page

Search Criteria

Clear Filters

| Where | Text | * | | ☐ Show Inherited | New Portfolio Ontology<br>openty responses<br>Perpetual Motion | Go | Search |

○ Technology Category  ○ Keyword  ⦿ Scope Concept

Show [100] root concept per page.  Go to Page [ ] Go

ScopeConcept

[First] [Previous] Concept 1 to 2 of 2 [Next] [Last]

Bulk Add  Add new

| | Clipboard Concept | Concept | Claim(s) Count | Indirect Claims Count | Hier. Claim(s) Count | Ontology | | Actions |
|---|---|---|---|---|---|---|---|---|
| | | ○ fluid with randomly moving particles | 3 | 0 | 3 | Perpetual Motion | | |
| | | ○ flux modulation controller generating an electromagnetic field or a gravidomagnetic field | 3 | 0 | 3 | Perpetual Motion | | |

*FIG. 5*

| Search Criteria | | |
|---|---|---|
| Search Claims | ⊙ Independent Claims ○ Dependent Claims ○ Both | |
| Search Expression | [⊙] razor && handle | |
| Highlight Keywords | ☑ Searched Keywords ☐ Mapped Keywords | Search |
| Tech Category(s) | Select Tech Category(s)  Tech Category(s) are - ○ And ⊙ Or ☑ Show TC  Clear Tech Category(s) | Reset Filters |
| | Technology Concept Name | Filter |
| | Liquid Dispensing Razors | ⊙ Direct Mapped Claims<br>○ Direct Mapped or 'Does Not Map'<br>○ Direct Mapped or 'Unresolved' |
| Scope Concept(s) | Select Scope Concept(s)  Scope Concept(s) are - ⊙ And  ☑ Show SC | |

*FIG. 6*

| Scope Concept(s) | Scope Concept Name | Filter |
|---|---|---|
| | Multiple Blades | ○ Direct Mapped Claims<br>◉ Do not include Direct Mapped and 'Does Not Map'<br>○ Direct Mapped or 'Does Not Map'<br>○ Direct Mapped or 'Unresolved' |

*FIG. 7*

```
806 ─┤ Add_New | Cancel | Return_to_Mapping                              Help
      ┌─────────────────────────────────────────────────────────────────────┐
      │ Search:                                                             │
      │ ┌──────┐  Text  ┌──────────────────┐                                │
802 ──┤ │Where │        │ *                │          ┌Search┐ ┌Clear┐      │
      │ │      │  Show Inherited ☐ Selected Ontology │Razors - Shaving│     │
      │ └──────┘                                                            │
      │ ☐ Intelli-Search                                                    │
      ├─────────────────────────────────────────────────────────────────────┤
      │ Search Results                                                      │
      ├─────────────────────────────────────────────────────────────────────┤
      │ Showing [100]    Concepts per page. Go to Page    [      ] [Go]     │
      │                                                                     │
      │ [First]  [Previous]     Concept 1 to 1 of 1       [Next]  [Last]    │
804 ──┤ [Map]                                                               │
810 ──┤ ☐ │ Category/Concept │ Description             │ Ontology        │ Action              │
808 ──┤ ☐ │ ⚙○ multiple blades│ Subject created by Claimbot │ Razors - Shaving │ Map | Modify and Map │── 812
```

FIG. 8

| Create/Edit Concept |  |
|---|---|
|  | [Save] [Cancel] |
| Concept Name | handle having a conduit for the passage of liquid |
| Description | Subject created by Claimbot |
| Concept Type | Scope Concept ▼ |
| Attach To Ontology | New Portfolio Ontology<br>Perpetual Motion<br>Perpetual Motion 2<br>Razors - Shaving<br>SLW IP |

FIG. 9

| TITLE | | | | TITLE #1 | TITLE #2 |
|---|---|---|---|---|---|
| PATENT # | | | | 6,697,XXX | 7,272,XXX |
| FILING DATE | | | | OCT 01, 1999 | JAN 14, 20 |
| TOTAL CLAIMS | | | | 58 | 28 |
| CLAIM # (INDEPENDENT) | | | | 1, 11, 30, 44, 52 | 1, 14, 22 |
| OWNER | | | | ACME CO. | DYNAMITE, |
| SCOPE CONCEPT INTRODUCED FIRST BY: | DATE SC FIRST INTRODUCED | | | | |
| SCOPE CONCEPT (FREQUENCY, DESC.) | | TOTAL | | | |
| SC #1 | ACME | 5 | 10% | 1, 1, 1, 1, 1 | 1 |
| SC #2 | DYNAMITE | 4 | 8% | 1, 1, 1 | 1 |

Fig. 10

| TITLE | | | | TITLE #1 | | | | TITLE #2 | | | | TITLE #3 | | | |
|---|---|---|---|---|---|---|---|---|---|---|---|---|---|---|---|
| PATENT # | | | | 6,697,XXX | | | | 7,272,XXX | | | | 7,327,XXX | | | |
| FILING DATE | | | | OCT 01, 1999 | | | | JAN 14, 2004 | | | | MAR 02, 2004 | | | |
| TOTAL CLAIMS | | | | 58 | | | | 28 | | | | 24 | | | |
| CLAIM # (INDEPENDENT) | | | | 1 | 11 | 30 | 44 | 52 | 1 | 14 | 22 | 27 | 1 | 11 | 18 | 24 |
| CLAIM COVERAGE | | | | 3 | 3 | 3 | 3 | 3 | 1 | 1 | 1 | 1 | 2 | 2 | 2 | 2 |
| PRODUCT COVERAGE | HAS FEATURE? | | | POTENTIALLY APPLIES | | | | DOESN'T APPLY | | | | NOT SURE | | | |
| SCOPE CONCEPT (FREQUENCY, DESC.) | RATING (1-3) | TOTAL | | | | | | | | | | | | | |
| SC #1 | 3 | 20 | 38% | 2 | 2 | 2 | 2 | 2 | 2 | 2 | 2 | 1 | 1 | 1 | 1 |
| SC #2 | 2 | 7 | 13% | | | | | | | | | | | | |
| SC #3 | 3 | 7 | 13% | 2 | 2 | 2 | 2 | | | | | 1 | 1 | 1 | 1 |
| SC #4 | 1 | 6 | 12% | | | | | | | | | | | | |
| SC #5 | 3 | 5 | 10% | 2 | 2 | 2 | 2 | | | | | | | | |
| SC #6 | 1 | 4 | 8% | | | | | | | | | | | | |

Fig. 11

| | | NEED FEATURE? | | | TITLE #1 | | | | TITLE #2 | | | | TITLE #3 | | | |
|---|---|---|---|---|---|---|---|---|---|---|---|---|---|---|---|---|
| TITLE | | | | | | | | | | | | | | | | |
| PATENT# | | | | | 6,697,XXX | | | | 7,272,XXX | | | | 7,327,XXX | | | |
| FILING DATE | | | | | OCT 01, 1999 | | | | JAN 14, 2004 | | | | MAR 02, 2004 | | | |
| TOTAL CLAIMS | | | | | 58 | | | | 28 | | | | 24 | | | |
| CLAIM# (INDEPENDENT) | | | | | 1 | 11 | 30 | 44 | 52 | 1 | 14 | 22 | 27 | 1 | 11 | 18 | 24 |
| CLAIM STATUS | | | | | | | | | | 3 | 3 | 3 | 3 | | | | |
| | | | | | DON'T NEED | | | | POSSIBLY NEED | | | | WANT | | | |
| SCOPE CONCEPT (FREQUENCY, DESC.) | RATING (1-3) | TOTAL | % | | | | | | | | | | | | | |
| SC #1 | 3 | 20 | 38% | | 2 | 2 | 2 | 2 | 2 | 2 | 2 | 2 | 1 | 1 | 1 | 1 |
| SC #2 | 2 | 7 | 13% | | | | | | | | | | | | | |
| SC #3 | 3 | 7 | 13% | | 2 | 2 | 2 | 2 | | | | | 1 | 1 | 1 | 1 |
| SC #4 | 1 | 6 | 12% | | | | | | 2 | 2 | 2 | 2 | | | | |
| SC #5 | 1 | 5 | 10% | | 2 | 2 | 2 | 2 | | | | | | | | |
| SC #6 | 3 | 4 | 8% | | | | | | 2 | 2 | 2 | 2 | | | | |

Fig. 12

| TITLE | | | | | TITLE #1 | TITLE #2 | TITLE #3 |
|---|---|---|---|---|---|---|---|
| PATENT # | | | | | 6,697,XXX | 7,272,XXX | 7,327,XXX |
| FILING DATE | | | | | OCT 01, 1999 | JAN 14, 2004 | MAR 02, 2004 |
| TOTAL CLAIMS | | | | | 58 | 28 | 24 |
| CLAIM # (INDEPENDENT) | | | | | 1 \| 11 \| 30 \| 44 \| 52 | 1 \| 14 \| 22 \| 27 | 1 \| 11 \| 18 \| 24 |
| CLAIM VALUE | | | | | 1 \| 1 \| 1 \| 1 \| 1 | 3 \| 3 \| 3 \| 3 | 2 \| 2 \| 2 \| 2 |
| POTENTIAL PATENT VALUE | | | | | NOT IMPORTANT | ESSENTIAL | IMPORTANT |
| SCOPE CONCEPT (FREQUENCY, DESC.) | NEED FEATURE? | | | | | | |
| | RATING (1-3) | | TOTAL | | | | |
| SC #1 | 3 | | 20 | 38% | 2 | 2 | 1 |
| SC #2 | 2 | | 7 | 13% | 2 | 2 | 1 |
| SC #3 | 3 | | 7 | 13% | | | |
| SC #4 | 1 | | 6 | 12% | 2 | | |
| SC #5 | 1 | | 5 | 10% | | | |
| SC #6 | 3 | | 4 | 8% | | | |

Fig. 13

| TITLE | | | | TITLE #1 | TITLE #2 | TITLE #3 |
|---|---|---|---|---|---|---|
| PATENT # | | | | 6,697,XXX | 7,272,XXX | 7,327,XXX |
| FILING DATE | | | | OCT 01, 1999 | JAN 14, 2004 | MAR 02, 2004 |
| TOTAL CLAIMS | | | | 58 | 28 | 24 |
| CLAIM # (INDEPENDENT) | | | | 1 / 11 / 30 / 44 / 52 | 1 / 14 / 22 / 27 | 1 / 11 / 18 / 24 |
| CLAIM STATUS | | | | 2 / 2 / 2 / 2 / 2 | 3 / 3 / 3 / 3 | 1 / 1 / 1 / 1 |
| FEATURE RATING | | | | SOME OVERLAP | COMPLETE OVERLAP | NO OVERLAP |
| | FEATURE SHOWN? | | | | | |
| SCOPE CONCEPT (FREQUENCY, DESC.) | RATING (1-3) | TOTAL | | | | |
| SC #1 | 3 | 20 | 38% | 2 | 2 | 1 |
| SC #2 | 1 | 7 | 13% | 2 | 2 | 1 |
| SC #3 | 3 | 7 | 13% | ▨ | ▨ | ▨ |
| SC #4 | 1 | 6 | 12% | 2 | 2 | 1 |
| SC #5 | 1 | 5 | 10% | ▨ | ▨ | ▨ |
| SC #6 | 3 | 4 | 8% | ▨ | ▨ | ▨ |

Fig. 14

| CLAIM CONCEPT WHITE SPACE ANALYSIS | | |
|---|---|---|
| USED SCOPE CONCEPTS IN RED | | |
| UNUSED/UNCLAIMED SCOPE CONCEPTS IN BLUE | | |
| SCOPE CONCEPT (FREQUENCY, DESC.) | NUMBER OF USES | PERCENT |
| SC #1 | 20 | 38% |
| SC #2 | 7 | 13% |
| SC #3 | 7 | 13% |
| SC #4 | 6 | 12% |
| SC #5 | 5 | 10% |
| SC #6 | NOT FOUND | 0% |
| SC #7 | NOT FOUND | 0% |

PATENT MAPPING

RELATED APPLICATIONS

This application is a continuation of and claims the benefit of priority under 35 U.S.C. § 120 to U.S. patent application Ser. No. 16/352,364, filed on Mar. 13, 2019, which is a continuation of and claims the benefit of priority under 35 U.S.C, § 120 to U.S. patent application Ser. No. 13/309,200, filed on Dec. 1, 2011, which claims the benefit under 35 U.S.C. 119(e) of U.S. Provisional Patent Application Ser. No. 61/542,515 filed Oct. 3, 2011, and which claims the benefit under 35 U.S.C. 119(e) of U.S. Provisional Patent Application Ser. No. 61/561,502 filed. Nov. 18, 2011, each of which is incorporated herein by reference in its entirety and made a part hereof.

This application is related to U.S. patent application Ser. No. 12/605,030, entitled "Patent Mapping" by Steve W. Lundberg and Thomas G. Marlow filed Oct. 23, 2009, which is incorporated herein by reference in its entirety and made a part hereof. U.S. patent application Ser. No. 12/605,030 claims the benefit under 35 U.S.C. 119 (e) of U.S. Provisional Patent Application Ser. No. 61/107,930 filed Oct. 23, 2008, which is also incorporated herein by reference in its entirety and made a part hereof.

BACKGROUND

The management of a patent portfolio involves multiple stages. Initially, a decision is made as to what inventions are worth the investment of filing a patent application. Then, each filed patent application goes through prosecution with the patent office. Finally, for each patent that is allowed, maintenance fees are usually payable at a variety of intervals to keep the patent in force. Quick claim scope or relevancy determination is important in managing the assessment of large volumes of patent matters in a patent portfolio.

Tools for identifying patents for a particular purpose such as a prior art search, validity analysis, or a freedom to operate investigation, operate by performing Boolean queries using various search operators. These operators allow for searching by date, terms, document number, and patent classification, among others. These tools further allow for searching individual document portions such as a document title, abstract, or claim set.

Other searching tools accept freeform text. Such tools accept a freeform text block and extract information from the text block deemed most likely to return acceptable results. However, such tools are still limited to only performing Boolean queries and displaying a list of results.

These search tools often provide large numbers of results, most of which are irrelevant. These tools fail to present results in a manner allowing for quick relevancy determinations. The presentation also fails to provide enough detail suggesting how to adjust a search for obtaining only relevant results. Further, the search tools provide the documents of the result set in a manner very similar to the traditional paper format of the documents. Quick relevancy determination is important in managing the assessment of large volumes of prior art for potential citation to government patent agencies.

BRIEF DESCRIPTION OF DRAWINGS

Some embodiments are illustrated by way of example and not limitation in the figures of the accompanying drawings in which:

FIGS. 4-9 are user interfaces, according to example embodiments.

Figure 16:
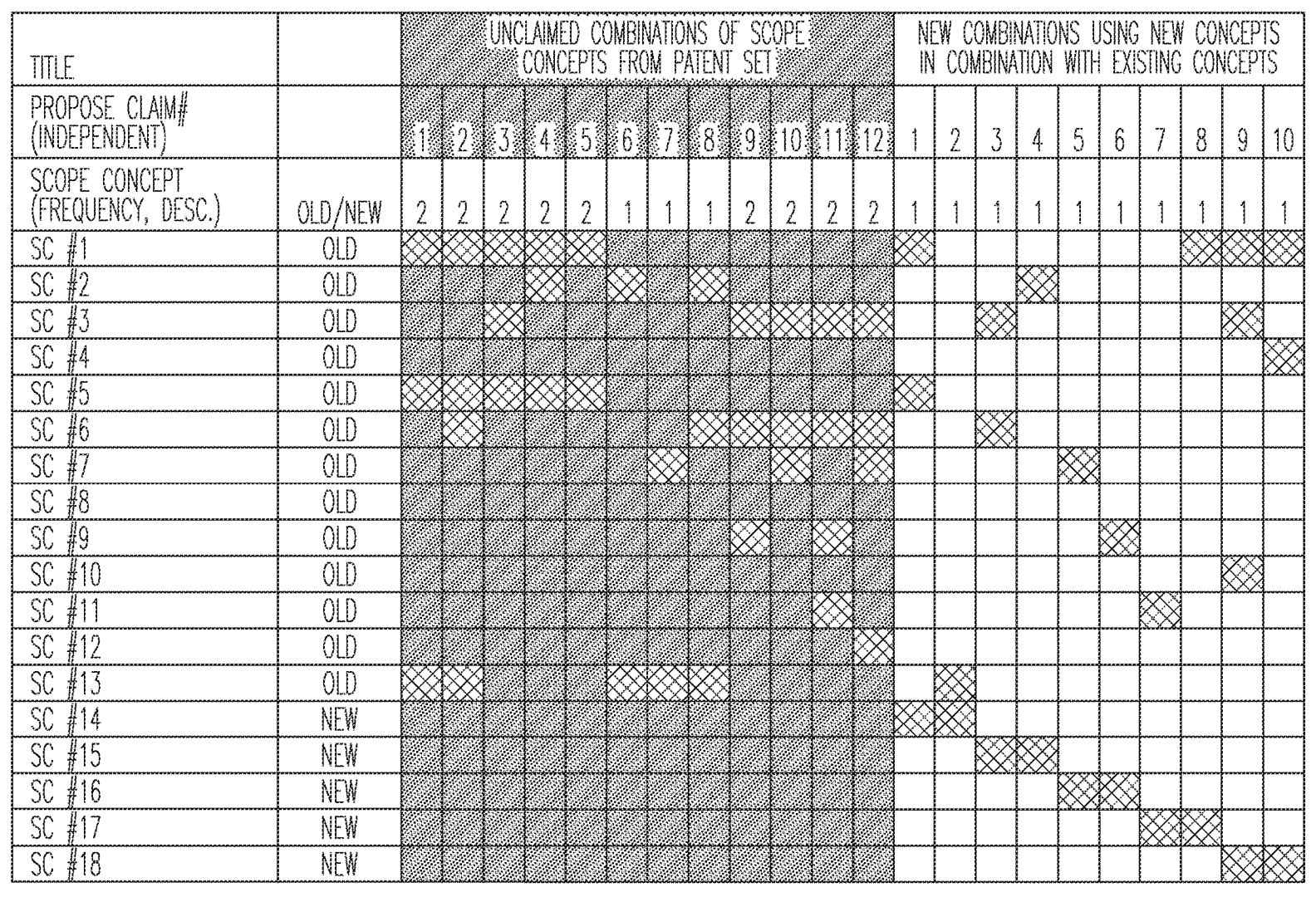

FIGS. 10-16 are example generated charts, according to example embodiments.

DETAILED DESCRIPTION

The life cycle of a patent may include multiple stages. These stages generally include invention, filing a patent application on the invention, prosecuting the patenting application to allowance or abandonment, determining whether to file any continuing applications, and paying maintenance fees on the allowed patent.

At each stage, one or more parties determine the best course of action to take with respect to the invention. For example, when determining whether or not to file a patent, the inventor may know what products are out in the technology area of the invention, a business manager may know how the invention fits in with a company's goals, and a patent attorney may have researched existing patents or application in the technology area of the patent. These parties will ultimately decide whether it is worth the initial investment of filing an application on the invention and then determine the next course of action at each future stage.

In some instances, an inventor, business manager or portfolio manager may wish to monitor the patent activities of one or more competitors. The provision of up-to-date information relating to cited references or technology trends in the art to which a user's or competitor's patent portfolio relates may be particularly helpful in devising patenting strategy or making informed business decisions.

Tools

In various embodiments, a patent management system includes tools to help the parties involved in the patenting process make decisions at each stage in the life of a patent. These tools may also be used for general research by parties not immediately involved with the patenting of the invention. Additionally, these tools may be used as standalone tools, in combination with other tools, and in combination with other patent management systems. Examples of tools include, but are not limited to, prosecution analytics, reference management, prior art analytics, docketing management, claim mapping, claim analytics, portfolio analytics, external database (e.g., PAR) analytics, annuity management, and strategic monitoring.

Meaning of Certain Terms

The systems, methods and tools of the present disclosure set forth in this specification are described in relation to a patent management system and patent matters, but it will be understood that embodiments of the present invention could equally be applied to other forms of intellectual property (trademarks, copyright, registered designs, and the like). Moreover, the term "patent" is not intended to be limited to an issued patent, but may include a pending patent application or un-filed application or invention disclosure. The term "user" is intended to cover any person interacting with the patent management system. A user may be an inventor, portfolio manager, business manager or patent attorney, for example.

Computer Network System

Figure 1:
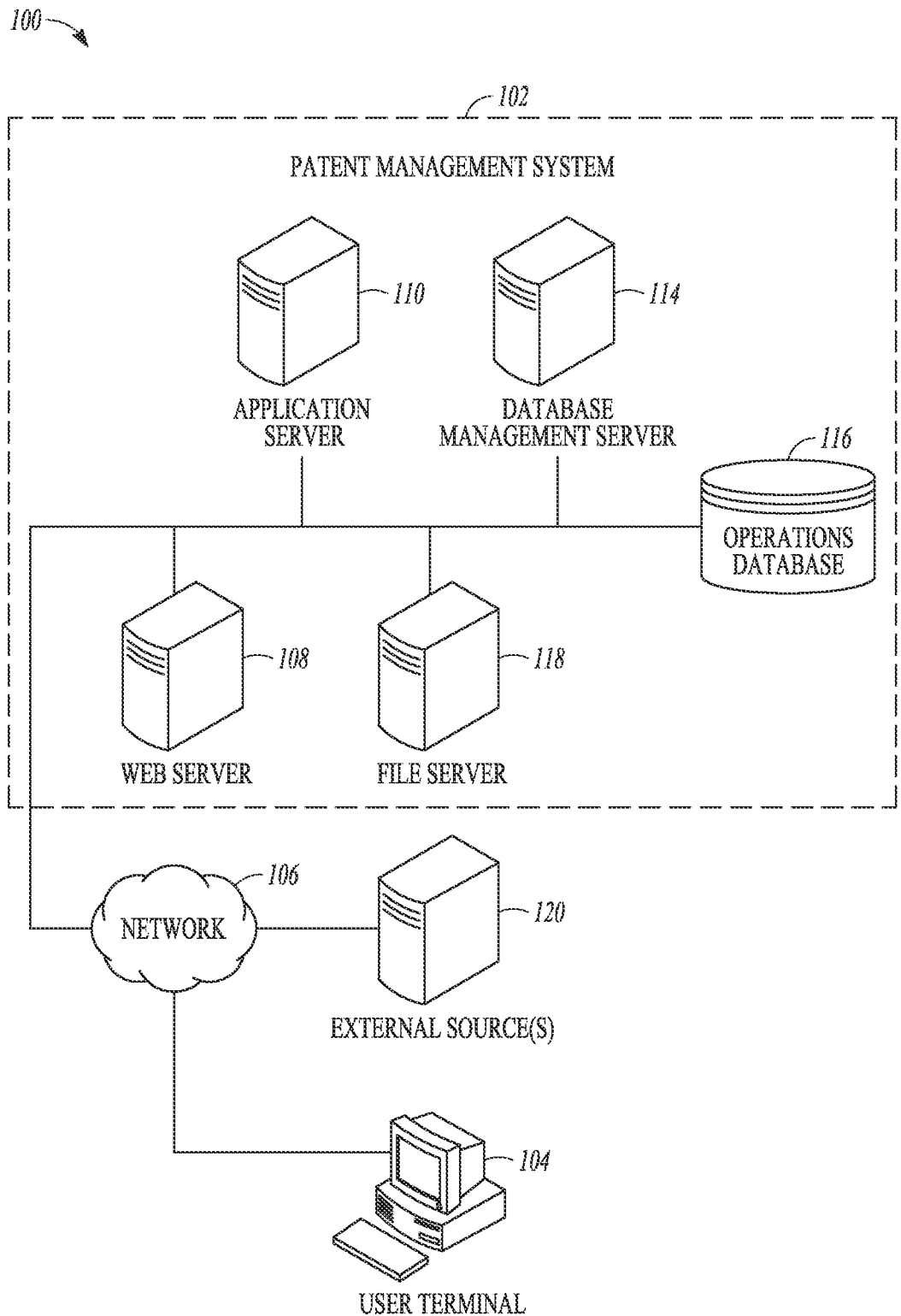
FIG. 1 is a system component diagram, according to an example embodiment.

FIG. 1 is a schematic view of computer network system 100 according to various embodiments. The computer network system 100 includes patent management system 102 and user terminal 104 communicatively coupled via network 106. In an embodiment, patent management system 102 includes web server 108, application server 110, and database management server 114, which may be used to manage at least operations database 116 and file server 118. Patent management system 102 may be implemented as a distributed system; for example, one or more elements of the patent management system 102 may be located across a wide-area network (WAN) from other elements of patent management system 102. As another example, a server (e.g., web server 108, file server 118 database management server 114) may represent a group of two or more servers, cooperating with each other, provided by way of a pooled, distributed, or redundant computing model.

Network

Network 106 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LAN's or WAN's, such as the Internet. The various devices/systems coupled to network 106 may be coupled to network 106 via one or more wired or wireless connections.

Web Server

Web server 108 may communicate with file server 118 to publish or serve files stored on file server 118. Web server 108 may also communicate or interface with the application server 110 to enable web-based applications and presentation of information. For example, application server 110 may consist of scripts, applications, or library files that provide primary or auxiliary functionality to web server 108 (e.g., multimedia, file transfer, or dynamic interface functions). Applications may include code, which when executed by one or more processors, run the tools of patent management system 102. In addition, application server 110 may also provide some or the entire interface for web server 108 to communicate with one or more of the other servers in patent management system 102 (e.g., database management server 114).

Web server 108, either alone or in conjunction with one or more other computers in patent management system 102, may provide a user-interface to user terminal 104 for interacting with the tools of patent management system 102 stored in application server 110. The user-interface may be implemented using a variety of programming languages or programming methods, such as HTML (HyperText Markup Language), VBScript (Visual Basic® Scripting Edition), JavaScript™, XML® (Extensible Markup Language), XST™ (Extensible Stylesheet Language Transformations), AJAX (Asynchronous JavaScript and XML), Java™, JFC (Java™ Foundation Classes), and Swing Application Programming Interface for Java™).

User Terminal

User terminal 104 may be a personal computer or mobile device. In an embodiment, user terminal 104 includes a client program to interface with patent management system 102. The client program may include commercial software, custom software, open source software, freeware, shareware, or other types of software packages. In an embodiment, the client program includes a thin client designed to provide query and data manipulation tools for a user of user terminal 104. The client program may interact with a server program hosted by, for example, application server 110. Additionally, the client program may interface with database management server 114.

Operations Database

Operations database 116 may be composed of one or more logical or physical databases. For example, operations database 116 may be viewed as a system of databases that when viewed as a compilation, represent an "operations database." Sub-databases in such a configuration may include a matter database, a portfolio database, a user database, a mapping database and an analytics database. Operations database 116 may be implemented as a relational database, a centralized database, a distributed database, an object oriented database, or a flat database in various embodiments, Framework, Data Structure and Sources In various embodiments, the tools of the patent management system 102 share a common framework. The framework may have a base organization unit of a matter. In various embodiments, a matter is an issued patent or patent application that includes one or more patent claims. In an embodiment, a matter is generally identified by its patent number or publication number. Identification may mean either identification as it relates to a user of the patent management system 102 or within the patent management system 102. Thus, a user may see a matter listed as its patent number while internally a database of the patent management system 102 may identify it by a random number. One or more matters may be associated with prior art or cited references stored in a reference or prior art database.

One or more matters may be grouped together to form a portfolio. A matter may also be associated with one or more other matters in a family. A family member may be a priority matter, a continuing (e.g., continuation, divisional) matter, or foreign counter-part member. Family members may be determined according to a legal status database such as INPADOC.

Data stored in a first database may be associated with data in a second database through the use of common data fields. For example, consider entries in the matter database formatted as [Matter ID, Patent Number] and entries in the portfolio database formatted as [Portfolio ID, Matter ID]. In this manner, a portfolio entry in the portfolio database is associated with a matter in the matter database through the Matter ID data field. In various embodiments, a matter may be associated with more than one portfolio by creating multiple entries in the portfolio database, one for each portfolio that the matter is associated with. In other embodiments, one or more patent reference documents may be associated with a patent by creating multiple entries in the patent database, for example. The structure of the database and format and data field titles are for illustration purposes, and other structures, names, or formats may be used. Additionally, further associations between data stored in the databases may be created as discussed further herein.

During operation of patent management system 102, data from multiple data sources (internal and external) is imported into or accessed by the operations database 116. Internal sources may include data from the various tools of the patent management system 102. External sources 120 may include websites or databases associated with foreign and domestic patent offices, assignment databases, WIPO, and INPADOC. In various embodiments, the data is scraped and parsed from the websites if it is unavailable through a database. The data may be gathered using API calls to the sources when available. The data may be imported and stored in the operations database on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

After data importation, the data may be standardized into a common format. For example, database records from internal or external sources may not be in a compatible format with the operations database. Data conditioning may include data rearrangement, normalization, filtering (e.g., removing duplicates), sorting, binning, or other operations to transform the data into a common format (e.g., using similar date formats and name formats).

Patent Management System—Overview

Figure 2:
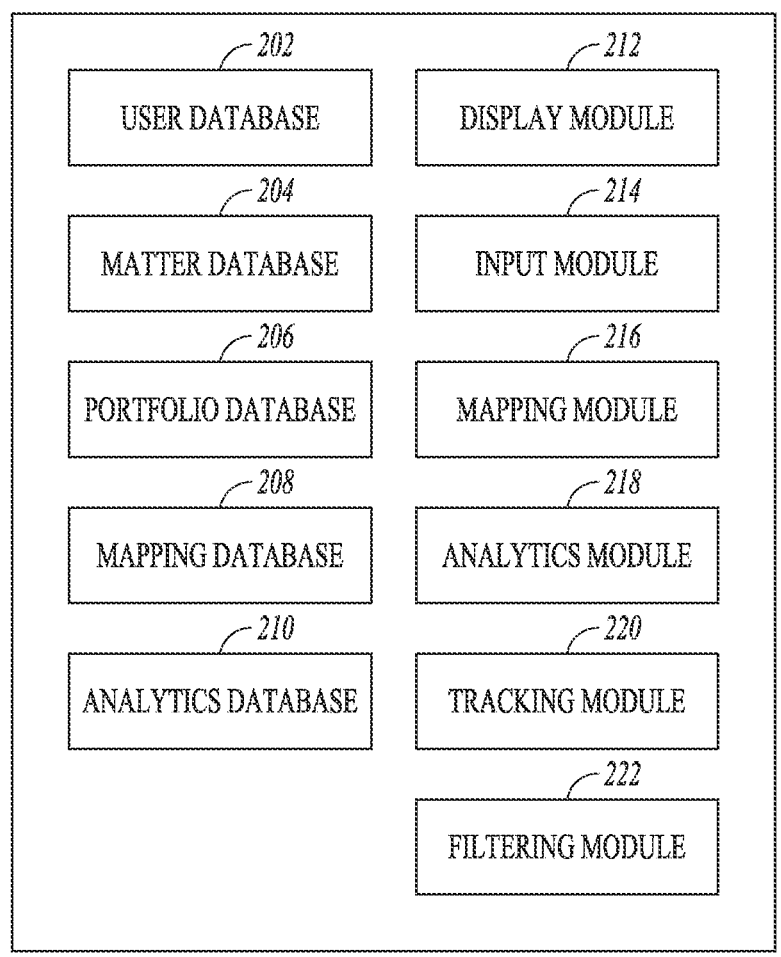
FIG. 2 is a block diagram of a patent management system, according to an example embodiment.

FIG. 2 is a block diagram of patent management system 102, according to an example embodiment. Illustrated are user database 202, matter database 204, portfolio database 206, mapping database 208, analytics database 210, display module 212, input module 214, mapping module 216, analytics module 218, tracking module 220 and filtering module 222. In various embodiments, the data stored in databases 202, 204, 206, 208, and 210 may be in the same or multiple physical locations. For example, portfolio database 206 may be stored in one or more computers associated with a portfolio management service. In various embodiments, patent management system 102 mirrors databases stored in other locations. In an embodiment, when a request is made to access data stored in the databases 202-210, patent management system 102 determines where the data is located and directs the request to the appropriate location. Similarly, modules 212-222 may be executed across multiple computer systems.

User Database

In an example embodiment, user database 202 stores data representing users of patent management system 102. The data may include data fields of user credentials including a user ID and password and access rights with respect to patent management system 102. The user ID may be common across the tools of the patent management system 102. In this manner, access rights of the user with respect to the tools of the patent management system 102 may follow across the various tools of the patent management system 102. In an example embodiment, different access rights are granted to a user ID between the various tools.

In various embodiments, each user ID has access rights to one or more matters. Similarly, a user ID may have portfolio level access rights. Access rights may be defined according to at least two parameters: read access and write access. Thus, when a user logs into patent management system 102, the user is presented with access only to the matters/portfolios that have been associated with the user ID. More (e.g., additional contact information) or fewer data fields associated with a user may be included in a user entry stored in user database 202.

Patent or Matter Database

In an embodiment, matter database 204 stores data representing matters. Each matter may be associated with one or more portfolios. In some embodiments, a matter is associated with no portfolios. In various embodiments, a matter is a foreign or domestic patent or application. Matters may also be inventions that have not yet been filed (e.g., as may be the case within a docketing system). In an embodiment, a matter entry includes data fields representing a matter ID, patent number, publication number, serial number, docketing number, title (e.g., the name of the patent or application), type of the matter (e.g., application, issued patent, PCT application), status of the matter (e.g., issued, abandoned, allowed), a link to the patent office where the matter was filed, a link to a PDF download of the matter, abstract of the matter, inventors of the matter, current owner of the matter, cited references on the face of the matter, filed date, issue date, docket number, and annuity information (e.g., due date, country, and amount due). In some embodiments, other patent reference documents or prior art in any form may be stored and associated with one or more matters. More or fewer data fields associated with a patent may be included in a matter entry stored in matter database 204, In an example embodiment, matter database 204 may store a patent matter database, wherein this database includes data about the patent matters. The data may include, for at least one patent matter, a claim set or statement of invention and a priority date for the claim set or statement of invention.

Matter database 204 may also store a database of prior art documents (also known as "references"), wherein the prior art database includes data about the prior art documents. The data may include, for at least one prior art document, a priority date or publication date of the document. One or more of the prior art documents may be associated with a first patent matter in the patent matter database.

Matter database 204 may also store data obtained from internal or external sources relating to cited references owned by or cited against (in "forward" or "reverse" manner) a target entity (for example, a client of a firm) as well as cited references owned by or cited against (in "forward" or "reverse" manner) another entity (for example, a competitor of the client or other target entity). Public bibliographic details of such cited references may be obtainable from websites or databases associated with foreign and domestic patent offices (PAW), assignment databases, WIPO, and INPADOC. In various embodiments, the data is scraped and parsed from the websites if it is unavailable through a database. The data may be gathered using API calls to the sources when available. The data may be imported and stored in the operations database 116 (of FIG. 1) on a scheduled basis, such as daily, weekly, monthly, quarterly, or some other regular or periodic interval. Alternatively, the data may be imported on-demand. The imported data may relate to any information pertaining to patents or patent applications, such as serial numbers, title, cited art, inventor or assignee details and the like.

In various embodiments, a matter is associated with one or more other matters as a family with a family ID. Family members may be priority documents, continuation patents/applications, divisional patents/applications, and foreign patent/application counterparts. In an embodiment, family information is determined according to an external source such as INPADOC. Patent reference documents and/or other prior art may be manually or automatically stored, cross-cited and associated with related family matters, for example.

Portfolio Database

Portfolio database 206, in an example embodiment, stores data representing portfolios of one or more matters. Data stored in portfolio database 206 may have been previously generated by a tool of patent management system 102. In various embodiments, a portfolio may be generated by a user using patent management system 102. For example, a user interface may be presented to the user requesting a name for the portfolio and identifiers of matters to be included in the portfolio. In an embodiment, a portfolio entry in portfolio database 206 includes the data fields of portfolio ID and portfolio name. Additionally, a data field for matter ID may also be included in an entry in the portfolio database 206. Thus, each portfolio may be associated with one or more matters through the use of the matter ID data field. More or fewer data fields associated with a portfolio may be included in a portfolio entry of portfolio database 206.

Mapping Database and Patent Concepts

In various embodiments, mapping database 208 may include mappings of patent concepts to one or more matters. In an example embodiment, the underlying patents and patent claims included in each patent portfolio may be categorized by patent concepts (sometimes referred to herein as concepts) such as scope concepts (SC) and technology categories (TC).

In an example embodiment, technology categories are categories that claims relate to, but are not necessarily limited to. For example, a claim to a pulse generator may be put in the technology category "pacemaker", but not be limited to a pacemaker per se—perhaps the claim merely says that the pulse generator generates a pulse of certain type that is useful for pacing, but pacing does not appear in the claim. Hence, the claim relates to the technology category "pacemaker," but it is not limited to being a pacemaker.

In an example embodiment, scope concepts are concepts that a claim is limited to. This is in contrast to technology categories, where the claim may be mapped to a TC but it not necessarily limited to it. A scope concept may be defined in a way to give the concept a context that a user can understand without necessarily having to look at the corresponding claim language. For example, if the scope concept is "method or apparatus for cardiac rhythm management", and it is mapped to claim A, then claim A by definition is limited to this application, such that if a target device does not perform cardiac rhythm management, then it would not infringe claim A.

In an example embodiment, there are two types of scope concepts: 1) high level scope concepts that are like technical categories in the sense they are broad and general and apply to many claims in a portfolio; and 2) scope concepts that are specific to a limited number of claims—for example all claims in a patent may be limited to a very specific distinguishing feature, and this feature could be the basis for a scope concept.

In some example embodiments, high level scope concepts may be defined prior to mapping, and then assigned as applicable. For example, several scope concepts like: atrial pacing, ventricular pacing, defibrillation method or device, etc, may be defined. Then a mapping team may go through all claims in a portfolio and map these scope concepts to claims that are limited to these concepts. After the mapping is complete, an analysis may be done showing how many claims in the portfolio are limited to each of these scope concepts, and the claims may be presented for each SC. This may be useful in disqualifying claims that are not of interest to a particular target (e.g., if an analysis is being done to find a claim that covers an alleged infringer).

In some example embodiments, specific scope concepts are mapped patent by patent or by patent family. These may enable a person to create one or two scope concepts that can be mapped across all claims in a given patent, a family of patents, or across a portion of a patent portfolio. In order to effectively formulate a scope concept that may be globally useful across a patent portfolio, it may be useful to be able to examine multiple patent claims at the same time even if they are not all in the same patent or patent family. A keyword mapping may indicate that there is an exact match between the keyword and a subset of the claim language.

Analytics Database

In various embodiments, analytics database 210 stores data representing calculated analytics on data stored within patent management system 102 or external data sources. In various embodiments, analytics are organized according to an individual matter, a portfolio, or family, or date of an event (such as an assignment recordal, for example). Events may be organized by a date range (for example, all assignments occurring between Corporation A and Corporation B in the last 6 months, or all filings made by inventor X in last 12 months). The calculated analytics may be based on information gathered from multiple sources such as databases of patent management system 102 and PAIR.

In various embodiments, information for an individual matter may include status (e.g., disclosure received, drafting, filed, completed-waiting examination, in prosecution, allowed, issued), cited prior art, list and type of rejections (e.g., 35 U.S.C. § 101, 102, 103) number of claims allowed, office action count, interviews held, IDS statements filed, attorney fees to date, and PTO fees to date. Further metrics for an individual matter stored in analytics database 210 may include time waiting for examiner, total time in examination, time waiting for PTO while in examination, and time on appeal. Additional prosecution details may include an upcoming docket date (e.g., due dates for office action, IDS due dates, etc.). A claim prosecution history chart may also be stored in analytics database 210 for each matter. The prosecution history may include a history of claim amendments and arguments made in prosecution.

In various embodiments, portfolio and family analytics information may be stored in analytics database 210 based on aggregating the metrics for an individual matter. In an embodiment, the analytics of a family may differ from those in a portfolio as not all family member matters may be part of a portfolio. Additionally, the analytics may be stored for multiple time periods such that comparisons may be made between current metrics and metrics from a year ago (or other time period).

Aggregated metrics may include total patents and applications, pending and waiting for examination, in prosecution with no claims allowed, in prosecution with some claims allowed, appealed, notice of allowance received, and issued. These metrics may be compiled for both US and international matters in the portfolio. Additional information may include the international portfolio distribution by country. An age distribution of the portfolio may also be compiled. For example the portfolio may be broken down by less than one year old, 1 to 3 years old, 3 to 5 years old, 5 to 10 years old, 10 to 20 years old, and 20 or more years old. Recent filing and issue activity as well as upcoming Ford filing deadlines may be stored in analytics database 210.

In various embodiments, prosecution metrics across a portfolio or family are determined and stored in analytics database 210. This data may include matters waiting for examination, matters in examination, matters appealed, and cases allowed but not yet issued. Analytics with respect to office actions may also be compiled and stored. For example, success of allowance after a first office action response, a second response, and so forth may be stored in analytics database 210. Additional prosecution analytics may include allowance rate (e.g., 10%) after a telephone interview, allowance after an in-person interview, percentage of interviews with response, number and type of rejection, average time in prosecution (e.g., in months), average time to file a response, and average time to next office action. Further, the list of recently allowed cases, recently appealed cases, stalled cases, and recently abandoned cases may also be stored for each portfolio and family in analytics database 210.

In various embodiments, the results of keyword analysis on one or more matters and/or prior art references may be stored in analytics database 210. The keyword analysis may be based on the occurrences of the keywords in the matter or references to derive a score or keyword overlap.

In various embodiments, data stored in the analytics database 210 for a group of matters in a portfolio or family is analyzed to determine the top (e.g., ten) most cited patents, the top most cited inventors, top most cited prior art owners (e.g., according to assignment documents or the face of the patent), newly (e.g., within the last 60 days) cited prior art owners, and top most cited prior art inventors. This information may be stored in analytics database 210.

Display Module

In an embodiment, display module 212 is to display user interfaces and information retrieved from one or more databases 202-210. If a user is accessing patent management system 102 remotely (e.g., through a web browser) display module 212 may be to transmit data representing a user-interface through a network to a user terminal. In various embodiments, display module 212 is to generate one or more charts of data stored in databases 202-210. For example, display module 212 may generate a pie chart of the top 10 inventors within a portfolio.

Input Module

In various embodiments, input module 214 receives data from multiple sources where it may be further processed by one or more other modules and stored in one or more of databases 202-210. In various embodiments, input module 214 or the patent management system 102 may comprise a web server engine or search engine (not shown) for conducting searches through the databases in the system or external thereto, for example at a patent registry or on the Internet. For example, input module 214 may be to utilize one or more APIs to data from one or more patent data stores (e.g., public PAIR, private PAIR, INPADOC, foreign patent offices, patent docketing systems, portfolio management systems, etc). The data may include published patent documents, patent applications, office actions or other patent office correspondence, prior art references, claim mappings, dockets dates, annuity payment data and patent or patent application assignment information. Specific assignment data may include details pertaining to the assignor or assignee (e.g., name, address, nationality, place of incorporation), date of assignment, details of the matter being assigned, or any other data pertaining to assignments or change in ownership that may be recorded at any national or regional patent registry such as the United States Patent and Trademark Office (USPTO), World Intellectual Property Organization (WIPO) or European Patent Office (EPO), for example.

In various embodiments, input module 214 is to receive input from one or more user interface elements. For example, patent management system 102 may present multiple user interfaces to a user. These user interfaces may enable users to input data directly into databases 202-210, instruct the patent management system 102 to retrieve data from patent data stores, and instruct the patent management system to perform various operations (e.g., analysis) on the data in databases 202-210.

Additionally, input module 214 may be to determine the selection of one or more user interface elements by a user and initiate the action associated with the selected user interface element. For example, a user interface element may include a drop-down menu to select a portfolio. Input module 214 may be to receive the selection of the portfolio by the user. Then, input module 214 may pass the selection to one or more other modules for further processing. For example, display module 212 may update the drop-down menu to indicate the selection of the portfolio. In other example embodiments, a user may select an assignee name, or technology field, or date range of potential interest (or a combination of these or other aspects of interest), for which the user wishes to be informed of recent or ongoing assignment or change in ownership status. The user may request to be informed regularly (daily, weekly or monthly, for example) of ongoing assignments or changes in ownership by making a selection of the appropriate interface elements.

In various embodiments, input module 214 processes the data that has been inputted and formats it according to the data fields of databases 202-210 as discussed above. In various embodiments, processing is completed using a parsing module (not shown). For example, consider a patent publication that a user has directed to be inputted into one or more of the databases 202-210. The parsing module may use a combination of automatic image recognition and text analysis to determine the filing date, issue date, title, abstract, and claims of the patent. In some embodiments, the parsing module may flag certain pieces of data that had been determined to be potentially inaccurate (e.g., a number could not be read). A user of patent management system 102 may then examine the flagged data and manually enter the information which is then stored in the appropriate database 202-210.

The resulting data that has been parsed by the parsing module may then be entered as an entry in one or more of databases 202-210. This may be accomplished by, for example, formulating an insert SQL query with the parsed information. In various embodiments, the parsing module may parse multiple pieces of information before generating a database entry. For example, input module 214 may receive a docket number for an issued patent. The docket number may be combined with the information parsed from the issued patent to form an entry in matter database 204.

Mapping and Mining Modules

In various embodiments, mapping module 216 is to facilitate mappings of scope concept, technology categories, prior art and keywords to patent claims of a matter. In an embodiment, mapping signifies association. For example, in conjunction with display module 212, input module 214, or a mining module (not shown), mapping module 216 may present a user interface of patent claims stored in matter database 204 and scope concepts stored in mapping database 208. Input module 214 (or the web server or search engines) may receive a selection of one or more patent claims and one or more scope concepts and pass them to mapping module 216. Mapping module 216 may then formulate an SQL query to associate the one or more patents claims with the one or more scope concepts. When executed, the SQL query may update the mapping database 208 with the associations. In various embodiments, mapping module 216 also allows the creation of new scope concepts, technology categories, and keywords that may be mapped to one or more patent claims. Furthermore, mapping module 216 may present user interfaces that allow a user to rank and rate matters stored in matter database 204.

Mapping module 216 may also allow the generation of claim charts of a plurality of cells. A claim chart may include one or more scope concepts, technology categories, and keywords on one axis and claims of matters in a portfolio on the other axis. The claim chart may include a variety of levels of granularity of scope concepts. Some claims may be mapped to all of the scope concepts while others may not be mapped to any scope concepts. At the cell intersection between a scope concept (or technology category or keyword) and a claim, an indication of the mapping may be presented by changing the format of the cell. For example, the cell may be colored blue when a scope concept is mapped and red when not mapped.

In various embodiments, and as explained in more detail further below, a freedom-to-operate (FTC)) analysis can be greatly facilitated using the mapping module 216 to generate claim charts. For example, a series of scope concepts mapped as being present in a claim may themselves be further mapped as being present (or not) in a competitive product. If all the scope concepts in a given claim, representing all the claim elements in that claim, are found present in a product an indication of "likely infringement" can for example be indicated in the claim chart accordingly. Red or green colored cells in a claim chart could, for example, respectively represent instances of when scope concepts are found present (or mapped) in a product, and when not. If the product being assessed was the patentee's own product, a "product coverage" chart could be generated in similar way.

So too a similar approach can be undertaken for validity analysis in which scope concepts are mapped to body of prior art instead of a product, for example. A green colored cell in a "validity" claim chart might indicate a novel concept for example, while a red colored cell might indicate prior disclosure.

In various embodiments, any one or more of the modules 212-222 can be configured to perform patent searches. For example, mapping module 216 may formulate an SQL query to search for one or more keywords or scope concepts in some prior art. The module may be configured to expand the search automatically, for example based on synonyms, forward or reverse citations, or other criteria. In this way, a seed group of patents can be identified and then expanded automatically.

The claim charts referred to above and in further detail below may be termed "Panoramic Claim Charts" in that they quickly provide to a user a panoramic display in summary overview the findings and conclusions of a mapping exercise, whether the analysis be of FTC), product coverage or validity type. For such charts or spreadsheets, further concept organization may be undertaken.

For example, in a method of concept organization for a Panoramic Claim Charts, a meta-label sort is provided to organize concepts under meta-labels. The meta-labels are like Scope Concept groups and in one example embodiment are added by the mapper to organize map output by the groups. Additionally, the mapper is able to direct or specify the order in which the Scope Concepts are displayed, and is able to store this order or grouping for later reuse. The mapper is optionally able to hide concepts too.

In various embodiments, the mapping module 216 is also able to roll down mapping from independent claims to dependent claims. In other words, independent claim limitations, scope concepts or technology categories are treated as if they were part of dependent claims (or not, as the case may be) and optionally presented in this manner in the Panoramic Claim Chart, A dependent relationship can be established by virtue of a defined claim dependency in a given claim set, or by the mapper who may elect to define a dependency or other relationship on the fly even though such a relationship might not formally be defined in the claim set under analysis.

In various embodiments, keyword clustering may be used for improved claim mapping. This approach may be termed a "clustered" search or mapping with the mapping (or other) module 216 configured accordingly. In an example embodiment of clustered mapping the mapping module 216 and display module 212 may together be configured to display within a mapping tool (referred to as ClaimBot, for example) a user interface which includes a user interface element or mapping feature referred to as OmniMap, for example. Selection of this feature invokes a search function to find like claims. This feature requires some knowledge about what is in the subject patent portfolio and deliberate refinement of a search string that will isolate claims of like kind into a list, before the mapper makes final determination as to whether certain scope concepts apply or "map" to each claim. It is highly desirable to have the same concept mapped to many or at least several claims. Both the knowledge of portfolio content and authoring and refinement of search strings take significant time. In order to further reduce the time needed to achieve high quality maps the following is envisioned.

One or more like claims are selected as keyword 'source claims'. The system automatically extracts keywords from the source claim(s) by considering: removing prepositions, removing other "stop" words, removing insignificant words (as defined by a dictionary), including keywords chosen in ClaimBot keyword mapping, or other criteria. The result is a set of source claim keywords.

In various embodiments, selecting a user interface element (referred to as IntelliMap, for example) a keyword search function is invoked in which the mapping module 216 is configured to search for source claim(s) keywords in the whole portfolio to speed up search and to allow multi-word keywords strings and optionally display the source claim(s) keywords in a pop-up window where the user can select relative importance of the words or groups of words (sub-clustering). The mapping module 216 searches the portfolio for occurrences of source claim keywords optionally using key-word stemming, synonym listings, pre-populated taxonomies/dictionaries, or semantic processing and returns a list of claims that is sorted by intensity of source claim keyword occurrence within the claims being analyzed, or optionally weighing this occurrence intensity against a determined relative importance of the source claim keywords.

This results in a mapping method as follows:

1. Choose one or more similar claims from the portfolio as source claims.

2. Automatically extract keywords from the source claims.

3. Optionally, arrange the order of importance between extracted keywords.

4. IntelliMap chosen keywords.

5. Optionally apply automated key-word stemming, synonym listings, prepopulated taxonomies/dictionaries, or semantic processing.

6. Search portfolio claims for keywords.

7. List the found claims sorted by keyword occurrence intensity.

8. Optionally (1), revise sorting weighted against the order of keyword importance.

9. Optionally (2), the mapper can further use the current search function to refine the list of sought claims e.g. using "!" (NOT) to exclude some claims.

10. The mapper can now peruse the result set for common concepts and map them to the claims.

In various embodiments, steps 2, 4, 5, 6, 7, 8 can be fully automatic while steps 1, 3, 9, 10 initially require manual intervention but can be further automated. Automated aggregation of like claims, as per above, facilitates mapping by organizing claims in clusters of claims based on the claims' keyword content. The mapper can more easily find candidate concepts in the set of sought claims and will immediately have a claim(s) list for mapping the concepts without the need to explicitly author a search string. This method is based on the assumption that like claims to a significant degree use the same or related (e.g synonyms, stems) words.

In various embodiments, a claim similarity index is provided. A claim similarity index identifies claims to map scope concepts to. The similarity of a sub-paragraph (or element) of a claim or a full claim can be measured by: a) keyword similarity—roots of words are compared after throwing out unimportant words; b) linguistic analysis—how similar or not claim elements are based on other approaches. In one implementation, the mapping module 216 is configured to suggest to users mapping claims which claims are most similar to one another, or what parts of claims are most similar to one another. In another implementation, claims are just flagged as similar for later use.

In various embodiments, when mapping claims (for example, using the Omnimap feature mentioned above), a user is allowed to highlight the claim terms associated with a scope concept across a number of claims, storing those associations, and then when subsequently displaying those claims (for example, in the Panoramic Claim Chart) showing which claim terms have already been mapped. In various embodiments, those terms are highlighted in different colors for better visualization. This feature is helpful in situations in which a mapper moves to map another patent and has already mapped portions of claims. The highlighting makes it easier for the mapper to see what he or she has mapped. In some embodiments, the mapping module 216 is configured to automatically identify common claim terms or elements and display this in a user interface so these elements can be mapped more quickly. In some embodiments, the mapper can define common claim terms or filter them based on unique words or phrases of a certain number of words.

In some embodiments, an aid in mapping claims to a product is provided. Instead of using a claim chart, the mapping module 216 and display module 212 are configured together to show claims parsed by paragraph. Next to each paragraph, a mapper can indicate if the product includes the technology described in the claim. The same logic used in scope concept mapping is used to determine if claim is ruled out in an FTO analysis, or is novel in a validity analysis, for example.

Analytics Module

In various embodiments, analytics module 218 is to examine and run calculations on the data stored in the databases 202-210 to generate the analytics previously discussed. For example, analytics module 218 may formulate an SQL query that retrieves the number of times that a prior art reference has been cited within a portfolio. This query may be run for each prior art cited within the portfolio to determine a list of the most cited (e.g., the top ten) prior art references with a portfolio. In an embodiment, the queries are formulated and run as requested by a user. In an embodiment, once the analytics information has been determined, it is stored within analytics database 210. In various embodiments, queries are formulated and run on a periodic basis (e.g., nightly) and entries in analytics database 210 may be updated to reflect any changes. In other embodiments, the analytics module 218 may in response to user input formulate a query to examine how many times a given patent matter has been assigned or been subject to a change in ownership from one party to another. Other queries analyzing patent assignment data may be run as requested by a user.

In various embodiments, the analytics module 218 is to analyze and map cited reference data stored in the matter database 204. The data may be scraped in by the input module 214. For example, cited references owned by or cited against target or other entities as mentioned above may be mapped against each other to determine a "prior art" overlap. The overlap may be presented graphically, for example in a graphic user interface presented in user terminal 104. In various embodiments, the overlap may relate to so-called "forward" citations, or "reverse" citations, or both. In various embodiments, the overlap may be presented for a target company and one or more competitors. Changes in the overlap over time may also be stored and mapped to give an indication to a user of technology trends, changes in trends and the ongoing development of potentially relevant prior art. In various embodiments, a prior art overlap between a target and competitor may be stored, mapped and shown for a single patent, a portfolio of patents, or a family of patents. The target and other entities of interest, such as competitor companies or inventors, may be selected by the user.

An analytical result or mapping may be displayed as a list of prior art cited against both the target and competitor, with an indication of which art overlaps or is common to both listings. In various embodiments, the analytical result or mapping may in addition or alternatively present a list of companies that own the prior art cited against the target and other entities. The target company may appear as an owner. The display module 212 may be to display the results of the mappings and overlap of cited references as a bar chart, or listings, or other graphic, in a user interface of the type shown for example in FIG. 17.

In various embodiments, the analytics module 218 is to receive input identifying a pool of keywords for a first patent matter in matter database 204 and associated prior art documents in matter database 204. The term keyword is intended to include individual keywords as well as a number of keywords grouped together making up a key phrase, for example. The analytics module 218 may be further to perform a keyword analysis on the first patent matter and associated prior art documents based on occurrences of the keywords in the first patent matter and associated prior art documents. The analytics module 218 may be further to identify, based on the analysis, keywords occurring uniquely in the first patent matter. In view of their uniquely occurring nature, these keywords may be regarded as claim elements potentially differentiating the claim set or statement of invention over the disclosures contained in the one or more prior art documents.

In various embodiments, the analytics module 218 is to generate for a user the patent activity profiles of one or more entities. The entities may be competitive entities to the user, or the user's employer or client. The generated activity profiles may form part of the information to assist in strategic monitoring of patent portfolios. A patent activity profile may be built for a particular patent applicant or owner, or a type of owner, and then deviances from that profile may be flagged. The profile may include foreign filing patterns, US filing patterns—for example, analyzing whether the owner typically files a provisional application first followed by a PCT application, or whether a US application is typically filed thereafter. The profile may include information about abandonments—for example, identifying what subject matter an owner gives up or surrenders during prosecution, or in making abandonment decisions.

In various embodiments, the profile may include information about instances or circumstances in which an owner does not pay a patent annuity or renewal fee. The profile may include any of the data stored in analytics database 210 referred to above. Analytics module 218 may be to flag deviances from a profile and send update alerts to a user accordingly. For example, in conjunction with display module 212 and input module 214, analytics module 218 may present to a user an interface indicating one or more patent activity profiles for one or more patent owners for the user to select and review.

Tracking Module

The tracking module 220, according to an example embodiment, maintains information related to a specific patent, group of patents, or concept. For example, the tracking module 220 may store information related to a patent's prosecution and litigation history (such as office actions or claim amendments). In other example embodiments, the tracking module 220 may store information relating to the assignment of patent applications or patents from one assignee to another, or from an inventor to employer assignee, for example. Information of this nature may be stored by tracking module 220 for defined sets of applications or patents registered in a specified name, and within certain date ranges, for example. Update alerts (e.g., electronic mail, SMS, or similar) may be sent to a user indicating a change in ownership for a patent or patent application.

Filtering Module

In various embodiments, the filtering module 222 is to filter a set of matters according to a user preference. For example, a user may activate a check box that indicates only pending matters should be shown in a user interface. Filtering module 222 may formulate an assignment query consistent with retrieving only pending matters. The results of the query (or any query) may then be shared with display module 212 where the user interface may be updated. The regular alerts may in other example embodiments be pushed to a user terminal 104, an external website, an intranet site, a PDA, smart phone, or other similar handheld device.

Various Patent Mapping System Embodiments

In various embodiments, a patent system 102 may be provided comprising: a database of patent sets and a database of patents, each patent stored in the database of patents associated with one or more patent sets stored in the database of patent sets; and a web server engine to receive a search query associated with a first patent set; a mining module to search a first patent set as a function of the search query and generate seed search results, the search results including one or more patent claims associated with the search query and including terms from the search query and being stored in a patent claim database, the mining module to generate automatically an expanded set of search results including one or more patent claims further associated with the search query or associated with the patent claims in the seed set of search results; a mapping module to map the one or more patent claims to a patent concept.

In various embodiments, a system comprises a network and databases, the databases being accessible on the network and including at least one database of patent portfolios and a database of patents, each patent stored in the database of patents associated with one or more patent portfolios stored in the database of patent portfolios; and a server, operatively connected to the network, wherein the server includes: a processor, a memory, software operable on the processor to: receive a search query associated with a first patent portfolio; search the first portfolio as a function of the search query; generate a seed set of search results including one or more patent claims associated with the search query, the patent claims including terms from the search query; automatically generate an expanded set of search results including one or more patent claims further associated with the search query or associated with the patent claims in the seed set of search results; and map the one or more patent claims to a patent concept.

In various embodiments, a system may comprise a database of patent sets and a database of patents, each patent stored in the database of patents associated with one or more patent sets stored in the database of patent sets; a database of ontologies, the ontologies including one or more patent concepts in defined groups; and a web server engine to receive a search query associated with a first patent set; a mining module to search a first patent set as a function of the search query and generate search results, the search results including one or more patent claims associated with the search query and stored in a patent claim database; a mapping module to map the one or more patent claims to a patent concept in a defined group.

In various embodiments, a system may comprise a network and databases, the databases accessible on the network and including at least one database of patent portfolios, and a database of patents, each patent stored in the database of patents associated with one or more patent portfolios stored in the database of patent portfolios, and a database of ontologies, the ontologies including one or more patent concepts in defined groups; and a server, operatively connected to the network, wherein the server includes: a processor, a memory, software operable on the processor to: receive a search query associated with a first patent portfolio; search the first portfolio as a function of the search query; generate search results, the search results including one or more patent claims associated with the search query; and map the one or more patent claims to a patent concept in a defined group.

In various embodiments, a system 102 comprises a database of patent sets and a database of patents, each patent stored in the database of patents associated with one or more patent sets stored in the database of patent sets; a web server engine to receive a search query associated with a first patent set; a mining module to search a first patent set as a function of the search query and generate search results, the search results including one or more independent patent claims associated with the search query and stored in a patent claim database; and a mapping module to map the one or more independent patent claims to a patent concept and associate the at least one mapped patent concept to one or more patent claims which are dependent on the one or more independent patent claims.

In some embodiments, a system comprises a network; databases, accessible on the network, including at least one database of patent portfolios and a database of patents, each patent stored in the database of patents associated with one or more patent portfolios stored in the database of patent portfolios; and a server, operatively connected to the network, wherein the server includes: a processor, a memory, software operable on the processor to: receive a search query associated with a first patent portfolio; search the first portfolio as a function of the search query; generate search results, the search results including one or more independent patent claims associated with the search query; map the one or more independent patent claims to at least one patent concept; and associate the at least one mapped patent concept to one or more patent claims which are dependent on the one or more independent patent claims.

In various embodiments, a system 102 may comprising a database of patent sets and a database of patents, each patent stored in the database of patents associated with one or more patent sets stored in the database of patent sets; and one or more modules to perform at least a portion of one or more of the following: receive input identifying a set of keyword source claims associated with a first patent set; automatically extract at least one keyword from the source claims; receive or formulate a search query associated with the first patent set, the search query including the at least one keyword; search the entire first patent set as a function of the search query; generate search results, the search results including one or more patent claims associated with the search query; and map the one or more patent claims to a patent concept.

In some embodiments, a system comprising a network; databases, accessible on the network, including at least one database of patent portfolios and a database of patents, each patent stored in the database of patents associated with one or more patent portfolios stored in the database of patent portfolios; and a server, operatively connected to the network, wherein the server includes: a processor, a memory, software operable on the processor to: receive input identifying a set of keyword source claims associated with a first patent portfolio; automatically extract at least one keyword from the source claims; receive or formulate a search query associated with the first patent portfolio, the search query including the at least one keyword; search the entire first portfolio as a function of the search query; generate search results, the search results including one or more patent claims associated with the search query; and map the one or more patent claims to a patent concept.

In some embodiments, a system 102 comprises a database of patent sets and a database of patents, each patent stored in the database of patents associated with one or more patent sets stored in the database of patent sets; and a web server engine to receive a search query associated with a first patent set; a mining module to search a first patent set as a function of the search query and generate search results, the search results including one or more patent claims associated with the search query and stored in a patent claim database; a mapping module to generate a claim similarity index for at least one patent claim or portion thereof included in the search results based on its similarity to at least one other patent claim or portion thereof in the search results; identifying, based on the similarity index, one or more patent claims included in the search results as primary targets to map a patent scope to; and map the one or more patent claims to a patent concept.

In various embodiments, a system 102 comprises a network; databases, accessible on the network, including at least one database of patent portfolios and a database of patents, each patent stored in the database of patents associated with one or more patent portfolios stored in the database of patent portfolios; and a server, operatively connected to the network, wherein the server includes: a processor, a memory, software operable on the processor to: receive a search query associated with a first patent portfolio; search the first portfolio as a function of the search query; generate search results, the search results including one or more patent claims associated with the search query; generate a claim similarity index for at least one patent claim or portion thereof included in the search results, based on its similarity to at least one other patent claim or portion thereof in the search results; identify, based on the similarity index, one or more patent claims included in the search results as primary targets to map a patent scope to; and map the one or more patent claims to the patent concept.

In some embodiments, a system comprises a database of patent sets and a database of patents, each patent stored in the database of patents associated with one or more patent sets stored in the database of patent sets; and one or more modules to perform at least a portion of one or more of the following: receive a search query associated with a first patent set, search a first patent set as a function of the search query and generate search results, the search results including one or more patent claims associated with the search query and stored in a patent claim database, map the one or more patent claims to a patent concept, highlight any claim terms associated with the patent scope across a number of claims, store the associations, and display the highlighted claim terms to a user when subsequently displaying the one or more mapped patent claims.

In various embodiments, a system comprises a network; databases, accessible on the network, including at least one database of patent portfolios and a database of patents, each patent stored in the database of patents associated with one or more patent portfolios stored in the database of patent portfolios; and a server, operatively connected to the network, wherein the server includes: a processor, a memory, software operable on the processor to: receive a search query associated with a first patent portfolio; search the first portfolio as a function of the search query; generate search results, the search results including one or more patent claims associated with the search query; map the one or more patent claims to a patent concept; highlight any claim terms associated with the patent scope across a number of claims; store the associations; and display the highlighted claim terms to a user when subsequently displaying the one or more mapped patent claims.

Mapping Methods

Some embodiments of the present inventive subject matter include methods for patent mapping in a patent management system 102. User interfaces such as the one illustrated in FIG. 4 may be used to facilitate these example methods. Further, in example embodiments, the methods may be implemented using the data models, modules, software and server devices described herein.

Figure 3A:
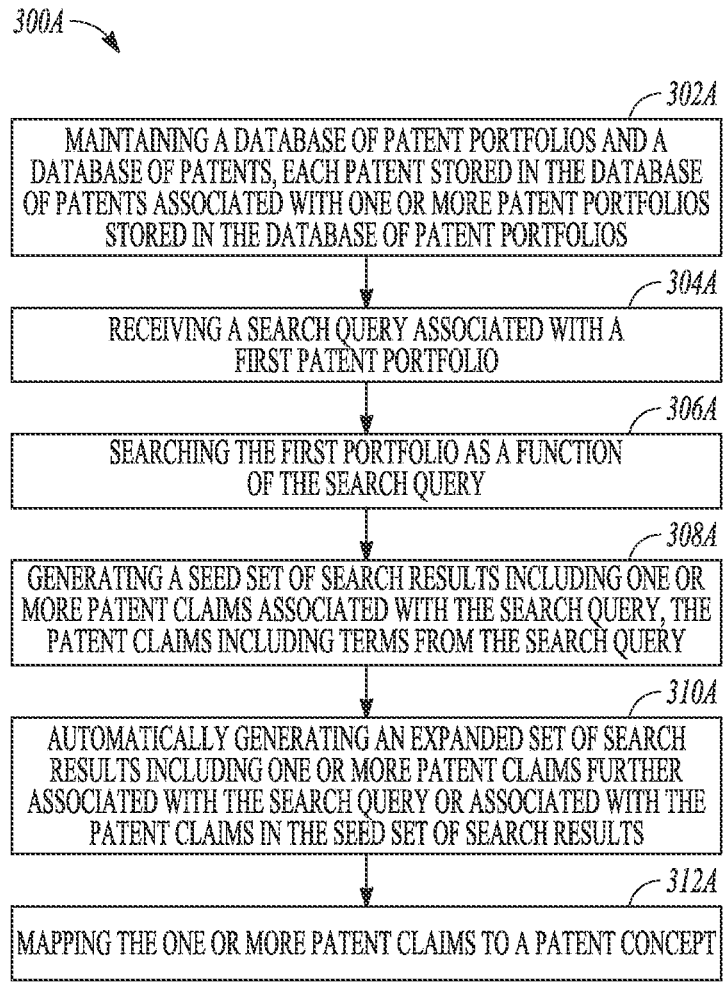
FIGS. 3A-3F are flow charts showing methods, according to example embodiments.

One such method embodiment is illustrated in FIG. 3A. A computer implemented method 300A comprises: at block 302A, maintaining a database of patent portfolios and a database of patents, each patent stored in the database of patents associated with one or more patent portfolios stored in the database of patent portfolios; at block 304A, receiving a search query associated with a first patent portfolio; at block 306A, searching the first portfolio as a function of the search query; at block 308A, generating a seed set of search results including one or more patent claims associated with the search query, the patent claims including terms from the search query; at block 310A, automatically generating an expanded set of search results including one or more patent claims further associated with the search query or associated with the patent claims in the seed set of search results; and at block 312A, mapping the one or more patent claims to a patent concept.

In various embodiments, the automatic generation of expanded search results may include retrieving patent claims from patents cited forward or against the patent claims in the seed set of search results. The computer implemented method may further comprise maintaining a database of ontologies, the ontologies including one or more patent concepts. The one or more patent concepts may include a technology category. The one or more patent concepts may include a scope concept, the scope concept defining a scope to which a patent claim is limited. In some embodiments, the mapping of one or more patent claims to a patent concept may include defining the patent concept. The mapping of one or more patent claims to a patent concept may further include maintaining a database of patent claims the database of patent claims including the one or more patent claims, and storing an indication of a relationship between the patent concept and the one or more patent claims in the database of patent claims. The indication of the relationship may include an indication that the one or more claims are not mapped to the patent concept. The indication of the relationship may include an indication that the one or more patent claims are mapped to the patent concept. The search query may include a regular search expression.

Figure 3B:
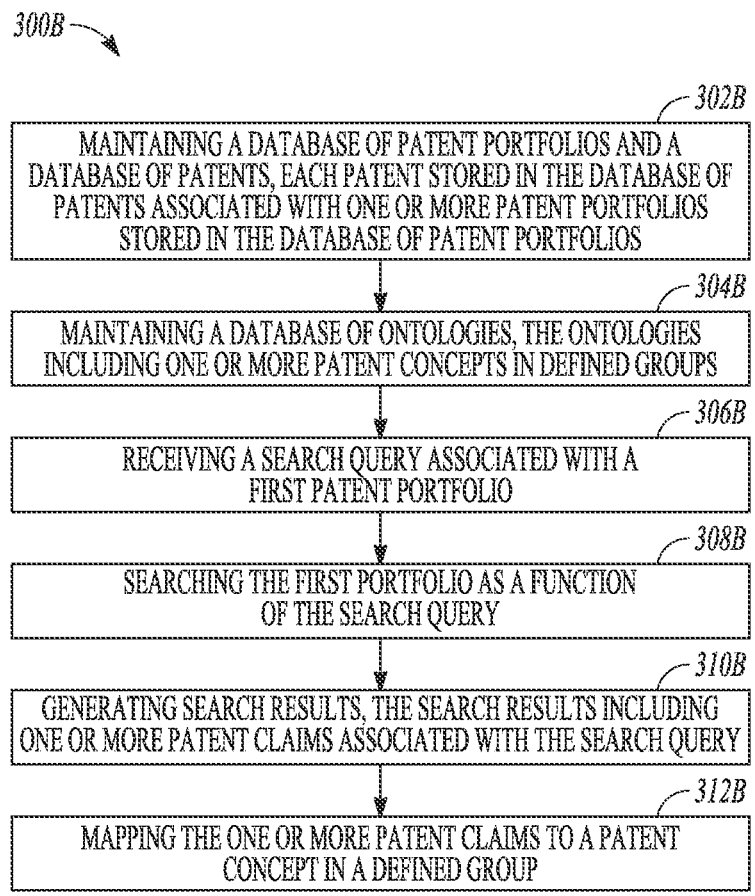

Another example method embodiment is shown in FIG. 3B. A computer implemented method 300B may comprise; at block 302B, maintaining a database of patent portfolios and a database of patents, each patent stored in the database of patents associated with one or more patent portfolios stored in the database of patent portfolios; at block 304B, maintaining a database of ontologies, the ontologies including one or more patent concepts in defined groups; at block 306B, receiving a search query associated with a first patent portfolio; at block 308B, searching the first portfolio as a function of the search query; at block 310B, generating search results, the search results including one or more patent claims associated with the search query; and at block 312B, mapping the one or more patent claims to a patent concept in a defined group.

In various embodiments of the computer implemented method 300B, the one or more patent concepts may include a technology category. The one or more patent concepts may include a scope concept, the scope concept defining a scope to which a patent claim is limited. In some embodiments, mapping a plurality of patent claims to a patent concept may include defining the patent concept and assigning it to one of the defined groups.

In some embodiments, mapping a plurality of patent claims to a patent concept may further include maintaining a database of patent claims, the database of patent claims including the one or more patent claims, and storing an indication of a relationship between the patent concept and the one or more patent claims in the database of patent claims. In some embodiments, the indication of the relationship includes an indication that the one or more claims are not mapped to the patent concept. The indication of the relationship may include an indication that the one or more patent claims are mapped to the patent concept. In some embodiments, the search query includes a regular search expression. Further in some embodiments, generating search results may include retrieving patent claims which include terms from the search query and synonyms of the terms.

Figure 3C:
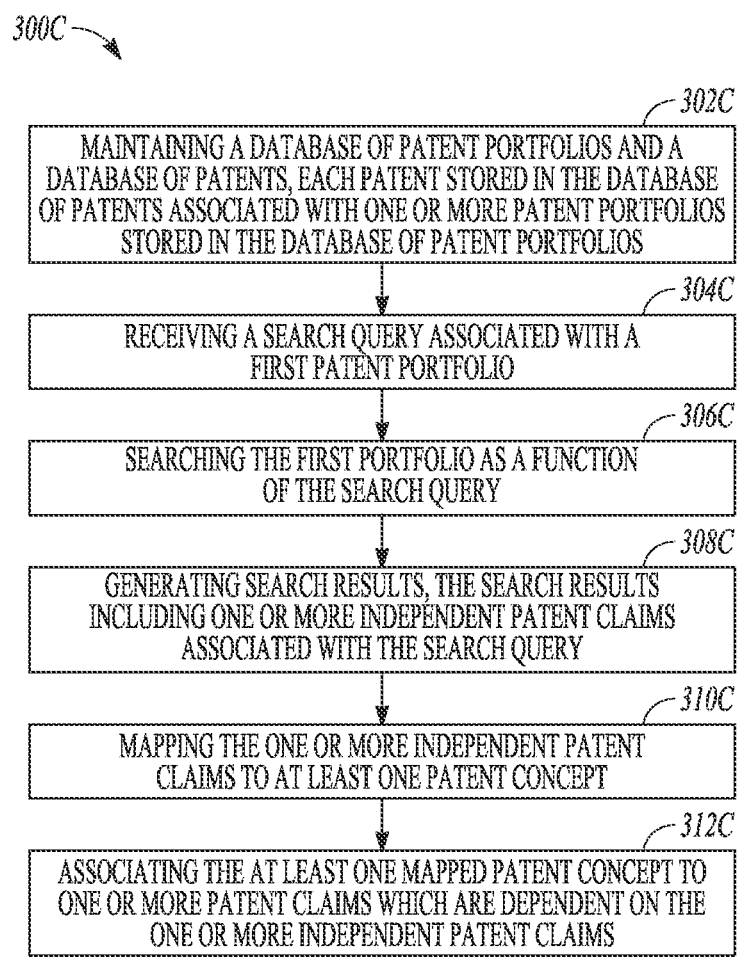

In another example embodiment shown in FIG. 3C, a computer implemented method 300C comprises: at block 302C, maintaining a database of patent portfolios and a database of patents, each patent stored in the database of patents associated with one or more patent portfolios stored in the database of patent portfolios; at block 304C, receiving a search query associated with a first patent portfolio; at block 306C, searching the first portfolio as a function of the search query; at block 308C, generating search results, the search results including one or more independent patent claims associated with the search query; at block 310C, mapping the one or more independent patent claims to at least one patent concept; and at block 312C, associating the at least one mapped patent concept to one or more patent claims which are dependent on the one or more independent patent claims.

In some embodiments, the computer implemented method 300C may further comprise maintaining a database of ontologies, the ontologies including one or more patent concepts. The one or more patent concepts may include a technology category. The one or more patent concepts may include a scope concept, the scope concept defining a scope to which a patent claim is limited.

In some embodiments of the computer implemented method 300C, mapping a plurality of independent patent claims to a patent concept includes defining the patent concept. Mapping a plurality of independent patent claims to a patent concept may further includes maintaining a database of patent claims, the database of patent claims including the one or more independent and dependent patent claims, and storing an indication of a relationship between the patent concept and the one or more independent or dependent patent claims in the database of patent claims. The indication of the relationship may include an indication that the one or more independent or dependent claims are not mapped to the patent concept. The indication of the relationship may include an indication that the one or more independent or dependent patent claims are mapped to the patent concept.

The search query may include a regular search expression, and in some embodiments, generating the search results includes retrieving independent or dependent patent claims which include terms from the search query and synonyms of the terms.

Figure 3D:
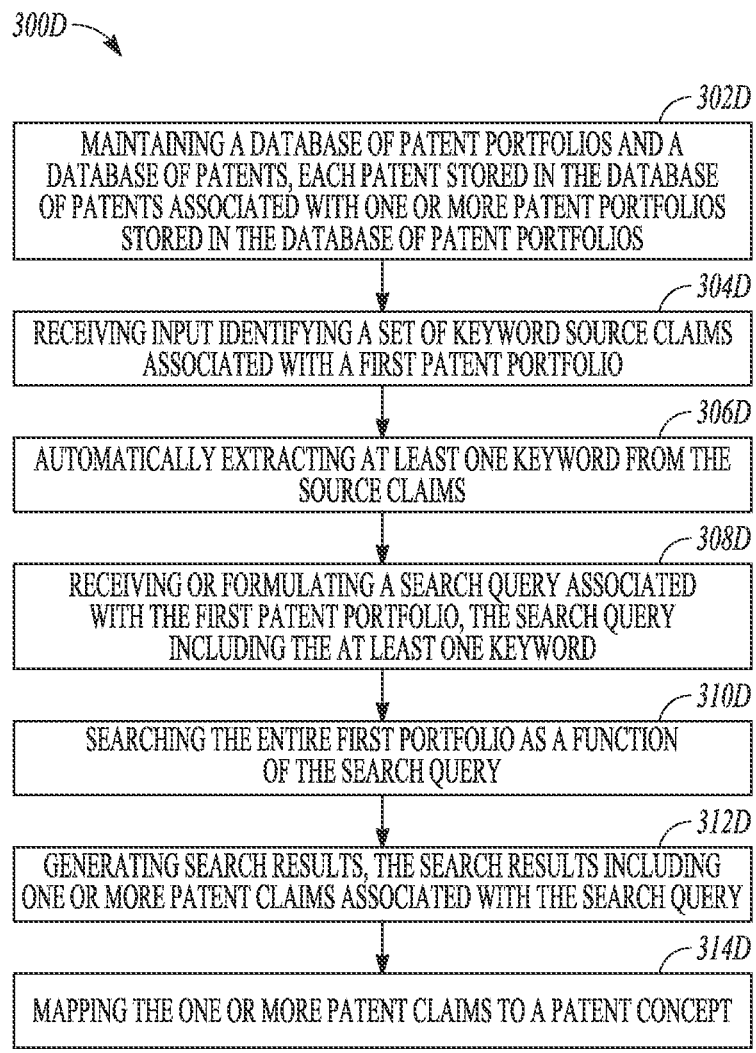

Another example method embodiment is shown in FIG. 3D. Here, a computer implemented method 300D comprises: at block 302D, maintaining a database of patent portfolios and a database of patents, each patent stored in the database of patents associated with one or more patent portfolios stored in the database of patent portfolios; at block 304D, receiving input identifying a set of keyword source claims associated with a first patent portfolio; at block 306D, automatically extracting at least one keyword from the source claims; at block 308D, receiving or formulating a search query associated with the first patent portfolio, the search query including the at least one keyword; at block 310D, searching the entire first portfolio as a function of the search query; at block 312D, generating search results, the search results including one or more patent claims associated with the search query; and at block 314D, mapping the one or more patent claims to a patent concept.

In some embodiments, the computer implemented method 300D may further comprise maintaining a database of ontologies, the ontologies including one or more patent concepts. The one or more patent concepts may include a technology category. The one or more patent concepts may include a scope concept, the scope concept defining a scope to which a patent claim is limited.

In some embodiments, mapping a plurality of patent claims to a patent concept includes defining the patent concept. In various embodiments, mapping a plurality of patent claims to a patent concept further includes maintaining a database of patent claims, the database of patent claims including the one or more patent claims, and storing an indication of a relationship between the patent concept and the one or more patent claims in the database of patent claims. The indication of the relationship may include an indication that the one or more claims are not mapped to the patent concept. The indication of the relationship may include an indication that the one or more patent claims are mapped to the patent concept.

In some embodiments of method 300D, the search query includes a regular search expression, and generating the search results may include retrieving patent claims which include terms from the search query and synonyms of the terms.

Figure 3E:
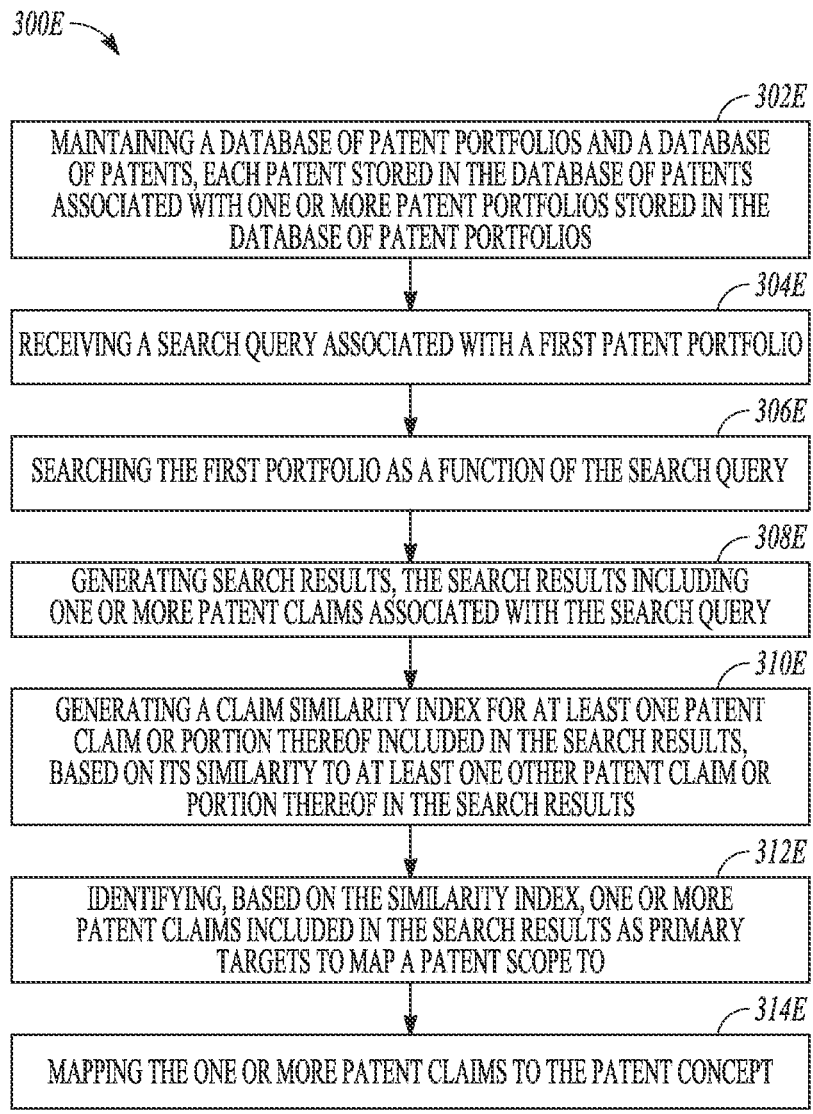

Another example method embodiment is shown in FIG. 3E. A computer implemented method 300E comprises: at block 302E, maintaining a database of patent portfolios and a database of patents, each patent stored in the database of patents associated with one or more patent portfolios stored in the database of patent portfolios; at block 304E, receiving a search query associated with a first patent portfolio; at block 306E, searching the first portfolio as a function of the search query; at block 308E, generating search results, the search results including one or more patent claims associated with the search query; at block 310E, generating a claim similarity index for at least one patent claim or portion thereof included in the search results, based on its similarity to at least one other patent claim or portion thereof in the search results; at block 312E, identifying, based on the similarity index, one or more patent claims included in the search results as primary targets to map a patent scope to; and at block 314E, mapping the one or more patent claims to the patent concept.

In various embodiments of the computer implemented method 300E, the claim similarity index is generated by conducting a keyword similarity analysis on one patent claim or portion thereof included in the search results, and at least one other claim or portion included in the search results. The claim similarity index may be generated by conducting a linguistic analysis on one patent claim or portion thereof included in the search results, and at least one other claim or portion included in the search results.

In some embodiments, the method 300E further comprises maintaining a database of ontologies, the ontologies including one or more patent concepts. The one or more patent concepts may include a technology category. The one or more patent concepts may include a scope concept, the scope concept defining a scope to which a patent claim is limited.

In some embodiments, mapping a plurality of patent claims to a patent concept includes defining the patent concept. The mapping a plurality of patent claims to a patent concept may further include maintaining a database of patent claims, the database of patent claims including the one or more patent claims, and storing an indication of a relationship between the patent concept and the one or more patent claims in the database of patent claims. The indication of the relationship may include an indication that the one or more claims are not mapped to the patent concept. The indication of the relationship may include an indication that the one or more patent claims are mapped to the patent concept.

In various embodiments, the search query includes a regular search expression, and generating the search results may include retrieving patent claims which include terms from the search query and synonyms of the terms.

Figure 3F:
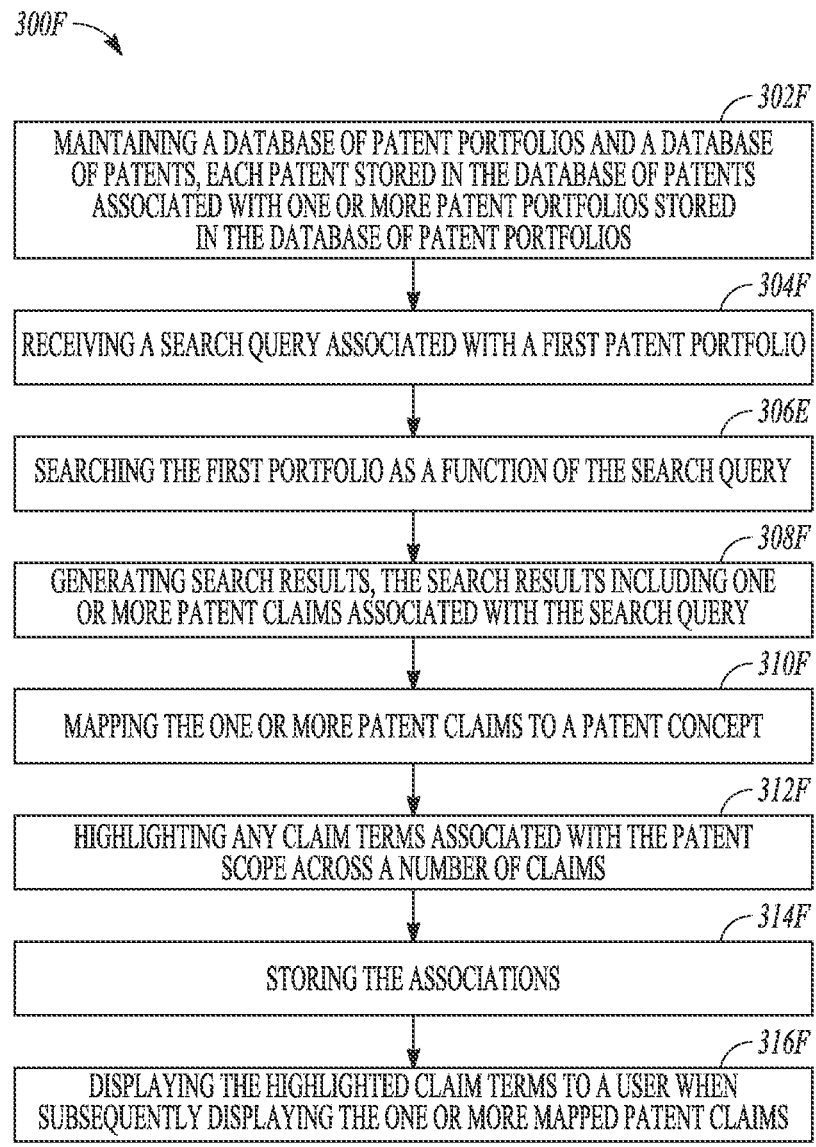

Another example method embodiment is shown in FIG. 3F. A computer implemented method 300F comprises: at block 302F, maintaining a database of patent portfolios and a database of patents, each patent stored in the database of patents associated with one or more patent portfolios stored in the database of patent portfolios; at block 304F, receiving a search query associated with a first patent portfolio; at block 306F, searching the first portfolio as a function of the search query; at block 308F, generating search results, the search results including one or more patent claims associated with the search query; at block 310F, mapping the one or more patent claims to a patent concept; at block 312F, highlighting any claim terms associated with the patent scope across a number of claims; at block 314F, storing the associations; and at block 316F, displaying the highlighted claim terms to a user when subsequently displaying the one or more mapped patent claims.

Some embodiments of method 300F further include maintaining a database of ontologies, the ontologies including one or more patent concepts. The one or more patent concepts may include a technology category. The one or more patent concepts may include a scope concept, the scope concept defining a scope to which a patent claim is limited.

In some embodiments of method 300F, mapping a plurality of patent claims to a patent concept includes defining the patent concept. Mapping a plurality of patent claims to a patent concept may further include maintaining a database of patent claims, the database of patent claims including the one or more patent claims, and storing an indication of a relationship between the patent concept and the one or more patent claims in the database of patent claims. The indication of the relationship may include an indication that the one or more claims are not mapped to the patent concept. The indication of the relationship may include an indication that the one or more patent claims are mapped to the patent concept.

In some embodiments, the search query includes a regular search expression, and generating search results may include retrieving patent claims which include terms from the search query and synonyms of the terms.

For any of the methods described above, a database management system may be used (DBMS) for storing and retrieving data from a data store which includes the database of patents and database of patent portfolios. In some embodiments, the DBMS is a relational database management system (RDBMS). In some other embodiments, the data store includes storing data in a Resource Description Framework Schema (RDFS). In some embodiments, communication with the data store includes using a language such as Structured Query Language (SQL) or eXtensible Markup Language (XML).

As discussed above, an ontology may include all the metadata (patent concepts) that one may wish to map to a patent claim. For instance, the one or more patent concepts may include a technology category. The one or more patent claims may also include a scope concept, the scope concept defining a scope to which a patent claim is limited. Keywords may also be used as patent concepts. These may be any term or short phrase that appears in the claim, exactly as it appears in the claim. As these terms are taken from the claims, they may be thought of as limitations in the sense that if the term cannot be read on an accused device, the claim probably does not cover the accused device. Example user interfaces showing scope concepts in an ontology can be seen with reference to FIG. 5.

A user of the system may wish to search a previously created portfolio of patents. A patent portfolio may include patents that a user wishes to analyze. For example, a portfolio might include all of the patents for a company ABC Corp (ABC). A portfolio may be stored and defined as a patent set in the patent set database ABC might have received information on a potential infringing product. In order to find the patent claims relevant to the product, ABC may wish to map its entire patent portfolio and use the resulting mapped portfolio to quickly find the best claims to assert in an infringement lawsuit. However, it may also be useful to map the patents of the alleged infringer. These patents may also be added to the portfolio as it is likely ABC's patents and the alleged infringer's patents will have overlapping subject matter.

A search query may help to narrow down the patent. In an example embodiment, the search query many include a regular expression. For example, if the search query is "*" all the patent claims in the patent portfolio will be displayed. Boolean expressions such as "car && dog" may also be used. In some example embodiments, an option is included to only search independent claims, dependent claims, or to search both. In some example embodiments, the portfolio may further be narrowed by using patent concepts that have been included in the current ontology.

Portfolio Mapping

Figure 4:
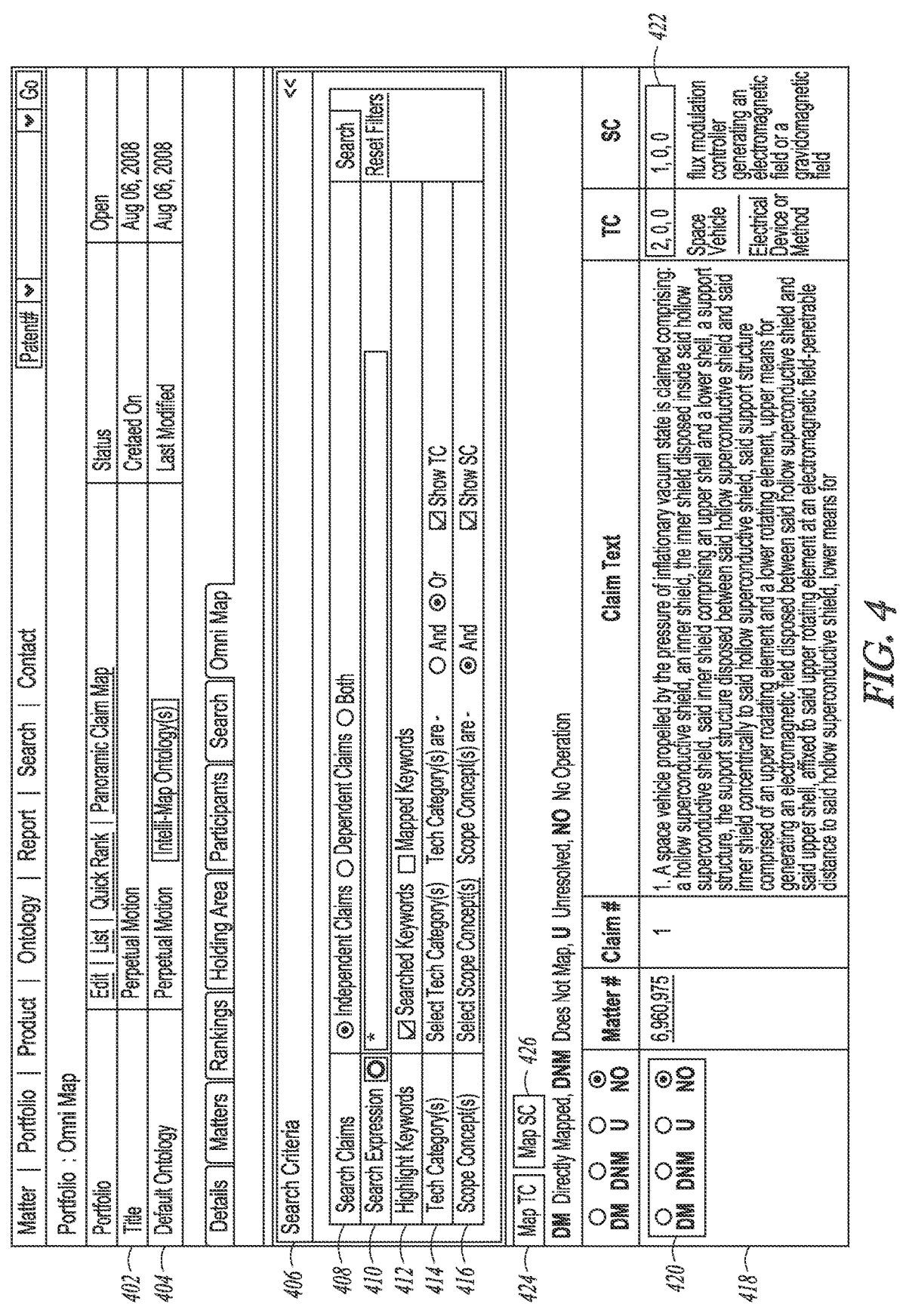

FIG. 4 illustrates an example user interface that may be utilized to facilitate the methods described to map patent claims, according to an example embodiment. Displayed is the title 402 of a patent portfolio, controls are also illustrated that allow a user to edit to the portfolio, list the patents in the portfolio, "quick rank," and generate a panoramic claim map. Also shown is the "Default Ontology" 404 being used. In an example embodiment, "Quick Rank" allows a user to map all the patent claims in a patent to concepts at the same time. An ontology, in an example embodiment, includes the different concepts available to a user to map to one or more of the patent claims. Further, there is an example search criteria box 406 which allows a user to specify a search query. Included are options to narrow the search by type of claim 408 including searching independent claims, dependent claims, or both. The search expression box 410 may allow a user to specify a regular expression to use as a search query. There is also an option to have keywords highlighted 412 in the search results. In an example embodiment, this may include the searched for keywords or keywords that have previously been mapped to the claims. Also shown are options to narrow the search results by technology categories 414 and scope concepts 416.

FIG. 5 illustrates example user interfaces showing scope concepts in an ontology of the type described above with reference to the disclosed methods.

FIG. 6 shows an example user interface with example options available to search by technology category. An example option is presented allowing a user to search technology categories disjunctively or conjunctively. In an example embodiment, each technology category in the ontology is shown to the user with three example options "Direct mapped claims," "Direct Mapped or 'Does Not Map,'" and "Direct Mapped" or 'Unresolved.'

FIG. 7 shows an example user interface with example options available to search by scope concept. In an example embodiment, each scope concept in the ontology is shown to the user with four example options "Direct mapped claims," "Do not include Direct Mapped or 'Does Not Map,'" "Direct Mapped or 'Does Not Map,'" and "Direct Mapped" and 'Unresolved.'

Referring back to FIGS. 3A-3F, in example embodiments a first portfolio is searched as a function of a search query and search results are generated, the search results including one or more patent claims associated with the search query. Using the search query provided, a query may be formatted as an SQL query or other suitable format to query the underlying databases. Generating the search results may include retrieving patent claims which include terms from the search query and synonyms of the terms as well as plural versions of terms in the search query.

The results of the query may then be presented to the user in an example user interface as shown in FIG. 4. Only one patent claim is illustrated, however, more patent claims may have resulted from the search and may be shown simultaneous as to have the ability to manipulate multiple patent claims. Column headings may include four radio buttons 420 signifying the options available for mapping, the matter number, the claim number, the claim text, and other technology categories or scope concepts currently mapped to the claim. Because the generated search results are searching an entire portfolio of patents it may be possible that not all of the claims of a given patent will match to the search query. A trio of numbers 422 may also be displayed for each claim in relationship to the technology category heading and the scope concept heading. These represent the nature of the relationship between the claim and the technology category or scope concept. For example, as illustrated, claim 1 has two technology categories directly mapped: "space vehicle" and "Electric Device or Method." It also has one scope concept directly mapped.

Referring back to FIGS. 3A-3F, in example embodiments, a plurality of patent claims are mapped to a patent concept. In an example embodiment, in addition to the database of patents and patent portfolios, a database of patent claims may be maintained. The database of patent claims may be administered and interacted with using a DBMS as described above. As described above, each patent claim may have one or more patent concepts that have been mapped to the claim.

As discussed above with reference to narrowing down search results, the relationship between a patent concept and a patent claim may take on many forms. For example, the relationship may be one where the patent concept is directly mapped to a patent claim. This may indicate that a user who looked at the claim made the decision that the patent claim was in a particular technology category, for example. Another relationship may indicate that a patent concept is not mapped to a patent claim. If a user is sure that a particular claim is not in a technology category, for example, it may be beneficial for that information to be saved so that the mapping process is not unnecessarily duplicative.

With reference back to FIG. 4, a user may select one or more patent claims to map based on the radio buttons displayed. In an example embodiment, there are four radio buttons indicating options for the claim: "Direct Mapped," "Does Not Map," "Unresolved," and "No Operation." The first two options are described in detail above. The "Unresolved" radio button may indicate that a user is not sure whether the concept should be mapped to the patent claim. This may be helpful in cases where the user does not have the legal or technical expertise to make a decision one way or another. A more senior user may then review the unresolved patent claims en masse at a later time. The last radio button may indicate that a user does not wish to have any relationship defined between the patent claim and a patent concept. In an example embodiment the "No Operation" radio button is selected by default for all the patent claims returned from the search query.

Upon a user indicating a preferred mapping for each patent claim, a user may further indicate a preference of which category of patent concept to map. In an example embodiment, there are two categories: technology categories and scope concepts (e.g., elements 424 and 426 in FIG. 4). In an example embodiment, a user clicks on the button corresponding to their preference and this preference is sent to the service device which detects the category of concept the user clicked. In response, a user interface is presented to the user corresponding to his or her preference. For example, FIG. 8 may be presented.

FIG. 8 illustrates an example search box 802 and an example search results 804 section. Across the top is an option to add a new patent concept 806 (see FIG. 9 for a more detailed look at an example method to add a patent concept). Other options may include returning to the main mapping screen (e.g. FIG. 4) or canceling the mapping. In an example embodiment, the search box allows a user to search across an entire ontology for potential patent concepts. Similar to searching for patent claims, a user may enter a regular expression such as to retrieve all the concepts included in the present ontology. For example, the results of the search 804 displayed in FIG. 8 only returns "multiple blades." A checkbox 808 is presented allowing a user to select the concept. If there is more than one concept displayed a user may select more than one of the concepts by selecting the respective checkboxes next to the patent concepts. A checkbox 810 at the top of the results may be selected if a user wishes to select all of the concepts returned from the ontology search.

Further example options may be presented to the right of each concept. An option to "modify and map" 812 may be selected if the user wishes to modify the concept. This may be useful if a user wishes to broaden the concept so that it may be mapped to more patent claims. For example, a narrow technology category may have been defined as "power computer speakers." Rather than a user defining a new technology category of "passive computer speakers," the user might decide it makes more logical sense to only have one technology category titled "computer speakers." In an example embodiment, the user can safely select "modify and map" and change the technology category to "computer speakers." This may safely be done because all "powered computer speakers" are also "computer speakers." In an example embodiment, every patent claim, regardless of which portfolio(s) it may be included in, will be updated to reflect the modified concept. Thus, it may not be advisable to narrow a concept without being certain every patent claim in the system adheres to the modified concept. In an example embodiment, a warning may be displayed to the user explaining the effects of modifying a concept.

In an example embodiment, an indication of a relationship between the patent concept and the plurality of claims in the database of patents may be stored (e.g., updating one or more databases). This may be accomplished, for example, by the user selecting the map button as displayed in FIG. 8. As discussed above, a user may have selected multiple patent claims resulting from searching and may have further indicated a preference for one or more patents claims to have concepts directly mapped as well as indicated a preference to have one or more patent claims have patent concepts not mapped. Thus, in an example embodiment, the indication of the relationship may include an indication that the plurality of patent claims are not mapped to the patent concept. In an example embodiment, the indication of the relationship includes an indication that the plurality of patent claims are mapped to the patent concept.

In some example embodiments mapping a plurality of patent claims to a patent concept includes defining the patent concept. Defining the patent concept may be initiated by a user clicking on the example "add_new" button 806 as displayed in FIG. 8. An example user interface that may be presented to the user in response to this selection is illustrated in FIG. 9. Two example options may be presented, "Save" and "Cancel." Also shown are two input text boxes, "Concept Name" and "Description." The concept name may be the actual concept and may be, for example, either a technology category or a scope concept. A user may indicate which category of patent concept the new concept belongs using a pull down menu. The user may further wish to add the concept to an existing ontology by selecting one or more ontologies as presented in FIG. 9.

Report and Chart Generation

As described above, the system may allow the generation of visual representation of the data included in the databases to further maximize the value of concepts to patent claims. In some example embodiments, the visual representation may be in the form of charts sometimes called Panoramic Claim Charts which may be interactive. In some example embodiments, a method to generate the charts includes formulating a query to send to one or more databases, the query requesting whether or not a set of patent claims have been mapped to a set of patent concepts. An additional query may be sent to the databases to determine additional metadata about the patent claims including, but not limited to, the filing data and owner of each patent. Ranking data may be received for each patent concept retrieved from the databases. In an example embodiment, the system generates a relationship between a ranking, a patent concept, and a patent claim and displays the relationship to the user in the form of a chart. The ranking data may be stored in the database or may be received from a user. In some embodiments, ranking data may include integer values of disparate range (e.g., 1-10 or 1-100) alphabetical letters (e.g., a grading scale of A-F), or any other means to characterize a claim or concept.

In an example embodiment, a competitor landscape chart may be generated. An example simple competitor landscape chart is shown in FIG. 10. Shown is the title, patent number, filing data, total claims, each independent claim, and owner of each patent in a patent set. The patent set may reflect the patents owned by the competitors of a company requesting the map. The scope concepts that have been mapped to the patent claims in the patent set may be displayed as rows in the chart. If a scope concept has been mapped to a patent claim than the intersecting cell between the patent claim and concept may be filled in, checked, change color, patterned, shaded or otherwise have an indication of the mapping. Additional columns may indicate the competitor that first introduced a concept as well as the date it was introduced. This may be determined by examining each patent that has a concept mapped to at least one of the claims and examining the dates of each of the matching patents. In addition, the scope concepts may be sorted by frequency. Each competitor may be assigned a color or other designation such that a user may quickly determine which company owns each patent as well as who introduced what concepts first.

In an example embodiment, a product coverage chart may be generated. An example product coverage chart is shown in FIG. 11. As with FIG. 10, relevant patent information for patents included in the patent set is displayed. Also, displayed is a column titled "Has Feature?" This column may have values ranging from one to three signifying the degree to which the product includes the concept. For example, a value of three may mean the product definitely includes the concept and a value of one means the product definitely does not relate to the concept. Based on these values, the chart may dynamically update and determine values for the claim coverage and product coverage rows. For example, SC 1 and SC 5 both have a rating of '3' and are present in all of the claims of patent "Title 1." Thus, "Title 1" has a claim coverage of '3' and a product coverage value of "potentially applies." It is only "potentially applies" because it cannot be known for certain whether the patent applies but only that SC 1 and SC 5 are present in the claims. However, because scope concepts always describe limitations, if a claim has two scope concepts mapped, as shown with respect to the claims in patent "Title 2," the lowest ratings score will control the claim coverage. As shown, SC 6 is described as not being present in the product and the "Title 2" claims have been mapped to SC 6. Therefore, regardless of the fact the SC 3 has also been mapped and the product has this feature, the "Title 2" claims cannot apply to the product as they are at least limited to SC 6.

This chart may also allow interactivity with a user. This interactivity may include the user changing the "Has feature" values and the chart automatically updating the claim coverage and product coverage rows. For example, if the SC 1 rating was changed to '1,' the claim coverage value of the patent "Title 1" may change to "1" signifying the patent does not apply to the product. In some embodiments, any changes that result from input from the user are highlighted on the chart. This may allow a user to quickly see the effects of potential changes to product coverage.

FIG. 12 illustrates an example freedom to operate chart. In an example embodiment, a freedom to operate chart allows a user to quickly see which patents may be necessary to obtain licenses from or purchase to produce a product, sell a service, etc. FIG. 12 is similar to FIG. 11 except for in place of a "Has feature?" column there is a "Need. Feature?" column. The values in this column may represent whether or not, and to what extent, a user believes a feature is necessary in his or her product. A '3' may indicate that the scope concept is necessary, a '2' may indicate the scope concept is wanted, but not needed, and a '1' may indicate the scope concept is not needed. In an example embodiment, the "claim status" row shown in FIG. 12 reflects whether a patent in the patent set needs to be licensed or purchased in order for the user to operate freely. As with the product coverage chart, the lowest value in the "need feature" column controls. Thus, patent "Title 1" is not needed even though SC 1 is mapped to all the claims and the user has indicated the feature is necessary. Similarly to above, a user may interact with the ratings to see in real-time the impact of removing or adding features in terms of the number of patents needing to be licensed or purchased.

FIG. 13 illustrates an example claim/patent valuation chart. In an example embodiment, a claim/patent valuation chart allows a user to see which patents/claims may be necessary to license, etc., to maximize the value of a currently owned patent or patent claim. FIG. 13 is similar to FIG. 11 except the values in the ratings column reflect whether or not a scope concept is necessary to maximize a patent's value. The values in this column may represent whether or not, and to what extent, a user believes a feature is necessary in maximize a patent's value. A '3' may indicate that the scope concept is necessary, a '2' may indicate the scope concept is wanted, but not needed, and a '1' may indicate the scope concept is not needed. In an example embodiment, the "claim value" row shown in FIG. 13 reflects whether a patent in the patent set needs to be licensed or purchased in order to maximize the user's patent. As with the product coverage chart, the lowest value in the rating column controls. Thus, patent "Title 1" is not important, even though SC 1 is mapped to all the claims and the user has indicated a high value for SC 1. Similarly to the above charts, a user may interact with the chart by changing the ratings to see in real-time the effects on patents in the patent set.

FIG. 14 illustrates an example validity chart. In an example embodiment, a validity chart allows a user to see the overlap between a patent and a patent set. FIG. 14 is similar to FIG. 11 except the values in the ratings column reflect whether or not a feature is shown in the patent in question (the patent to which the patent set is being compared). The values in this column may represent whether or not, and to what extent, a user believes a feature is present in the patent in question. A '3' may indicate that the scope concept is shown, a '2' may indicate the scope concept is possibly shown, and a '1' may indicate the scope concept is not shown. In an example embodiment, the claim status row shown in FIG. 14 reflects the extent to which the patent in question and the patents in the patent set overlap. Unlike the product coverage chart, if two scope concepts are mapped to a patent, but contain different ratings, the feature rating becomes "some overlap". Thus, even though SC 5 has been rated as not shown and mapped to patent "Title 1," SC 1 is also mapped to the patent but is shown and therefore there is some overlap between the patent in question and patent "Title 1." A finding of "complete overlap" may indicate to a user that a patent or claim is completed anticipated. As above, the user may interact with the chart by changing the ratings to see in real-time the effects on patents in the patent set.

FIG. 15 illustrates an example white space analysis chart. In an example embodiment, a white space analysis chart allows a user to see the frequency in which scope concepts appear in a patent set. In some embodiments there are scope concepts that are in no patent claims. The chart may be color coded to allow a user to quickly ascertain the least frequently used scope concepts. 16 illustrates an example white space claim generation chart. In an example embodiment the generated chart illustrates suggested combinations of unclaimed combinations of existing scope concepts as well as suggested combinations of new scope concepts with existing scope concepts.

Figure 17:
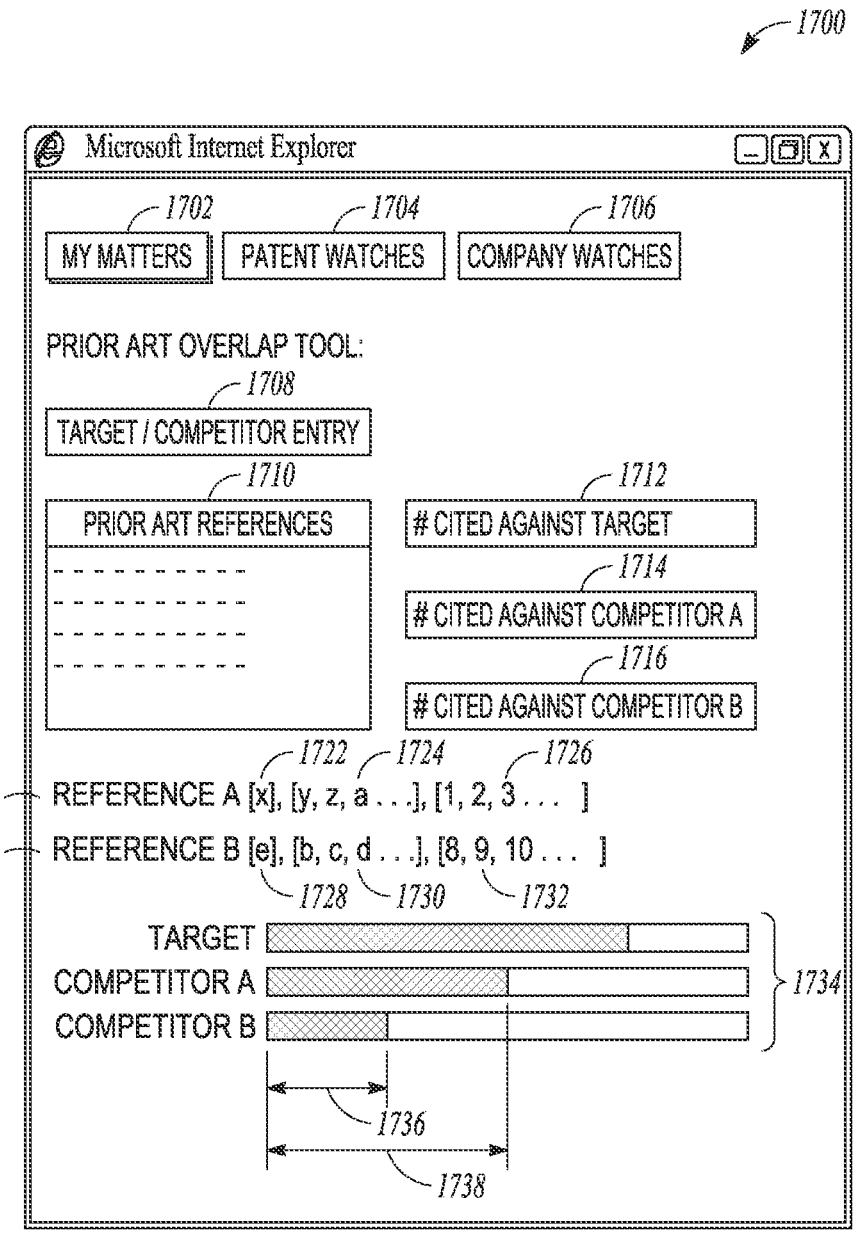
FIG. 17 is a user interface, according to an example embodiment.

Reference is now made to FIG. 17 which shows a user interface 400 that may be used to facilitate further mapping methods of the present inventive subject matter, according to example embodiments. The user interface 1700 may be displayed by display module 212 described above. The user interface 1700 may be provided in a website, computer monitor, or mobile device. The type of user elements, names, and layout depicted in FIG. 17 are intended to be an illustration of an example user interface of patent management system 102. Other types of user elements, names, and layouts may be used.

User interface 1700 is illustrated with multiple user interface elements. In an example embodiment, a user interface element is a graphical or textual element that a user may interact with to cause an application to perform an assigned action for the interface element. Data representing user interface 1700 may be transmitted via network 106 and presented on a display of user terminal 104 through the use of a web browser. A user (e.g., manager of a patent portfolio, etc.) may interact with the user interface elements of user interface 1700 through the use of an input device (e.g., stylus, cursor, mouse, a finger) of the user terminal 104. In an embodiment, a user selection is based on the coordinates of the input device as it makes contact with the display or where a user "clicks" the mouse. The coordinates are compared to the coordinates of the user input element to determine the selection. The type of user elements, names, and layout depicted in FIG. 17 are intended to be an illustration of an example user interface of patent management system 102. Other types of user elements, names, and layouts may be used. Some elements may be omitted in various embodiments depending on the nature of management tool provided.

In general, the user interface elements may include my matters 1702, patent watches 1704, and company watches 1706. These elements may be used to select a context "view of" the patent management system 102. For example, my matters 1702 lists the patents included within a portfolio of a user, patent watches 1704 lists information on patents that the user has indicated the patent management system 102 is to watch, and company watches 1706 lists information on companies that the user has indicated the system 102 should watch.

In various embodiments, a prior art overlap mapping tool includes further user interface elements which allow a user to input, for example at element 1708, the identity of a target entity and the identity of at least one other entity of interest. This input may be passed to the input module 214 for searching. The target entity might be an inventor of interest or a client, for example, while the at least one other entity of interest might be one or more competitors, for example. The input module 214, for example, is to search for and identify prior art cited against the patent filings (optionally domestic, foreign or both types of filings) of the identified target and competitor entities, and the display module 212 is to display the references in a window 1710, for example.

In display windows 1712, 1714, and 1716, the references may be broken down into listings of references cited against the target and the selected competitors. The references may be aggregated together, or in various embodiments, further broken down into group listings relating to one or more patents, patent matters or patent portfolios, or in various embodiments, into groupings relating to one or more domestic or foreign countries.

In various embodiments, further data relating to the cited references is provided. In windows 1718 and 1720, specific data relating to one or more cited references is provided. For example, the name of the owner of Reference A is shown at window 1722 as "x". Any instances of reverse or back citations of Reference A are shown at window 1724, and instances of forward citations of Reference A at window 1726, for example. Similar details for Reference B may be shown at windows 1728, 1730 and 1732, for example.

The cited references found for the target and other entities can be conveniently displayed in a bar chart or other graphic. In an example embodiment, numeral 1734 indicates a chart having three bar lines. Each bar line represents the citation listings for a target entity and two competitors A and B identified by a user. Details of each citation listed in a bar line may be given, but are not shown here in the interests of clarity. A representation of the prior art overlap can be shown and is here illustrated by arrow 1736 which indicates a zone of commonality of references found for each of the target and competitors A and B. Other zones of commonality, such as indicated by arrow 1738, listing references common to the target and competitor A only, can be given. At a quick glance, a user can determine which areas of art or technology are being cited against or developed by each entity. In various embodiments, the zone of commonality can be rechecked at various intervals so that ongoing trends in the art can be analyzed over time.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., Application Program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures usually require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 18:
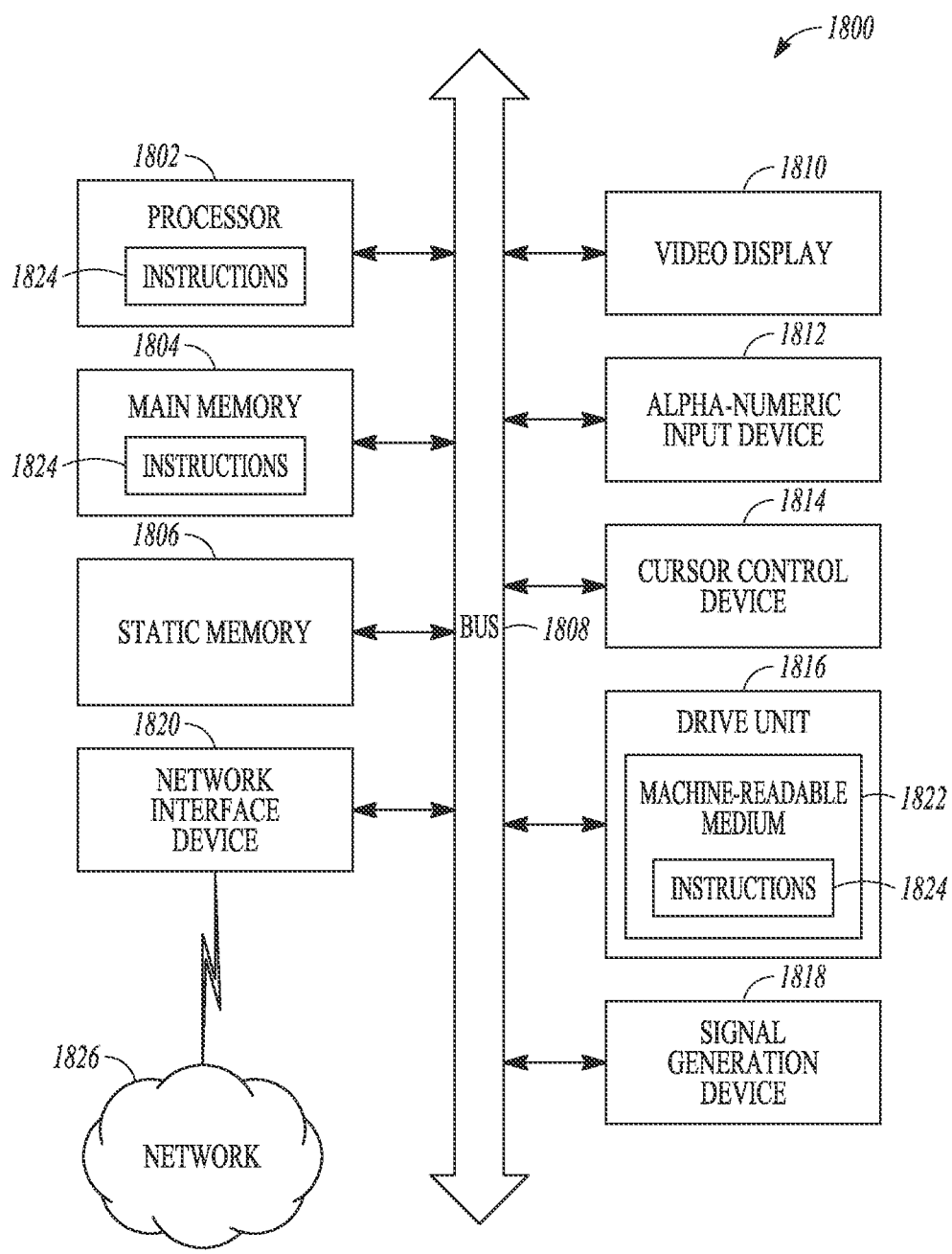
FIG. 18 is a block diagram of machine in the example form of a computer system within which a set of instructions may be executed for causing the machine to perform any one or more of the methodologies herein discussed.

FIG. 18 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (SIB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation or cursor control device 1814 (e.g., a mouse), a disk drive unit 1816, a signal generation device 1818 (e.g., a speaker) and a network interface device 1820.

Machine-Readable Medium

The disk drive unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, with the main memory 1804 and the processor 1802 also constituting machine-readable media.

While the machine-readable medium 1822 is shown in an example embodiment to be a single medium, the term "machine-readable medium" may include a single medium or multiple media (e.g., a centralized or distributed database, and/or associated caches and servers) that store the one or more data structures or instructions 1824. The term "machine-readable medium" shall also be taken to include any tangible medium that is capable of storing, encoding or carrying instructions for execution by the machine and that cause the machine to perform any one or more of the methodologies of the embodiments of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices. e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.
Transmission Medium The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

NON-LIMITING EMBODIMENTS

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent to those of skill in the art upon reviewing the above description.

NOTES ON THE ABSTRACT

The Abstract of the Disclosure is provided to comply with 37 C.F.R. § 1.72 (b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed. Description, with each claim standing on its own as a separate embodiment.

What is claimed is:

1. A system comprising:
    at least one processor; and
    memory including instructions that, when executed by the at least one processor,
    cause the at least one processor to:
    automatically extract keywords from patent claims associated with a first patent portfolio and a product;
    arrange the keywords by an order of importance between respective of the keywords;
    search the first patent portfolio as a function of a search query associated with the first patent portfolio and the product, wherein the search query includes the arranged keywords;
    generate a seed set of search results including one or more patent claims associated with the search query, the one or more patent claims including terms from the search query;
    automatically generate an expanded set of search results including retrieved patent claims associated with the one or more patent claims in the seed set of search results, the expanded set of search results including prior art documents cited on a face of a document corresponding to a matter reciting the one or more patent claims in the seed set of search results in addition to patent claims textually related to the search query from a database of patents;
    map the one or more patent claims of the expanded set of search results to a scope concept;
    identify a patent in the database of patents based on a set of scope concepts for the patent corresponding to scope concepts of the product; and
    generate a claim chart for the patent and the product, wherein claims of the patent are associated with features of the product based on corresponding scope concepts of claims of the patent and the product.

2. The system of claim 1, further comprising instructions to:
    determine claims of the patent are associated with a respective feature of the product based on corresponding scope concepts; and
    color cells of the claim chart based on determining claims of the patent are associated with a respective feature of the product.

3. The system of claim 2, further comprising instructions to:
    determine a likelihood of infringement based on a color of cells of the claim chart.

4. The system of claim 1, wherein the automatic generation of the expanded set of search results includes retrieving patent claims which include synonyms of the terms of the search query.

5. The system of claim 1, further comprising instructions to:

maintain a database of ontologies, the ontologies including one or more patent concepts.

6. The system of claim 5, wherein the one or more patent concepts includes a technology category.

7. At least one non-transitory computer readable medium including instructions that when executed by at least one processor, cause the at least one processor to:
   automatically extract keywords from patent claims associated with a first patent portfolio and a product;
   arrange the keywords by an order of importance between respective of the keywords;
   search the first patent portfolio as a function of a search query associated with the first patent portfolio and the product, wherein the search query includes the arranged keywords;
   generate a seed set of search results including one or more patent claims associated with the search query, the one or more patent claims including terms from the search query;
   automatically generate an expanded set of search results including retrieved patent claims associated with the one or more patent claims in the seed set of search results, the expanded set of search results including prior art documents cited on a face of a document corresponding to a matter reciting the one or more patent claims in the seed set of search results in addition to patent claims textually related to the search query from a database of patents;
   map the one or more patent claims of the expanded set of search results to a scope concept;
   identify a patent in the database of patents based on a set of scope concepts for the patent corresponding to scope concepts of the product; and
   generate a claim chart for the patent and the product, wherein claims of the patent are associated with features of the product based on corresponding scope concepts of claims of the patent and the product.

8. The at least one non-transitory computer readable medium of claim 7, further comprising instructions to:
   determine claims of the patent are associated with a respective feature of the product based on corresponding scope concepts; and
   color cells of the claim chart based on determining claims of the patent are associated with a respective feature of the product.

9. The at least one non-transitory computer readable medium of claim 8, further comprising instructions to:
   determine a likelihood of infringement based on a color of cells of the claim chart.

10. The at least one non-transitory computer readable medium of claim 7, wherein the automatic generation of the expanded set of search results includes retrieving patent claims which include synonyms of the terms of the search query.

11. The at least one non-transitory computer readable medium of claim 7, further comprising instructions to:
   maintain a database of ontologies, the ontologies including one or more patent concepts.

12. A computer implemented method implemented by one or more processors comprising:
   automatically extracting keywords from patent claims associated with a first patent portfolio and a product;
   arranging the keywords by an order of importance between respective of the keywords;
   searching the first patent portfolio as a function of a search query associated with the first patent portfolio and the product, wherein the search query includes the arranged keywords;
   generating a seed set of search results including one or more patent claims associated with the search query, the one or more patent claims including terms from the search query;
   automatically generating an expanded set of search results including retrieved patent claims associated with the one or more patent claims in the seed set of search results, the expanded set of search results including prior an documents cited on a face of a document corresponding to a matter reciting the one or more patent claims in the seed set of search results in addition to patent claims textually related to the search query from a database of patents;
   mapping the one or more patent claims of the expanded set of search results to a scope concept;
   identifying a patent in the database of patents based on a set of scope concepts for the patent corresponding to scope concepts of the product; and
   generating a claim chart for the patent and the product, wherein claims of the patent are associated with features of the product based on corresponding scope concepts of claims of the patent and the product.

13. The computer implemented method of claim 12, further comprising:
   determining claims of the patent are associated with a respective feature of the product based on corresponding scope concepts; and
   coloring cells of the claim chart based on determining claims of the patent are associated with a respective feature of the product.

14. The computer implemented method of claim 13, further comprising:
   determining a likelihood of infringement based on a color of cells of the claim chart.

15. The computer implemented method of claim 12, wherein the automatic generation of the expanded set of search results includes retrieving patent claims which include synonyms of the terms of the search query.

16. The computer implemented method of claim 12, further comprising:
   maintaining a database of ontologies, the ontologies including one or more patent concepts.

17. The computer implemented method of claim 16, wherein the one or more patent concepts includes a technology category.

* * * * *